(12) United States Patent
Yanagida et al.

(10) Patent No.: US 7,781,540 B2
(45) Date of Patent: Aug. 24, 2010

(54) RESIN COMPOSITION AND MOLDED ARTICLES THEREOF

(75) Inventors: Takatsune Yanagida, Tokyo (JP); Masatoshi Ando, Tokyo (JP); Yoshihiko Imanaka, Tokyo (JP); Masahiro Yamada, Osaka (JP); Shinichi Kawasaki, Osaka (JP); Mitsuaki Yamada, Osaka (JP); Hiroaki Murase, Osaka (JP); Tsuyoshi Fujiki, Osaka (JP); Kana Kobori, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 882 days.

(21) Appl. No.: 11/632,347

(22) PCT Filed: Jul. 13, 2005

(86) PCT No.: PCT/JP2005/013340

§ 371 (c)(1),
(2), (4) Date: Jan. 12, 2007

(87) PCT Pub. No.: WO2006/006731

PCT Pub. Date: Jan. 19, 2006

(65) Prior Publication Data

US 2008/0085955 A1 Apr. 10, 2008

(30) Foreign Application Priority Data

Jul. 15, 2004 (JP) ............................ 2004-209210
Oct. 21, 2004 (JP) ............................ 2004-307487
Feb. 1, 2005 (JP) ............................ 2005-024829
Apr. 14, 2005 (JP) ............................ 2005-116633

(51) Int. Cl.
*C08F 283/02* (2006.01)
*C08G 63/02* (2006.01)

(52) U.S. Cl. ........................... 525/466; 524/88; 524/90; 524/612; 525/148; 525/168; 528/196; 528/198; 528/271; 528/272

(58) Field of Classification Search .................... 524/88, 524/90, 612; 525/148, 168; 528/196, 198, 528/271, 272, 466
See application file for complete search history.

(56) References Cited

U.S. PATENT DOCUMENTS

| | | | |
|---|---|---|---|
| 3,833,617 A | | 9/1974 | Webb et al. |
| 4,835,081 A | * | 5/1989 | Ong et al. .............. 430/58.25 |
| 5,196,479 A | * | 3/1993 | Laughner et al. .............. 525/67 |
| 5,208,299 A | * | 5/1993 | Bales et al. .................. 525/437 |
| 5,486,577 A | * | 1/1996 | Farah et al. .................. 525/469 |
| 6,255,031 B1 | | 7/2001 | Yao et al. |
| 6,522,463 B1 | | 2/2003 | Shimomura et al. |
| 6,576,735 B2 | | 6/2003 | Kanagawa et al. |
| 2007/0293606 A1 | * | 12/2007 | Yamada et al. ................. 524/88 |

FOREIGN PATENT DOCUMENTS

| | | | |
|---|---|---|---|
| EP | 0 036 629 | | 9/1981 |
| EP | 1 642 934 | | 4/2006 |
| EP | 1 674 496 | | 6/2006 |
| JP | 63-189804 | | 8/1988 |
| JP | 01-201608 | | 8/1989 |
| JP | 06-025398 | | 2/1994 |
| JP | 06-082624 | | 3/1994 |
| JP | 07-198901 | | 8/1995 |
| JP | 08-041303 | | 2/1996 |
| JP | 11-014801 | | 1/1999 |
| JP | 11-060706 | | 3/1999 |
| JP | 11073115 | * | 3/1999 |
| JP | 11-116826 | | 4/1999 |
| JP | 11302285 | * | 11/1999 |
| JP | 2000 119379 | | 4/2000 |
| JP | 2000-227515 | | 8/2000 |
| JP | 2001-253960 | | 9/2001 |
| JP | 2002-030140 | | 1/2002 |
| JP | 2002082219 | * | 3/2002 |
| JP | 3308545 | | 5/2002 |
| JP | 2002-341132 | * | 11/2002 |
| JP | 2003-012912 | | 1/2003 |
| JP | 2004-315676 | | 11/2004 |
| JP | 2005-042021 | | 2/2005 |
| WO | 92/07721 | | 5/1992 |
| WO | WO 9207721 | * | 5/1992 |
| WO | WO 9738855 | * | 10/1997 |
| WO | 99/54399 | | 10/1999 |
| WO | WO 99/54399 | * | 10/1999 |
| WO | 2005/030834 | | 4/2005 |

* cited by examiner

*Primary Examiner*—Terressa M Boykin
(74) *Attorney, Agent, or Firm*—Wenderoth, Lind and Ponack, L.L.P.

(57) ABSTRACT

A resin composition, and molded articles thereof, where the resin composition simultaneously satisfies resistances, such as heat and environmental resistance, and moldability at high levels, and has excellent optical properties, such as high refractivity and low birefringence. The resin composition contains a polyester resin formed from a dicarboxylic acid component and a diol component (a) and a polycarbonate resin formed from a carbonate-forming component and a diol component (b), the diol component (a) containing a specific fluorene-containing compound and the diol component (b) containing a specific fluorene-containing compound.

44 Claims, 2 Drawing Sheets

RESIN COMPOSITION AND MOLDED ARTICLES THEREOF

TECHNICAL FIELD

This invention relates to a resin composition containing a polyester resin having a fluorene skeleton and a polycarbonate resin having a fluorene skeleton and molded articles thereof.

BACKGROUND ART

In recent years, optical resin materials having fluorene structures have been developed for decreasing the thickness and weight of a plastic lens for use in a digital camera, a CCD camera, an optical pickup or the like.

As such a resin, a polycarbonate resin having a fluorene structure (to be sometimes abbreviated as "fluorene PC" hereinafter) has come into the spotlight. This resin has excellent properties such as high heat resistance and high refractivity and is useful as a resin for optical elements. For example, JP-A 6-25398 discloses a fluorene PC containing 41 to 95 mol % of a dihydroxyphenylfluorene unit and having a specific photoelastic constant and a specific viscosity. Since, however, the above fluorene PC has a stiff structure, its flowability is insufficient and its moldability is sometimes a problem in some fields of use.

JP-A 2002-30140 discloses a resin having a polysiloxane structure introduced as a soft segment for improving the moldability of a fluorene PC. Further, JP-A 2005-42021 discloses an example in which other polycarbonate resin is blended with a fluorene PC for improving the moldability thereof.

On the basis of an idea similar to the ideas of these techniques, it is thinkable to blend a fluorene PC with a polyester resin to improve the moldability thereof. However, a polyester resin has poor compatibility to a polycarbonate resin, and when a general-purpose polyethylene terephthalate is blended with a fluorene PC, transparency cannot be maintained for a resin composition obtained, and it is difficult to use this composition as a material for optical use.

Under the circumstances, it is demanded to improve the moldability of a fluorene PC while maintaining advantages of the fluorene PC having excellent properties such as high heat resistance, high refractivity, transparency and the like.

DISCLOSURE OF THE INVENTION

It is an object of this invention to provide a resin composition comprising a fluorene PC and having excellent moldability.

It is another object of this invention to provide a resin composition that comprises a fluorene PC and that is excellent in optical properties such as transparency, refractivity, birefringence and the like and molded articles thereof.

It is further another object of this invention to provide a resin composition that contains a fluorene PC and that is excellent in resistances such as heat resistance, environmental resistance and the like and molded articles thereof.

The present inventors have therefore carried out researches for a polyester that has excellent compatibility to a fluorene PC and that can impart it with moldability. As a result, it has been found that when a polyester having a specific fluorene structure described in JP-A 7-198901, JP-A 2000-119379, etc., is incorporated into a fluorene PC, there can be obtained a resin composition that is excellent in resistances such as heat resistance, environmental resistance, etc., that is excellent in optical properties such as transparency, etc., and that is excellent in moldability, and a mold article thereof. The present inventors have further found that the above resin composition is excellent as molded articles for optical use such as a lens and the like, and the present invention has been accordingly completed on the basis of these findings.

That is, this invention provides a resin composition (RC) comprising a polyester resin formed from a dicarboxylic acid component and a diol component (a) and a polycarbonate resin formed from a carbonate-forming component and a diol component (b), the diol component (a) containing a compound of the following formula (1) and the diol component (b) containing a compound of the following formula (1) and/or a compound of the following formula (2),

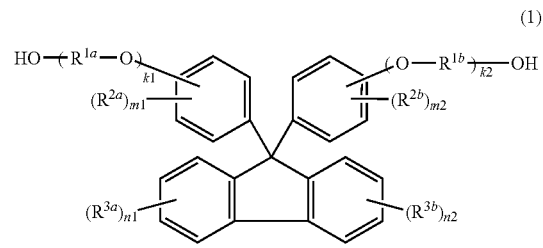

wherein $R^{1a}$ and $R^{1b}$ represent the same or different $C_{2-10}$ alkylene groups, $R^{2a}$, $R^{2b}$, $R^{3a}$ and $R^{3b}$ represent the same or different substituents, k1 and k2 represent the same or different integers of 1 or greater and m1, m2, n1 and n2 represent the same or different integers of 1 to 4,

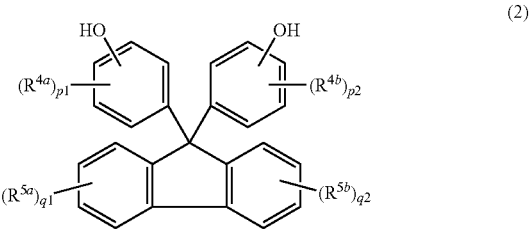

wherein $R^{4a}$, $R^{4b}$, $R^{5a}$ and $R^{5b}$ represent the same or different substituents and p1, p2, q1 and q2 represent the same or different integers of 1 to 4.

Further, this invention provides a process for the production of a resin composition (RC), which comprises melt-blending a polyester resin formed from a dicarboxylic acid component and a diol component (a) containing a compound of the formula (1) and a polycarbonate resin formed from a carbonate-forming component and a diol component (b) containing a compound of the formula (1) and/or a compound of the formula (2).

Further, this invention provides a lens formed of a resin composition (RC). This invention includes a process for the production of the above lens, which comprises blending a polyester resin formed from a dicarboxylic acid component and a diol component (a) containing a compound of the formula (1) and a polycarbonate resin formed from a carbonate-forming component and a diol component (b) containing a compound of the formula (1) and/or a compound of the formula (2) and molding the thus-obtained blend.

Further, this invention provides a resin composition (RC) containing a dye having infrared absorbing capability. Further, this invention includes an infrared absorbing filter formed of the resin composition (RC) containing a dye having infrared absorbing capability.

Further, this invention provides a retardation film formed of the resin composition (RC). Further, this invention includes a process for the production of the above retardation film, which comprises forming a film from the resin composition (RC) and stretching the film.

BEST MODE FOR EMBODIMENTS OF THE INVENTION

Figure 1:
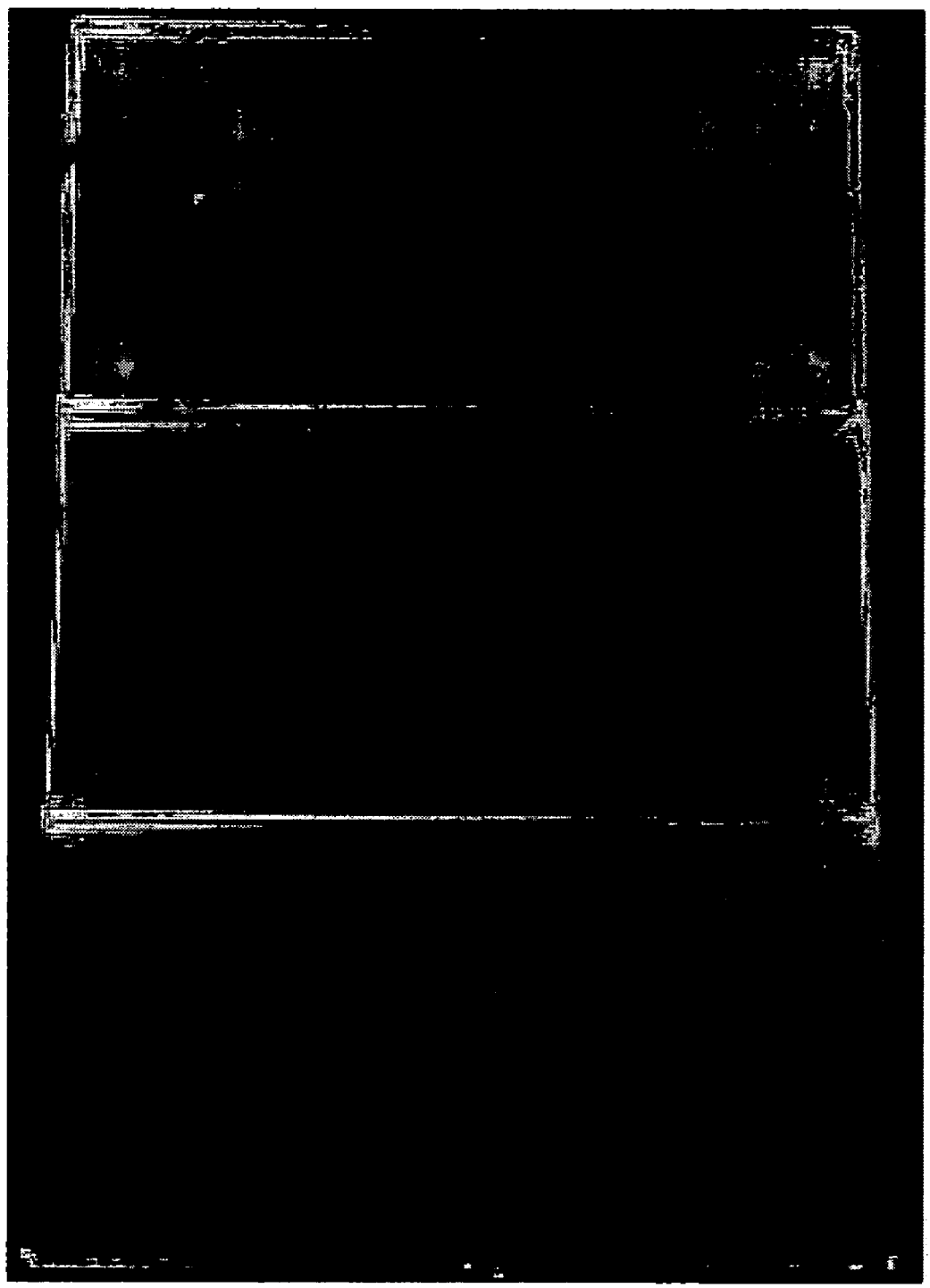
FIG. 1 is a photograph of the surface of a plate obtained in Example 7, taken through a polarizing plate.

In the present specification, "$C_{2-10}$" as used in $C_{2-10}$ alkylene group, etc., means the number of carbon atoms, which is 2 to 10.

<Polyester Resin>

The polyester resin is formed from a dicarboxylic acid component and a diol component (a).

<Diol Component (a)>

The diol component (a) contains a compound of the following formula (1).

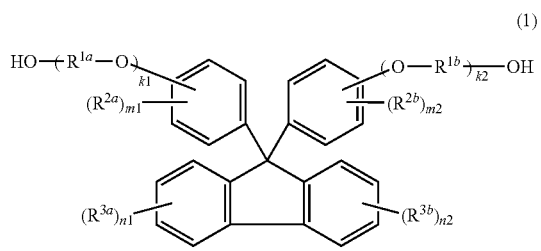

(1)

In the formula (1), $R^{1a}$ and $R^{1b}$ represent the same or different $C_{2-10}$ alkylene groups.

Examples thereof include $C_{2-6}$ alkylene groups such as an ethylene group, a trimethylene group, a propylene group, butane-1,2-diyl group and butane-1,4-diyl (tetramethylene group). As an alkylene group, $C_{2-4}$ alkylene groups are preferred, $C_{2-3}$ alkylene groups are particularly preferred and an ethylene group is the most preferred.

Further, k1 and k2 represent the numbers of recurrences of —(O—$R^{1a}$)— and —(O—$R^{1b}$)—, respectively, and these k1 and k2 for the numbers of recurrences can be 1 or greater. For example, they are 1 to 10, preferably 1 to 8, more preferably 1 to 6, still more preferably 1 to 4, and they may be 1 each.

The position on which a hydroxyl group-containing group represented by the substituent of —[(O—$R^{1a}$)$_{k1}$—OH] or the substituent of —[(O—$R^{1b}$)$_{k2}$—OH] is substituted can be selected from the 2 to 6 positions on phenyl groups substituted on the 9 position of the fluorene, and the above position is preferably the 2 position or 4 position, more preferably the 4 position.

In the formula (1), $R^{2a}$ and $R^{2b}$ represent the same or different substituents. Each of $R^{2a}$ and $R^{2b}$ is preferably a hydrogen atom, alkyl, cycloalkyl, aryl, aralkyl, alkenyl, alkoxy, acyl, alkoxycarbonyl, a halogen atom, nitro or cyano.

The alkyl is preferably $C_{1-20}$ alkyl, more preferably $C_{1-8}$ alkyl, still more preferably $C_{1-6}$ alkyl. The alkyl specifically includes methyl, ethyl, propyl, isopropyl, butyl, s-butyl, isobutyl and tert-butyl. The cycloalkyl is preferably $C_{5-10}$ cycloalkyl, more preferably $C_{5-8}$ cycloalkyl, still more preferably $C_{5-6}$ cycloalkyl. The cycloalkyl is specifically cyclopentyl, cyclohexyl or the like. The aryl is preferably $C_{6-10}$ aryl, more preferably $C_{6-8}$ aryl. The aryl is specifically phenyl or alkylphenyl such as methylphenyl (tolyl), dimethylphenyl (xylyl) or the like. The aralkyl is preferably $C_{6-10}$ aryl-$C_{1-4}$ alkyl. The aralkyl specifically includes benzyl, phenethyl and the like. The alkenyl is preferably $C_{2-6}$ alkenyl, more preferably $C_{2-4}$ alkenyl. The alkenyl specifically includes vinyl, propenyl and the like. The alkoxy is preferably $C_{1-4}$ alkoxy such as methoxy. The acyl is preferably $C_{1-6}$ acyl such as acetyl. The alkoxycarbonyl is preferably $C_{1-4}$ alkoxycarbonyl such as methoxycarbonyl. The halogen atom includes a fluorine atom, a chlorine atom, a bromine atom and the like.

$R^{2a}$ (or $R^{2b}$) is preferably $C_{1-6}$ alkyl, $C_{5-8}$ cycloalkyl, $C_{6-10}$ aryl, $C_{6-8}$ aryl-$C_{1-2}$ alkyl, alkenyl, a halogen atom or the like. Concerning $R^{2a}$ (or $R^{2b}$), a single substituent or a combination of two or more substituents may be substituted on a benzene ring. $R^{2a}$ and $R^{2b}$ may be the same as, or different from, each other, while they are generally identical. Further, substituents represented by $R^{2a}$ (or $R^{2b}$) on one benzene ring may the same as, or different from, each other.

Further, the position(s) of substituent(s) represented by $R^{2a}$ (or $R^{2b}$) is/are not specially limited, and substituent(s) represented by $R^{2a}$ (or $R^{2b}$) can be substituted on proper position(s) of the 2 to 6 positions on the phenyl group depending upon the number m1 (or m2) of the substituents.

Each of the numbers m1 and m2 of substituents is preferably an integer of 1 to 3, more preferably an integer of 1 or 2. The numbers m1 and m2 of substituents may be different from each other.

A substituent represented by each of $R^{3a}$ and $R^{3b}$ is preferably a hydrogen atom or alkyl. The alkyl is preferably $C_{1-6}$ alkyl, more preferably $C_{1-4}$ alkyl. Specifically, the above substituent includes a hydrogen atom, methyl, ethyl, propyl, isopropyl, butyl, tert-butyl and the like.

$R^{3a}$ and $R^{3b}$ may be the same as, or different from, each other. Substituents represented by $R^{3a}$ (or $R^{3b}$) on one benzene ring may be the same as, or different from, each other. In addition, the bonding position(s) (substitution position(s)) of substituent(s) $R^{3a}$ (or $R^{3b}$) on the benzene ring constituting the fluorene structure is (are) not specially limited. Each of the numbers n1 and n2 of substituents is 1 or 2. The numbers n1 and n2 of substituents may be the same as, or different from, each other.

Preferred are compounds of the formula (1) wherein each of k1 and k2 is an integer of 1 to 4, each of the substituents $R^{1a}$ and $R^{1b}$ is a $C_{2-4}$ alkylene group, each of the substituents $R^{2a}$, $R^{2b}$, $R^{3a}$ and $R^{3b}$ is a hydrogen atom or $C_{1-6}$ alkyl and each of m1, m2, n1 and n2 is 1 or 2.

Examples of the compound of the formula (1) include 9,9-bis(hydroxyalkoxyphenyl)fluorenes shown below:

9,9-bis(hydroxy$C_{2-4}$alkoxyphenyl)fluorenes such as 9,9-bis[4-(2-hydroxyethoxy)phenyl]fluorene, 9,9-bis[4-(3-hydroxypropoxy)phenyl]fluorene, 9,9-bis[4-(4-hydroxybutoxy)phenyl]fluorene, etc., 9,9-bis(hydroxy$C_{2-4}$alkoxy-mono-$C_{1-6}$alkylphenyl)-fluorenes such as 9,9-bis[4-(2-hydroxyethoxy)-3-methylphenyl]fluorene, 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(2-hydroxyethoxy)-3-isopropylphenyl]fluorene, 9,9-bis[4-(2-hydroxyethoxy)-3-n-butylphenyl]

fluorene, 9,9-bis[4-(2-hydroxyethoxy)-3-isobutylphenyl]fluorene, 9,9-bis[4-(3-hydroxypropoxy)-3-methylphenyl]fluorene, 9,9-bis[4-(4-hydroxybutoxy)-3-methylphenyl]fluorene, etc., 9,9-bis(hydroxyC$_{2-4}$alkoxy-diC$_{1-6}$alkylphenyl)-fluorenes such as 9,9-bis[4-(2-hydroxyethoxy)-3,5-dimethylphenyl]fluorene, 9,9-bis[4-(2-hydroxyethoxy)-2,5-dimethylphenyl]fluorene, 9,9-bis[4-(2-hydroxyethoxy)-3,5-diethylphenyl]fluorene, 9,9-bis[4-(2-hydroxyethoxy)-3,5-dipropylphenyl]fluorene, 9,9-bis[4-(2-hydroxyethoxy)-3,5-diisopropylphenyl]fluorene, 9,9-bis[4-(2-hydroxyethoxy)-3,5-di-n-butylphenyl]fluorene, 9,9-bis[4-(2-hydroxyethoxy)-3,5-diisobutylphenyl]fluorene, 9,9-bis[4-(3-hydroxypropoxy)-3,5-dimethylphenyl]fluorene, 9,9-bis[4-(4-hydroxybutoxy)-3,5-dimethylphenyl]fluorene, etc., 9,9-bis(hydroxyC$_{2-4}$alkoxy-monoC$_{5-8}$cycloalkylphenyl)-fluorenes such as 9,9-bis[4-(2-hydroxyethoxy)-3-cyclohexylphenyl]fluorene, etc., 9,9-bis(hydroxyC$_{2-4}$alkoxy-monoC$_{6-8}$arylphenyl)-fluorenes such as 9,9-bis[4-(2-hydroxyethoxy)-3-phenylphenyl]fluorene, etc., 9,9-bis(hydroxyC$_{2-4}$alkoxy-diC$_{6-8}$arylphenyl)-fluorenes such as 9,9-bis[4-(2-hydroxyethoxy)-3,5-diphenylphenyl]fluorene, etc., 9,9-bis(hydroxyC$_{2-4}$alkoxy-mono(C$_{6-8}$arylC$_{1-4}$alkyl)-phenyl)fluorenes such as 9,9-bis[4-(2-hydroxyethoxy)-3-benzylphenyl]fluorene, etc., 9,9-bis(hydroxyC$_{2-4}$alkoxy-di (C$_{6-8}$arylC$_{1-4}$alkyl)phenyl) fluorenes such as 9,9-bis[4-(2-hydroxyethoxy)-3,5-dibenzylphenyl]fluorene, etc., 9,9-bis(hydroxyC$_{2-4}$alkoxy-monoC$_{2-4}$alkenylphenyl) fluorenes such as 9,9-bis[4-(2-hydroxyethoxy)-3-propenylphenyl]fluorene, etc., 9,9-bis(hydroxyC$_{2-4}$alkoxy-monohalophenyl)fluorenes such as 9,9-bis[4-(2-hydroxyethoxy)-3-fluorophenyl]fluorene, etc., and 9,9-bis(hydroxypolyalkoxyphenyl)fluorenes which correspond to the above 9,9-bis(hydroxyalkoxyphenyl) fluorenes and in which the numbers k1 and k2 of recurrence are 2 or more.

Of these, 9,9-bis(hydroxyC$_{2-4}$alkoxyphenyl)fluorenes, 9,9-bis(hydroxyC$_{2-4}$alkoxy-monoC$_{1-6}$alkylphenyl)fluorenes {such as 9,9-bis[4-(2-hydroxyethoxy)-3-methylphenyl]fluorene}, etc., are preferred, and 9,9-bis[4-(2-hydroxyethoxy)phenyl]fluorene is particularly preferred. The compounds represented by the formula (1) can be used singly or in combination of two or more members of them.

The compound of the formula (1) can be obtained by reacting 9,9-bis(hydroxyphenyl)fluorene (a compound of the formula (2)) to be described later with compounds corresponding to R$^{1a}$ and R$^{1b}$ (an alkylene oxide, a haloalkanol, etc.). For example, 9,9-bis[4-(2-hydroxyethoxy)phenyl]fluorene can be obtained by adding ethylene oxide to 9,9-bis(4-hydroxyphenyl)fluorene and 9,9-bis[4-(3-hydroxypropoxy)phenyl]fluorene can be obtained, for example, by reacting 9,9-bis[4-hydroxyphenyl]fluorene with 3-chloropropanol under an alkali condition. In addition, the 9,9-bis(hydroxyphenyl)fluorene can be obtained by a method to be described later.

The content of the compound of the formula (1) in the diol component (a) is preferably 10 mol % or more, more preferably 20 mol % or more, still more preferably 50 mol % or more. Specifically, the above content is preferably 15 to 100 mol %, more preferably 30 to 99 mol %, still more preferably 60 to 95 mol %, and a diol component (a') to be described later accounts for the rest.

When the amount of the compound of the formula (1) is too small, the heat resistance and refractive index of a polyester resin obtained may sometimes decrease or the birefringence thereof may sometimes increase, and it is sometimes difficult to obtain a resin composition (RC) excellent in heat resistance and optical properties as an end product of this invention.

(Other Diol Component)

The diol component (a) may contain a compound of the following formula (1) (to be referred to as "diol component (a')" hereinafter),

HO—R$^9$—OH         (i)

wherein R$^9$ is a divalent substituent containing a hydrocarbon group. In the formula (1), the divalent substituent containing a hydrocarbon group, represented by R$^9$, can be any divalent substituent so long as it contains a hydrocarbon group such as a C$_{1-30}$ hydrocarbon group, and it may be a divalent hydrocarbon group or may be a divalent substituent to which a hydrocarbon group is bonded.

A hydrocarbon corresponding to the divalent hydrocarbon group is preferably an alkane, a cycloalkane, an arene and a hydrocarbon group to which any one of these groups is bonded.

The alkane is preferably a C$_{1-10}$ alkane, more preferably a C$_{2-6}$ alkane. Specifically, it includes methane, ethane, propane, butane and the like. The cycloalkane is preferably a C$_{4-10}$ cycloalkane, more preferably a C$_{5-8}$ cycloalkane. Specifically, it includes cyclopentane, cyclohexane and the like. The arene is preferably a C$_{6-15}$ arene, more preferably C$_{6-10}$ arene. Specifically, it includes benzene and the like.

Hydrocarbon groups to which these groups are bonded include a dialkylcycloalkane, a dialkylarene, an arylarene, an arylalkane, a diarylalkane, a diarylcycloalkane, a bis(arylaryl)alkane, a diaralkylarene and the like.

The dialkylcycloalkane is preferably a diC$_{1-4}$alkylC$_{5-8}$cycloalkane. Specifically, it includes dimethylcyclohexanes such as 1,4-dimethylcyclohexane. The dialkylarene is preferably a diC$_{1-4}$alkylC$_{6-10}$arene such as xylene (p-xylene or the like). The arylarene is preferably C$_{6-10}$arylC$_{6-10}$arene such as biphenyl. The diarylalkane is preferably a diC$_{6-10}$arylC$_{1-10}$alkane such as diphenylmethane, 2,2-diphenylethane, 2,2-diphenylpropane, 2,2-diphenylbutane or the like, more preferably a diphenylC$_{1-6}$alkane.

The diarylcycloalkane is preferably diC$_{6-10}$arylC$_{5-8}$cycloalkane such as 1,1-diphenylcyclohexane or the like. The bis(arylaryl)alkane is preferably a bis(C$_{6-10}$arylC$_{6-10}$aryl)C$_{1-4}$alkane such as 2,2-bis(3-biphenylyl)propane or the like. The diaralkylarene is preferably di(C$_{6-10}$aryl-C$_{1-6}$alkyl)C$_{6-10}$arene such as 1,3-di[2-(2-phenylpropyl)]benzene or the like, more preferably di(phenyl-C$_{1-4}$alkyl)benzene.

In the divalent substituent to which a hydrocarbon group is bonded, the hydrocarbon includes the above-described hydrocarbons. The hydrocarbon group may be bonded directly or may be bonded through a group containing a heteroatom such as a nitrogen atom, an oxygen atom, a sulfur atom or the like. The group containing a heteroatom includes oxygen-atom-containing groups such as an ether group (—O—), a carbonyl group, an ester group, etc., nitrogen-atom-containing groups such as an imino group, an amide group, etc., and sulfur-ion-containing groups such as a thio group (—S—), a sulfinyl group, a sulfonyl group, etc.

Typical examples of the compound corresponding to the divalent substituent to which a hydrocarbon group is bonded include the following compounds.

(i) Diaryl ethers: diC$_{6-10}$ aryl ether such as diphenyl ether, preferably, diC$_{6-8}$ aryl ether.

(ii) Diaryl sulfides: diC$_{6-10}$ aryl sulfide such as diphenyl sulfide, preferably, diC$_{6-8}$ aryl sulfide.

(iii) Diaryl sulfoxides: $diC_{6-10}$ aryl sulfoxide such as diphenyl sulfoxide, preferably, $diC_{6-8}$ aryl sulfoxide.

(iv) Diaryl sulfones: $diC_{6-10}$ aryl sulfone such as diphenyl sulfone, preferably, $diC_{6-8}$ aryl sulfone.

The divalent substituent containing a hydrocarbon may have a substituent. This substituent includes substituents similar to those described in the definition of $R^{1a}$ and $R^{1b}$ on the compound of the formula (1). This substituent preferably includes $C_{1-6}$ alkyl groups such as methyl, ethyl, isopropyl, tert-butyl, etc., preferably $C_{1-4}$ alkyl groups, (ii) $C_{5-8}$ cycloalkyl groups such as cyclohexyl, (iii) $C_{6-8}$ aryl groups such as phenyl and (iv) halogen atoms such as a fluorine atom, a chlorine atom and a bromine atom.

The divalent substituent containing a hydrocarbon group may have a single substituent or may have two or more substituents in combination.

The diol component (a') includes an aliphatic diol, an alicyclic diol and an aromatic diol.

The aliphatic diol is preferably $C_{1-10}$ alkane diol, more preferably $C_{2-6}$ alkane diol. Specifically, it includes ethylene glycol, 1,2-propanediol, 1,3-propanediol, 1,4-butanediol, 1,2-butanediol, 1,3-butanediol, 1,4-pentanediol, 1,5-pentanediol, 1,3-pentanediol, neopentyl glycol and 1,6-hexanediol.

The aliphatic diol compound is preferably di(hydroxy$C_{1-4}$ alkyl)$C_{5-8}$cycloalkane. Specifically, it includes cyclopentanedimethanol and cyclohexanedimethanol.

The aromatic diol compound is preferably an aromatic aliphatic diol, bisphenol or the like. The aromatic aliphatic diol includes di(hydroxy$C_{1-4}$alkyl)$C_{6-10}$arene such as 1,4-benzenedimethanol and 1,3-benzenedimethanol.

Examples of the bisphenol include the following compounds.

Di(hydroxy$C_{6-10}$arenes) such as 4,4'-dihydroxybiphenyl, bis(hydroxyphenyl) $C_{1-15}$alkanes such as bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 2,2-bis(4-hydroxy-3-isopropylphenyl)propane, 2,2-bis(3-tert-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dibromo-4-hydroxyphenyl)propane, 2,2-bis(3,5-dichloro-4-hydroxyphenyl)propane, 2,2-bis(3,5-dimethyl-4-hydroxyphenyl)propane, 2,2-bis(3-cyclohexyl-4-hydroxyphenyl)propane, 2,2-bis(4-hydroxyphenyl)hexafluoropropane, bis(4-hydroxyphenyl)diphenylmethane, etc., preferably bis(hydroxyphenyl)$C_{1-8}$alkanes, bis(hydroxybiphenylyl)$C_{1-10}$ alkanes such as 2,2-bis(4-hydroxy-3,3'-biphenyl)propane, preferably bis(hydroxybiphenylyl)$C_{1-8}$ alkanes, bis(hydroxyphenyl)$C_{5-10}$cycloalkanes such as 1,1-bis(4-hydroxyphenyl)-3,3,5-trimethylcyclohexane, 1,1-bis(3-cyclohexyl-4-hydroxyphenyl)cyclohexane, 1,1-bis(4-hydroxyphenyl)cyclohexane and 1,1-bis(4-hydroxyphenyl)cyclopentane, preferably bis(hydroxyphenyl)$C_{5-8}$ cycloalkanes, 4,4'-dihydroxydiphenyl ether, 4,4'-dihydroxy-3,3'-dimethyldiphenyl ether, 4,4'-dihydroxydiphenyl sulfone, 4,4'-dihydroxy-3,3'-dimethyldiphenyl sulfone, 4,4'-dihydroxy-3,3'-diphenyldiphenyl sulfone, 4,4'-dihydroxydiphenyl sulfoxide, 4,4'-dihydroxy-3,3'-dimethyldiphenyl sulfoxide, 4,4'-dihydroxy-3,3'-diphenyldiphenyl sulfoxide, 4,4'-dihydroxydiphenyl sulfide, 4,4'-dihydroxy-3,3'-dimethyldiphenyl sulfide, 4,4'-dihydroxy-3,3'-diphenyldiphenyl sulfide, and bis(hydroxyphenyl-$C_{1-4}$alkyl)$C_{6-10}$ arenes such as 4,4'-(m-phenylenediisopropylidene)diphenol, 4,4'-(o-phenylenediisopropylidene)diphenol and 4,4'-(p-phenylenediisopropylidene)diphenol, preferably, bis(hydroxyphenyl-$C_{1-4}$alkyl) benzene.

For the diol component (a'), the above compounds may be used singly, or two or more compounds of them may be used in combination.

As a diol component (a'), aliphatic diols such as ethylene glycol and $C_{2-4}$ alkane diols like 1,4-butanediol are preferred, and ethylene glycol is particularly preferred from the viewpoint of optical properties and heat resistance of the polyester resin.

Therefore, the diol component (a) preferably contains a compound of the formula (1) and an aliphatic diol.

(Dicarboxylic Acid Component)

The dicarboxylic acid component includes a dicarboxylic acid and an ester-forming dicarboxylic acid derivative. The dicarboxylic acid component may be a single compound or a combination of two or more compounds.

The dicarboxylic acid includes, for example, a dicarboxylic acid of the following general formula (c-1).

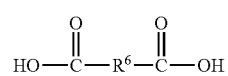

(c-1)

wherein $R^6$ represents a single bond or a divalent substituent containing a hydrocarbon group. The divalent hydrocarbon group represented by $R^6$ includes an alkylene group, an alkylidene group, an alicyclic hydrocarbon group, a crosslinked cyclic hydrocarbon group, an arylene group, an aromatic rings-combined hydrocarbon group.

The alkylene group is preferably a $C_{1-15}$ alkylene group, more preferably a $C_{1-10}$ alkylene group. Specifically, it includes a methylene group, an ethylene group, a trimethylene group, a tetramethylene group, a pentamethylene group, a hexamethylene group and a heptamethylene group.

The alkylidene group is preferably a $C_{1-15}$ alkylidene group, more preferably a $C_{1-10}$ alkylidene group. Specifically, it includes an ethylidene group, a propylidene group and a pentylidene group.

The alicyclic hydrocarbon group is preferably a $C_{4-10}$ cycloalkylene group, more preferably a $C_{5-10}$ cycloalkylene group. Specifically, it includes cyclohexylene groups such as a 1,4-cyclohexylene group.

The crosslinked cyclic hydrocarbon group is preferably a divalent group (diyl group) corresponding to a $C_{4-15}$ dicycloalkane or a $C_{4-15}$ tricycloalkane, more preferably a divalent group (diyl group) corresponding to a $C_{6-10}$ dicycloalkane or a $C_{6-10}$ tricycloalkane. Specifically, the $C_{4-15}$ dicycloalkane or $C_{4-15}$ tricycloalkane includes decalin, norbornane, adamantane and tricyclodecane.

The arylene group is preferably a $C_{6-15}$ arylene group, more preferably a $C_{6-10}$arylene group. Specifically, it includes a phenylene group, naphthalenediyl group, phenathrenediyl group and anthracenediyl group.

Examples of the aromatic rings-combined hydrocarbon group include divalent groups corresponding to $C_{6-10}$aryl $C_{6-10}$arenes such as biphenyl.

The divalent substituent containing a hydrocarbon group, represented by $R^6$, can be any divalent substituent so long as it at least contains a hydrocarbon group, and it may be a divalent hydrocarbon group (e.g., a $C_{1-20}$ hydrocarbon group) or may be a divalent substituent to which a hydrocarbon group is bonded. In the divalent substituent to which a hydrocarbon group is bonded, the hydrocarbon group includes the above-described hydrocarbons. The hydrocarbon group may be bonded by a single bond or may be bonded through a group containing a heteroatom (a nitrogen atom, an oxygen atom, a sulfur atom or the like). The group containing a heteroatom includes oxygen-atom-containing groups such as an ether group (—O—), a carbonyl group, an ester group, etc., nitrogen-atom-containing groups such as an imino group, an amide group, etc., and sulfur-atom-containing groups such as a thio group (—S—), a sulfinyl group, a sulfonyl group, etc.

The divalent substituent containing a hydrocarbon group may have a substituent. This substituent includes substituents that are same as those described in the definition of $R^{2a}$ and $R^{2b}$ on the compound of the formula (1).

The dicarboxylic acid of the formula (c-1) includes an aliphatic dicarboxylic acid, an alicyclic dicarboxylic acid and an aromatic dicarboxylic acid.

The aliphatic dicarboxylic acid includes an alkane dicarboxylic acid and an alkene dicarboxylic acid. The alkane dicarboxylic acid includes oxalic acid, a malonic acid, succinic acid, glutaric acid, adipic acid, pimelic acid, suberic acid, azelaic acid, sebacic acid, methylmalonic acid and ethyl malonic acid. The alkene dicarboxylic acid includes maleic acid and fumaric acid.

The alicyclic dicarboxylic acid includes cycloalkane dicarboxylic acid. The cycloalkane dicarboxylic acid includes di- or tricycloalkane dicarboxylic acid. The cycloalkane dicarboxylic acid includes cyclohexane dicarboxylic acid, decalin dicarboxylic acid, norbornane dicarboxylic acid, admantane dicarboxylic acid and tricyclodecane dicarboxylic acid.

The aromatic dicarboxylic acid includes arene dicarboxylic acid and biphenyl dicarboxylic acid. The arene dicarboxylic acid includes terephthalic acid, isophthalic acid, phthalic acid, 2,6-naphthalene dicarboxylic acid, 1,8-naphthalene dicarboxylic acid, anthracene dicarboxylic acid and phenanthrene dicarboxylic acid. The biphenyl dicarboxylic acid includes 2,2'-biphenyl dicarboxylic acid.

These dicarboxylic acids may be used singly or a combination of two or more of these may be used. Of these, the alicyclic dicarboxylic acid is preferred in view of optical properties and heat resistance.

Above all, cyclohexane dicarboxylic acid and decalin dicarboxylic acid are preferred, and cyclohexane dicarboxylic acid is further preferred since it is less expensive and industrially easily available. The content of the alicyclic dicarboxylic acid in the total dicarboxylic acid content is preferably 30 to 100 mol %, more preferably 50 to 100 mol %, still more preferably 70 to 100 mol %. When the alicyclic dicarboxylic acid is used in the ratio of the above content, heat resistance and optical properties such as the birefringence of a molded article such as a lens can be efficiently improved.

The dicarboxylic acid derivative includes a dicarboxylic acid chloride of the following formula (c-2), a dicarboxylic ester of the following formula (C-3) and a dicarboxylic acid anhydride of the following formula (C-4).

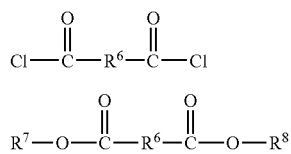

(c-2)

(c-3)

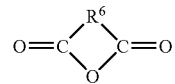

(c-4)

In the formulae (c-2) to (c-4), $R^6$ is as defined in the formula (c-1) and each of $R^7$ and $R^8$ represents a substituent containing a hydrocarbon group.

In the formula (c-3), the substituent containing a hydrocarbon group, represented by each of $R^7$ and $R^8$, includes monovalent substituents corresponding to $R^6$. Each of $R^7$ and $R^8$ is preferably alkyl or aryl. The alkyl group is preferably $C_{1-4}$ alkyl, more preferably $C_{1-2}$ alkyl. Specifically, each of $R^7$ and $R^8$ is methyl, ethyl, phenyl or the like.

The dicarboxylic acid chloride represented by the formula (c-2) includes aliphatic dicarboxylic acid chloride, alicyclic dicarboxylic acid chloride and aromatic dicarboxylic acid chloride.

The aliphatic dicarboxylic acid chloride includes alkane dicarboxylic acid chlorides such as oxalic acid dichloride, malonic acid dichloride, succinic acid dichloride, glutaric acid dichloride, adipic acid dichloride, pimelic acid dichloride, suberic acid dichloride, azelaic acid dichloride and sebacic acid dichloride.

The alicyclic dicarboxylic acid chloride includes cycloalkane dicarboxylic acid chlorides such as cyclohexane dicarboxylic acid dichloride, decalin dicarboxylic acid chloride, norbornane dicarboxylic acid dichloride, adamantane dicarboxylic acid dichloride and tricyclodecane dicarboxylic acid dichloride. The cycloalkane dicarboxylic acid includes not only a monocyclic compound but also a di- or tricycloalkane dicarboxylic acid.

The aromatic dicarboxylic acid chloride includes arene dicarboxylic acid dichlorides such as terephthalic acid dichloride, isophthalic acid dichloride, phthalic acid dichloride, 2,6-naphthalene dicarboxylic acid dichloride, 1,8-naphthalene dicarboxylic acid dichloride, anthracene dicarboxylic acid dichloride, phenanthrene dicarboxylic acid dichloride and biphenyl dicarboxylic acid dichloride.

The dicarboxylic ester of the formula (c-3) includes alkyl or aryl ester of aliphatic dicarboxylic acid, alkyl or aryl ester of alicyclic dicarboxylic acid and alkyl or aryl ester of aromatic dicarboxylic acid.

The aliphatic dicarboxylic acid includes alkane dicarboxylic acid and alkene dicarboxylic acid. The alicyclic dicarboxylic acid includes cycloalkane dicarboxylic acid. The aromatic dicarboxylic acid includes arene dicarboxylic acid.

The alkyl or aryl ester of alkane dicarboxylic acid includes dimethyl oxalate, diethyl oxalate, dimethyl malonate, diethyl malonate, dimethyl succinate, diethyl succinate, dimethyl glutarate, diethyl glutarate, dimethyl adipate, diethyl adipate, dimethyl pimelate, diethyl pimelate, dimethyl suberate, diethyl suberate, dimethyl azelate, diethyl azelate, dimethyl sebacate, diethyl sebacate, diphenyl oxalate, diphenyl malonate, diphenyl succinate, diphenyl glutarate, diphenyl adipate, diphenyl pimelate, diphenyl suberate, diphenyl azelate and diphenyl sebacate.

The alkyl or aryl ester of alkene dicarboxylic acid includes dimethyl maleate, diethyl maleate, dimethyl fumarate, diethyl fumarate, diphenyl maleate and diphenyl fumarate.

The alkyl or aryl ester of cycloalkane dicarboxylic acid includes dimethyl cyclohexane dicarboxylate, diethyl cyclohexane dicarboxylate, diphenyl cyclohexane dicarboxylate, dimethyl decalin dicarboxylate, diethyl decalin dicarboxylate, diphenyl decalin dicarboxylate, dimethyl norbornane dicarboxylate, diethyl norbornane dicarboxylate, diphenyl norbornane dicarboxylate, dimethyl adamantane dicarboxylate, diethyl adamantane dicarboxylate, diphenyl adamantane dicarboxylate, dimethyl tricyclodecane dicarboxylate, diethyl tricyclodecane dicarboxylate and diphenyl tricyclodecane dicarboxylate.

The alkyl or aryl ester of arene dicarboxylic acid includes dimethyl terephthalate, diethyl terephthalate, diphenyl terephthalate, dimethyl isophthalate, diethyl isophthalate, diphenyl isophthalate, dimethyl phthalate, diethyl phthalate, diphenyl phthalate, dimethyl 2,6-naphthalene dicarboxylate, diethyl 2,6-naphthalene dicarboxylate, diphenyl 2,6-naphthalene dicarboxylate, dimethyl 1,8-naphthalene dicarboxylate, diethyl 1,8-naphthalene dicarboxylate, diphenyl 1,8-naphthalene dicarboxylate, dimethyl anthracene dicarboxylate, diethyl anthracene dicarboxylate, diphenyl anthracene dicarboxylate, dimethyl phenanthrene dicarboxylate, diethyl phenanthrene dicarboxylate and diphenyl phenanthrene dicarboxylate. Further, it also includes alkyl or aryl esters of biphenyl dicarboxylic acid such as dimethyl 2,2'-biphenyl dicarboxylate, diethyl 2,2'-biphenyl dicarboxylate and diphenyl 2,2'-biphenyl dicarboxylate.

The dicarboxylic anhydride of the formula (c-4) includes alkene dicarboxylic anhydrides such as maleic anhydride and arene dicarboxylic anhydrides such as phthalic anhydride.

These ester-forming dicarboxylic acid derivatives may be used singly, or two or more compounds of these may be used in combination. Further, they may be used in combination with the foregoing dicarboxylic acids. In view of optical properties and heat resistance of a polyester resin obtained, the dicarboxylic acid derivative preferably contains alicyclic dicarboxylic acid derivative such as alicyclic dicarboxylic acid chloride, alicyclic dicarboxylic ester or the like. Of these, cyclohexane dicarboxylic acid derivatives such as dimethyl cyclohexane dicarboxylate and decalin dicarboxylic acid derivatives such as dimethyl decalin dicarboxylate are preferred, and alkyl cyclohexane dicarboxylate esters such as dimethyl cyclohexane dicarboxylate are preferred. The content of the alicyclic dicarboxylic acid derivative in the total dicarboxylic acid derivative content is preferably 30 to 100 mol %, more preferably 50 to 100 mol %, still more preferably 70 to 100 mol %. When the alicyclic dicarboxylic acid is used in the ratio of the above content, heat resistance and optical properties such as the birefringence of a molded article such as a lens can be efficiently improved.

The dicarboxylic acid component is preferably constituted of an alicyclic dicarboxylic acid component in view of optical properties and heat resistance as described already. In this case, the alicyclic dicarboxylic acid preferably includes an alicyclic dicarboxylic acid and alicyclic dicarboxylic acid derivatives such as an alicyclic dicarboxylic acid chloride and an alicyclic dicarboxylic ester. When an alicyclic dicarboxylic acid component is contained, the content of the alicyclic dicarboxylic acid component in the total dicarboxylic acid content is preferably 20 to 100 mol % (e.g., 30 to 99%), more preferably 30 to 100 mol % (e.g., 40 to 98 mol %), still more preferably 50 to 100 mol % (e.g., 60 to 95 mol %), further more preferably 70 to 100 mol %.

The purity of the dicarboxylic acid and the ester-forming dicarboxylic acid derivative which can be used as raw materials for the polyester resin is at least 95% (e.g., 95 to 100%), preferably at least 98% (e.g., 98 to 100%). When the purity of the above raw materials is low, not only it is difficult to produce the polyester resin by polymerization, but also the polyester resin obtained may be sometimes degraded in optical properties.

The number average molecular weight of the polyester resin is 3,000 to 100,000, preferably 5,000 to 50,000, more preferably 8,000 to 30,000, still more preferably 10,000 to 20,000. When the above number average molecular weight is small, a resin composition is fragile and a molded article is sometimes easily broken. When the number average molecular weight is large, the resin composition (RC) has low melt-flowability and is sometimes poor in moldability. The number average molecular weight can be determined by a known measurement method such as size exclusion chromatography, a vapor pressure osmosis method or the like.

(Production of Polyester Resin)

The polyester resin can be produced from the above dicarboxylic acid component and the diol component (a) containing the compound of the formula (1) as raw materials by a known method such as a melt-polymerization method including an ester exchange method, a direct polymerization method, etc., a solution polymerization method, an interfacial polymerization method or the like. Of these, a melt-polymerization method using no reaction solvent is preferred.

The ester exchange method included in the melt-polymerization method is a method for obtaining a polyester by reacting a dicarboxylic ester and a diol compound in the presence of a catalyst and carrying out ester exchange while a formed alcohol is distilled off, and this method is generally used for the synthesis of a polyester.

Further, the direct polymerization method is a method for obtaining a polyester by carrying out a dehydrating reaction of a dicarboxylic acid with a diol compound to form an ester compound and then carrying out ester exchange while an excess diol compound is distilled off under reduced pressure. The direct polymerization method is advantageous in that there is no alcohol that is to be distilled off unlike the ester exchange method and that a less expensive dicarboxylic acid can be used as a raw material.

When these melt-polymerization methods are carried out, known techniques can be employed with regard to polymerization conditions such as a polymerization catalyst species, a catalyst amount, a temperature, etc., and additives such as a thermal stabilizer, an etherification preventing agent, a catalyst deactivator, etc.

<Polycarbonate Resin>

The polycarbonate resin is formed from a carbonate-forming component and a diol component (b).

(Diol Component (b))

The diol component (b) is required only to contain a compound of the formula (1) and/or a compound of the formula (2), and it may contain other diol component.

The compound of the formula (1) is as explained with regard to the polyester resin.

The diol component (b) preferably contains a compound of the formula (2). Particularly preferably, it contains a compound of the formula (2) wherein each of p1 and p2 is 1 or 2 and each of $R^{4a}$ and $R^{4b}$ is a hydrogen atom or $C_{1-4}$ alkyl.

In the formula (2), the positions on which hydroxyl groups are substituted are the same as those on which the substituents containing a hydroxyl group each are positioned in the formula (1). They can be selected from the 2 to 6 positions on phenyl groups substituted on the 9 position of the fluorene, and they are preferably the 2 positions or 4 positions, more preferably the 4 positions.

$R^{4a}$ and $R^{4b}$ are the same as $R^{2a}$ and $R^{2b}$ in the formula (1). Each of $R^{4a}$ and $R^{4b}$ is hence a hydrogen atom, alkyl, cycloalkyl, aryl, aralkyl, alkenyl, a halogen atom or the like. Each of $R^{4a}$ and $R^{4b}$ is preferably a hydrogen atom or $C_{1-6}$ alkyl, more preferably hydrogen atom or $C_{1-4}$ alkyl. Concerning $R^{4a}$ (or $R^{4b}$), a single substituent or a combination of two or more substituents may be substituted on a benzene ring. $R^{4a}$ and $R^{4b}$ may be the same as, or different from, each other (one another). The position on which $R^{4a}$ (or $R^{4b}$) is substituted is not specially limited, and substituent(s) represented by $R^{4a}$ (or $R^{4b}$) can be substituted on proper position(s) on 2 to 6 positions the phenyl group depending upon the number p1 (or p2) of substituents. Each of the numbers p1 and p2 of substituents is preferably an integer of 1 to 3, more preferably an integer of 1 or 2. The numbers p1 and p2 of substituents may be the same as, or different from, each other.

$R^{5a}$ and $R^{5b}$ are the same as $R^{3a}$ and $R^{3b}$ in the formula (1). Each of them is hence preferably a hydrogen atom or alkyl. $R^{5a}$ and $R^{5b}$ are the same as, or different from, each other. Substituents represented by $R^{5a}$ (or $R^{5b}$) on one benzene ring may be the same as, or different from, each other or one another. In addition, the bonding position(s) (substitution position(s)) of substituent(s) represented by $R^{5a}$ (or $R^{5b}$) on the benzene ring constituting the fluorene skeleton is (are) not specially limited. Each of the numbers q1 and q2 of substituents is preferably 1 or 2. The numbers q1 and q2 of substituents may be the same as, or different from, each other.

Examples of the compound of the formula (2) include 9,9-bis(hydroxyphenyl)fluorenes shown below.

9,9-bis(4-hydroxyphenyl)fluorene, 9,9-bis(hydroxyl-mono$C_{1-6}$alkylphenyl)fluorenes such as 9,9-bis(4-hydroxy-3-methylphenyl)fluorene, 9,9-bis(2-hydroxy-5-methylphenyl)fluorene, 9,9-bis(4-hydroxy-3-ethylphenyl)fluorene, 9,9-bis(4-hydroxy-3-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-isobutylphenyl)fluorene, etc., 9,9-bis(hydroxy-di$C_{1-6}$alkylphenyl)fluorenes such as 9,9-bis(4-hydroxy-3,5-dimethylphenyl)fluorene, 9,9-bis(4-hydroxy-2,5-dimethylphenyl)fluorene, 9,9-bis(4-hydroxy-3,5-diethylphenyl)fluorene, 9,9-bis(4-hydroxy-3,5-dipropylphenyl)fluorene, 9,9-bis(4-hydroxy-3,5-diisopropylphenyl)fluorene, 9,9-bis(4-hydroxy-3,5-di-n-butylphenyl)fluorene, 9,9-bis(4-hydroxy-3,5-diisobutylphenyl)fluorene, etc., 9,9-bis(hydroxy-mono$C_{5-8}$cycloalkylphenyl)fluorenes such as 9,9-bis(4-hydroxy-3-cyclohexylphenyl)fluorene, etc., 9,9-bis(hydroxy-mono$C_{6-8}$arylphenyl)fluorenes such as 9,9-bis(4-hydroxy-3-phenylphenyl)fluorene, etc., 9,9-bis(hydroxy-di$_{6-8}$arylphenyl)fluorenes such as 9,9-bis(4-hydroxy-3,5-diphenylphenyl)fluorene, etc., 9,9-bis[hydroxy-mono($C_{6-8}$aryl$C_{1-4}$alkyl)phenyl]fluorenes such as 9,9-bis(4-hydroxy-3-benzylphenyl)fluorene, etc., 9,9-bis[hydroxy-di($C_{6-8}$aryl$C_{1-4}$alkyl)phenyl]fluorenes such as 9,9-bis(4-hydroxy-3,5-dibenzylphenyl)fluorene, etc., 9,9-bis(hydroxy-mono$C_{2-4}$alkenylphenyl)fluorenes such as 9,9-bis(4-hydroxy-3-propenylphenyl)fluorene, etc., and 9,9-bis(hydroxyl-monohalophenyl)fluorenes such as 9,9-bis(4-hydroxy-3-fluorophenyl)fluorene.

Of these, 9,9-bis(hydroxyphenyl)fluorene and 9,9-bis(hydroxyl-mono$C_{1-6}$alkylphenyl)fluorenes are preferred, and 9,9-bis(hydroxyl-mono$C_{1-6}$alkylphenyl)fluorenes {9,9-bis(4-hydroxyl-3-methylphenyl)fluorene} etc., are particularly preferred.

Compounds represented by the formula (2) can be used singly, or two or more compounds of them can be used in combination.

The compound of the formula (2) can be obtained by reacting fluorenones (9-fluorenone, etc.) with corresponding phenols. For example, 9,9-bis(4-hydroxyphenyl)fluorene can be obtained, for example, by a reaction between a phenol and 9-fluorenone.

(Other Diol Component)

The diol component (b) may contain other diol component (to be referred to as "diol component (b')" hereinafter). The diol component (b') includes same compounds with those described with regard to the diol component (a').

That is, examples of the diol component (b') include the following bisphenols.

bis(hydroxyphenyl)$C_{1-4}$alkanes such as 1,1-bis(4-hydroxyphenyl)-1-phenylethane, 2,2-bis(4-hydroxyphenyl)propane, 2,2-bis(4-hydroxy-3-methylphenyl)propane, 2,2-bis(3,5-dibromo-4-hydroxyphenyl)propane, etc., bis(hydroxyphenyl)$C_{5-8}$cycloalkanes such as 1,1-bis(4-hydroxyphenyl)cyclohexane, 1,1-bis(4-hydroxyphenyl)-3,3,5-trimethylcyclohexane, etc., 4,4'-dihydroxydiphenylsulfone, 4,4'-dihydroxy-3,3'-dimethyldiphenylsulfone, and bis(hydroxyphenyl-$C_{1-4}$alkyl)benzenes such as 4,4'-(m-phenylenediisopropylidene)diphenol, etc.

Of these, bis(hydroxyphenyl)alkanes and bis(hydroxyphenyl-alkyl)arenas are preferred, bis(hydroxyphenyl)$C_{1-4}$alkanes such as 2,2-bis(4-hydroxyphenyl)propane and bis(hydroxyphenyl-$C_{1-4}$alkyl)benzenes are particularly preferred, and 2,2-bis(4-hydroxyphenyl)propane (bisphenol A) is the most preferred.

The diol component (b) preferably contains a compound of the formula (1) and/or a compound of the formula (2) and a bisphenol.

The total content of the compound of the formula (1) and the compound of the formula (2) in the diol component (b) is preferably 10 mol % or more, more preferably 20 mol % or more, still more preferably 30 mol % or more. Specifically, it is preferably 15 to 100 mol %, more preferably 25 to 80 mol %, still more preferably 35 to 75 mol %. The diol component (b') accounts for the rest.

When the content of the compounds of the formulae (1) and (2) is too small, the refractive index of a polycarbonate resin obtained is sometimes decreased, the birefringence thereof is sometimes increased or the heat resistance thereof is sometimes decreased.

(Carbonate-Forming Component)

The carbonate-forming component refers to a compound capable of forming a carbonate bond. Such a carbonate-forming component includes phosgenes and carbonates.

The phosgenes include phosgene, diphosgene and triphosgene. The carbonates include dialkyl carbonates such as dimethyl carbonate, diethyl carbonate, etc., and diaryl carbonates such as diphenyl carbonate, dinaphthyl carbonate, etc. of these, a phosgene and a diphenyl carbonate are preferably used. The above compounds as carbonate-forming components may be used singly, or two or more compounds of them may be used in combination.

The number average molecular weight of the polycarbonate resin is preferably 3,000 to 100,000, more preferably 5,000 to 50,000, still more preferably 10,000 to 30,000, further more preferably 12,000 to 25,000. When the above number average molecular weight is small, a resin composition is fragile and a molded article is sometimes easily broken. When the above number average molecular weight is large, a resin composition has low melt-flowability and is sometimes poor in moldability. The number average molecular weight can be determined by a known measurement method such as size exclusion chromatography, a vapor pressure osmosis method or the like.

(Production of Polycarbonate Resin)

The polycarbonate resin can be produced by a known method of producing a general polycarbonate resin. For example, in a reaction using phosgene as a carbonate-forming component, generally, the diol component (b) and phosgene are allowed to react in the presence of an alkali compound such as a hydroxide (sodium hydroxide or potassium hydroxide) and a solvent such as methylene chloride or chlorobenzene. For promoting the above reaction, for example, a catalyst such as a tertiary amine or quaternary ammonium salt can be also used.

When a carbonate diester such as diphenyl carbonate or the like is used as a carbonate precursor, a diol compound and the carbonate diester are allowed to react under heat in an inert gas atmosphere while a formed alcohol or phenols are distilled off. For promoting the above reaction, generally, a catalyst for use in an ester exchange reaction can be also used.

The polycarbonate resin may contain a monohydric phenol generally used as a terminal stopper in the polymerization for the production thereof. When a monohydric phenol is used as a terminal stopper, the terminal is blocked with a group derived from the monohydric phenol, and the polycarbonate is excellent in thermal stability.

Resin Composition (RC)

The resin composition (RC) of this invention has resistances such as heat resistance and excellent optical properties such as a high refractive index and low birefringence since the polymer skeletons of the polyester resin and the polycarbonate resin have a fluorene skeleton (9,9-bisphenylfluorene skeleton) each. The resin composition (RC) can be made to be a composition having optional preferred optical properties, heat resistance and environmental resistance by adjusting the content of the fluorene skeletons contained in the polyester resin and the polycarbonate resin, the molecular weight of these resins and the weight ratio of the polyester resin and the polycarbonate resin as required.

In the resin composition (RC), when the weight ratio of the compound of the formula (1) introduced into the polyester resin is A, when the weight ratio of the compound of the formula (1) and the compound of the formula (2) introduced into the polycarbonate resin is B and when the weigh ratio of the polyester resin to the entire composition is p, preferably, the weight ratios A, B and p satisfy the following expression, $$0.1 \leq A \times p + B \times (1-p) < 1$$

wherein each of A, B and p is a value that is greater than 0 but smaller than 1.

In the above expression, the weight ratios A, B and p more preferably satisfy the expression of $0.2 \leq = A \times p + B \times (1-p) < 1$, and the weight ratios A, B and p more preferably satisfy the expression of $0.4 \leq A \times p + B \times (1-p) < 1$. When $A \times p + B \times (1-p)$ is too small, the optical properties such as high refractivity and low birefringence are sometimes not exhibited.

In the resin composition (RC) of this invention, preferably, the polyester resin/polycarbonate resin ratio (weight ratio) is 5/95 to 98/2. The above ratio is more preferably 15/85 to 98/2, still more preferably 30/70 to 98/2. When the weight ratio of the polyester resin is smaller, the resin composition is excellent in optical properties, heat resistance and environmental resistance, while the moldability thereof may be sometimes a problem. When the weight ratio of the polyester resin is too large, the resin composition is excellent in optical properties and moldability, while the heat resistance and environmental resistance may be sometimes problems.

The number average molecular weight of the resin composition (RC) is 5,000 to 50,000, preferably 8,000 to 30,000, more preferably 10,000 to 25,000, still more preferably 11,000 to 20,000. When the above number average molecular weight is smaller, the resin is fragile and a molded article is liable to easily break. When the number average molecular weight is larger, undesirably, the resin has very low melt-flowability and is hence poor in moldability. The number average molecular weight of the resin composition (RC) can be suitably adjusted depending upon the number average molecular weights of the polyester resin and the polycarbonate resin and the mixing ratio thereof.

The number average molecular weight of each of the polyester resin and the polycarbonate resin in the resin composition (RC) is preferably 5,000 to 50,000.

The number average molecular weight can be determined by a known measurement method such as size exclusion chromatography, a vapor pressure osmosis method or the like.

The resin composition (RC) is excellent in moldability. The melt flow rate (MFR) of the resin composition (RC) is preferably 1 to 80 g/10 minutes, more preferably 2 to 60 g/10 minutes, still more preferably 3 to 50 g/10 minutes. In addition, MFR can be measured, for example, under conditions of 280° C. and a load of 1.2 kg according to JIS K-7210.

The glass transition temperature (Tg) of the resin composition (RC) is preferably 50 to 250° C., more preferably 80 to 220° C., still more preferably 100 to 200° C.

Preferably, the polyester resin is formed from a $C_{5-10}$ cycloalkane dicarboxylic acid and a diol component (a) containing a compound of the formula (1) wherein each of $R^{1a}$ and $R^{1b}$ is an ethylene group, each of k1 and k2 is 1, each of $R^{2a}$, $R^{2b}$, $R^{3a}$ and $R^{3b}$ is a hydrogen atom, $C_{1-4}$ alkyl or phenyl and each of m1, m2, n1 and n2 is 1 or 2 (to be referred to as "compound a-1" hereinafter) a $C_{2-4}$ alkanediol and 1,4-dimethylenecycloalkylene (to be referred to as "compound a-2" hereinafter), and the polycarbonate resin is formed from a carbonate-forming component and a diol component (b) containing a compound of the formula (2) wherein each of $R^{4a}$, $R^{4b}$, $R^{5a}$ and $R^{5b}$ is a hydrogen atom, methyl or ethyl and each of p1, p2, q1 and q2 is 1 or 2 (to be referred to as "compound b-1" hereinafter) and at least one bisphenol (to be referred to as "compound b-2" hereinafter) selected from bis(hydroxyphenyl)$C_{1-4}$ alkane or bis(hydroxyphenyl-$C_{1-3}$ alkylidene) benzene.

In the above case, preferably, the content of the compound a-1 in the diol component (a) is 10 to 100 mol % and the content of the compound a-2 therein is 0 to 90 mol %. Further, preferably, the content of the compound b-1 in the diol component (b) is 10 to 100 mol % and the content of the compound b-2 therein is 0 to 90 mol %. The polyester resin/polycarbonate resin ratio (weight ratio) is preferably 5/95 to 98/2.

Further, preferably, the polyester resin is formed from a cyclohexanedicarboxylic acid and a diol component (a) containing a compound of the following formula (3) (to be referred to as "compound a-3" hereinafter) and a $C_{2-4}$ alkane diol (to be referred to as "compound a-4" hereinafter) and the polycarbonate resin is formed from a carbonate-forming component and a diol component (b) containing a compound of the following formula (4) (to be referred to as "compound b-3" hereinafter) and 2,2-bis(4-hydroxyphenyl)propane or 4,4'-(m-phenylenediisopropylidene)diphenol (to be referred to as "compound b-4" hereinafter).

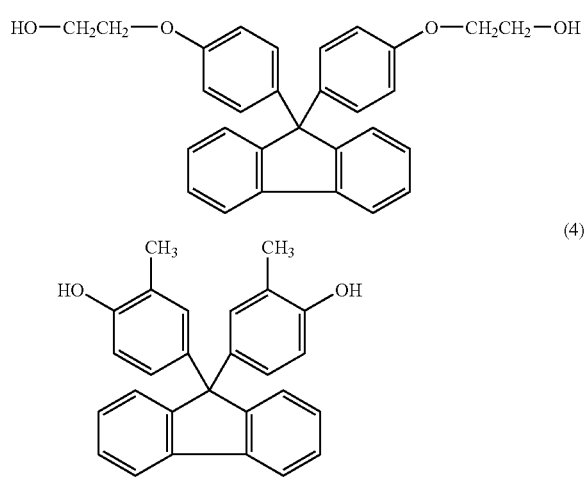

(3)

(4)

In the above case, preferably, the content of the compound a-3 in the diol component (a) is 10 to 100 mol % and the content of the compound a-4 therein is 0 to 90 mol %. Further, preferably, the content of the compound b-3 in the diol component (b) is 10 to 100 mol % and the content of the compound b-4 therein is 0 to 90 mol %. The polyester resin/polycarbonate resin ratio (weight ratio) is preferably 5/95 to 98/2.

Preferably, the resin composition (RC) contains a polyester resin and a polycarbonate resin, the polyester resin containing 10 to 100 mol % of a recurring unit of the following formula (A-1) and 0 to 90 mol % of a recurring unit of the following formula (A-2) and having a number average molecular weight of 5,000 to 50,000, and the polycarbonate resin containing 10 to 100 mol % of a recurring unit of the following formula (B-1) and 0 to 90 mol % of a recurring unit of the following formula (B-2) and having a number average molecular weight of 5,000 to 50,000.

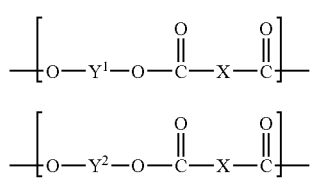

(A-1)

(A-2)

wherein $Y^1$ represents the following formula,

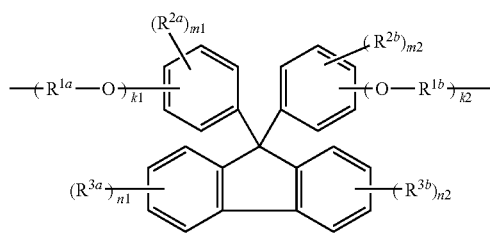

in which $R^{1a}$ and $R^{1b}$ represent the same or different $C_{2-10}$ alkylene groups, each of $R^{2a}$, $R^{2b}$, $R^{3a}$ and $R^{3b}$ is the same or different each other and is a hydrogen atom, a $C_{1-10}$ hydrocarbon group or a halogen atom, k1 and k2 represent the same or different integers of 1 to 4 and each of m1, m2, n1 and n2 represent the same or different integers of 1 to 4, X represents a divalent $C_{1-15}$ hydrocarbon group and $Y^2$ represents a divalent $C_{1-10}$ hydrocarbon group,

(B-1)

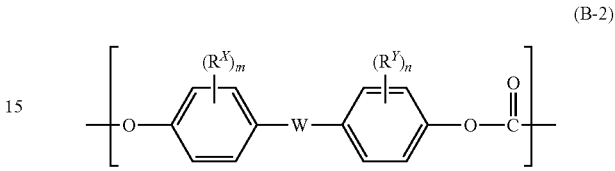

(B-2)

wherein Z represents the following formula,

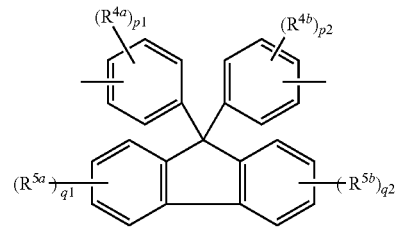

in which each of $R^{4a}$, $R^{4b}$, $R^{5a}$ and $R^{5b}$ is the same as, or different from, each other and a hydrogen atom, $C_{1-10}$ alkyl or a halogen atom and each of p1, p2, q1 and q2 is the same or different integers of 1 to 4, W is a single bond, a $C_{1-10}$ alkylidene group, a $C_{4-15}$ cycloalkylidene group, a sulfonyl group, a sulfide group, an oxide group or a di($C_{1-4}$ alkylidene)phenylene group, each of $R^x$ and $R^Y$ is the same as, or different from, each other and a hydrogen atom, a halogen atom, phenyl or $C_{1-4}$ alkyl, and each of m and n is independently an integer of 1 to 4.

In the formulae (A-1) and (A-2), X is preferably a $C_{4-15}$ substituted or non-substituted alicyclic hydrocarbon group.

In the formula represented by $Y^1$ in the formula (A-1), preferably, $R^{1a}$ and $R^{1b}$ are the same or different $C_{2-4}$ alkylene groups, each of $R^{2a}$, $R^{2b}$, $R^{3a}$ and $R^{3b}$ is same or different each other and a hydrogen atom or a $C_{1-6}$ hydrocarbon group, k1 and k2 are the same or different integers of 1 to 4 and m1, m2, n1 and n2 are the same or different integers of 1 or 2.

In the formula (A-2), $Y^2$ is preferably a $C_{2-6}$ alkylene group or a $C_{6-12}$ cycloalkylene group.

In the formula represented by Z in the formula (B-1), preferably, each of $R^{4a}$, $R^{4b}$, $R^{5a}$ and $R^{5b}$ is same or different each other and a hydrogen atom or $C_{1-4}$ alkyl and each of p1, p2, q1 and q2 is same or different an integer of 1 or 2. In the formula (B-2), preferably, each of $R^x$ and $R^Y$ is same or different a hydrogen atom or $C_{1-4}$ alkyl, and each of m and n is independently an integer of 1 or 2.

In the formula (B-2), preferably, W is a single bond, a $C_{1-6}$ alkylidene group, a $C_{5-10}$ cycloalkylidene group or a di($C_{1-3}$ alkylidene)phenylene group.

Preferably, in the formula represented by $Y^1$ in the formula (A-1), $R^{1a}$ and $R^{1b}$ are ethylene groups, each of $R^{2a}$, $R^{2b}$, $R^{3a}$ and $R^{3b}$ is same or different each other and a hydrogen atom, $C_{1-4}$ alkyl or phenyl, each of k1 and k2 is 1 and each of m1, m2, n1 and n2 is same or different 1 or 2, in the formula (A-2), $Y^2$ is a $C_{2-4}$ alkylene group or

and X is a $C_{5-10}$ cycloalkylene group, in the formula represented by Z in the formula (B-1), each of $R^{4a}$, $R^{4b}$ $R^{5a}$ and $R^{5b}$ is same or different each other and a hydrogen atom, methyl or ethyl and each of p1, p2, q1 and q2 is same or different 1 or 2, and in the formula (B-2), W is a single bond, a $C_{1-4}$ alkylidene group, a $C_{6-9}$ cycloalkylidene group or a di($C_{1-3}$ alkylidene)phenylene group and $R^x$ and $R^Y$ are hydrogen atoms.

Preferably, in the formula represented by $Y^1$ in the formula (A-1), $R^{1a}$ and $R^{1b}$ are ethylene groups, $R^{2a}$, $R^{2b}$, $R^{3a}$ and $R^{3b}$ are hydrogen atoms and each of k1 and k2 is 1, in the formula (A-2), $Y^2$ is a $C_{2-4}$ alkylene group and X is a cycloalkylene group, in the formula represented by Z in the formula (B-1), each of $R^{4a}$ and $R^{4b}$ is methyl, $R^{5a}$ and $R^{5b}$ are hydrogen atoms and each of p1 and p2 is 1, and in the formula (B-2), W is an isopropylidene group or

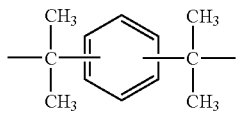

and $R^x$ and $R^Y$ are hydrogen atoms.

Preferably, the polyester resin contains 20 to 100 mol % of the recurring unit of the formula (A-1) and 0 to 80 mol % of the recurring unit of the formula (A-2), and the polycarbonate resin contains 20 to 100 mol % of the recurring unit of the formula (B-1) and 0 to 80 mol % of the recurring unit of the formula (B-2).

Preferably, the polyester resin contains 50 to 100 mol % of the recurring unit of the formula (A-1) and 0 to 50 mol % of the recurring unit of the formula (A-2), and the polycarbonate resin contains 30 to 100 mol % of the recurring unit of the formula (B-1) and 0 to 70 mol % of the recurring unit of the formula (B-2).

Preferably, the polyester resin/polycarbonate resin ratio (weight ratio) is 15/85 to 98/2.

More preferably, the polyester resin/polycarbonate resin ratio (weight ratio) is 20/80 to 98/2.

When the weight ratio of the unit of —O—$Y^1$—O— introduced into the polyester resin is A', when the weight ratio of the unit of —O—Z—O— and the unit of —O—$Y^1$—O— introduced into the polycarbonate resin is B' and when the weigh ratio of the polyester resin to the entire composition is p, preferably, the weight ratios A', B' and p satisfy the following expression, $$0.1 \leq A' \times p + B' \times (1-p) < 1$$

wherein each of A', B' and p is a value that is greater than 0 but smaller than 1.

The resin composition (RC) of this invention may contain an antioxidant, a heat stabilizer, an ultraviolet absorbent, a mold release agent, a flame retardant, a bluing agent, a fluorescent whitener, etc., as required.

As an antioxidant, a thermal stabilizer, an ultraviolet absorbent and a mold release agent, there can be used those which are described in JP 2005-42021A or the like. For example, the antioxidant includes a phenol-containing antioxidant, a phosphorus-containing antioxidant and a sulfur-containing antioxidant. Of these, a phenol-containing antioxidant is preferred, and an alkyl-substituted phenol-containing antioxidant is particularly preferred. Specifically, examples of the antioxidant include 1,6-hexanediol-bis[3-(3,5-di-tert-butyl-4-hydroxyphenyl)propionate], pentaerythritol-tetrakis [3-(3,5-di-tert-butyl-4-hydroxyphenyl)propionate] and octadecyl-3-(3,5-di-tert-butyl-4-hydroxyphenyl)propionate.

These antioxidants may be used singly, or two or more compounds of these may be used in combination. The content of the antioxidant in the entire resin composition (RC) can be, for example, approximately 0.0001 to 0.05% by weight.

The thermal stabilizer is preferably a phosphorus-containing stabilizer, and examples of such a stabilizer include a phosphite compound, a phosphonite compound and a phosphate compound. Examples of the phosphite compound include triphenyl phosphite, trisnonylphenyl phosphite, tris (2,4-di-tert-butylphenyl)phosphite, bis(2,6-di-tert-butyl-4-methylphenyl)pentaerythritol diphosphite, bis(nonylphenyl) pentaerythritol diphosphite and bis(2,4-di-tert-butylphenyl) pentaerythritol diphosphite.

Examples of the phosphate compound include trimethyl phosphate, tricresyl phosphate and triphenyl phosphate.

The phosphonite compound includes tetrakis(2,4-di-tert-butylphenyl)-4-4'-biphenylenediphosphonite.

Of these, tris(2,4-di-tert-butylphenyl)phosphite, triphenyl phosphate and trimethyl phosphate are preferred.

These thermal stabilizers may be used singly, or two or more compounds of these may be used in combination. The content of the thermal stabilizer in the entire resin composition (RC) can be, for example, 0.001 to 0.5% by weight, preferably in the range of approximately 0.005 to 0.3% by weight.

The ultraviolet absorbent includes a benzophenone ultraviolet absorbent, a benzotriazole ultraviolet absorbent, a triazine ultraviolet absorbent, a benzoxazine ultraviolet absorbent and a phenyl salicylate ester ultraviolet absorbent.

The benzophenone ultraviolet absorbent includes 2-hydroxy-4-methoxybenzophenone, 2-hydroxy-4-n-octoxybenzophenone and 2,2'-dihydroxy-4-methoxybenzophenone, and of these, 2-hydroxy-4-n-octoxybenzophenone is preferred.

The benzotriazole ultraviolet absorbent includes, for example, 2-(2'-hydroxy-5'-methylphenyl)benzotriazole, 2-(2'-hydroxy-3'-(3,4,5,6-tetrahydrophthalimidemethyl)-5'-methylphenyl)benzotriazole, 2-(2'-hydroxy-3',5'-di-tert-butylphenyl)benzotriazole, 2-(2'-hydroxy-5'-tert-octylphenyl) benzotriazole and 2-(3'-tert-butyl-5'-methyl-2'-hydroxyphenyl)-5-chlorobenzotriazole. Of these, 2-(2'-hydroxy-5'-tert-octylphenyl)benzotriazole is preferred.

The triazine ultraviolet absorbent includes TINUVIN 400 and TINUVIN 1577 (supplied by Ciba Specialty Chemicals K.K.). Of these, TINUVIN 400 is preferred.

The benzoxazine ultraviolet absorbent includes 2,2'-p-phenylenebis(3,1-benzoxazin-4-one).

The phenyl salicylate ester ultraviolet absorbent includes p-tert-butylphenyl salicylate ester and p-octylphenyl salicylate ester.

The above ultraviolet absorbents may be used singly, or two or more compounds of them may be used in combination. The content of the ultraviolet absorbent in the entire resin composition (RC) is, for example, 0.01 to 5% by weight, preferably approximately 0.02 to 3% by weight, and particularly preferably, it can be approximately 0.05 to 2% by weight. When the above content is less than 0.01% by weight, the ultraviolet absorbing capability is sometimes insufficient. When it exceeds 5% by weight, undesirably, the resin is sometimes degraded in hue.

The mold release agent includes a silicone oil and a higher fatty acid ester of a monohydric or polyhydric alcohol, and it is preferably a partial ester or whole ester of a monohydric or polyhydric alcohol having 1 to 20 carbon atoms and a saturated fatty acid having 10 to 30 carbon atoms. Examples of the above mold release agent include stearic acid monoglyceride, stearic acid monosorbitate, behenic acid monoglyceride, pentaerythritol monostearate and pentaerythritol tetrastearate. Of these, stearic acid monoglyceride and pentaerythritol tetrastearate are preferred. The above mold release agents may be used alone, or two or more compounds of them may be used in combination.

The content of the mold release agent in the entire resin composition (RC) is, for example, 0.01 to 2% by weight, and it may be preferably 0.015 to 0.5% by weight, more preferably 0.02 to 0.2% by weight. When the content thereof is in the above range, desirably, the resin composition (RC) is excellent in mold releasability and the mold release agent does not contaminate a mold.

The flame retardant includes a halogen-containing flame retardant, a phosphorus-containing flame retardant, an inorganic flame retardant, a silicone-containing flame retardant and a sulfonate-containing flame retardant. Examples of the halogen-containing flame retardant include a tetrabromobisphenol A derivative, a tetrabromobisphenol S derivative, hexabromobenzene, decabromodiphenyl ether, decabromodiphenyl ethane, hexabromocyclododecane, polystyrene bromide and polyolefin chloride. These exhibit a more improved flame-retarding effect when used in combination with antimony trioxide.

Examples of the phosphorus-containing flame-retardant compound include ammonium phosphate, melamine phosphate, red phosphorus, triphenyl phosphate, tri(β-chloroethyl) phosphate, tri(dichloropropyl) phosphate, tri(dibromopropyl) phosphate, resorcinol bisdiphenyl phosphate and bisphenol A bisdiphenyl phosphate.

Examples of the inorganic flame retardant include aluminum hydroxide, magnesium hydroxide, zirconium hydroxide, calcium hydroxide, barium hydroxide, basic magnesium carbonate, doromite, a hydrate of tin oxide, borax, zinc borate, zinc carbonate, magnesium-calcium carbonate, barium carbonate, magnesium oxide and expandable graphite.

Examples of the silicone-containing flame retardant include modified polydimethylsiloxane, modified polymethylphenylsiloxane and a silicone resin. Examples of the sulfonate-containing flame retardant include potassium perfluorobutanesulfonate, sodium perfluorobutanesulfonate and potassium diphenylsulfone-3,3'-disulfonate.

The above flame retardants may be used singly, or two or more compounds of these may be used in combination.

Examples of the bluing agent include MACROLEX VIOLET supplied by Bayer AG, DIA RESIN VIOLET and DIA RESIN BLUE supplied by Mitsubishi Chemical Corporation, and Terazol Blue supplied by Sandoz Ltd., and MACROREX VIOLET is preferred. These bluing agents may be used singly, or two or more agents of these may be used in combination. The bluing agent is used, for example, in such an amount that the concentration thereof based on the above resin composition is approximately 0.1 to 3 ppm, preferably 0.3 to 1.5 ppm, more preferably 0.3 to 1.2 ppm.

The fluorescent whitener is not specially limited so long as it can be used for improving the color tone of a synthetic resin, etc., so that the color tone may become white or bluish white. Examples thereof include a stilbene compound, a benzimidazole compound, a naphthalimide compound, a rhodamine compound, a coumarin compound and an oxazine compound. These fluorescent whiteners may be used singly, or two or more compounds of these may be used in combination.

The resin composition (RC) of this invention may contain a small amount of additives such as a colorant, an antistatic agent, an anti-fungus agent, a lubricant, a filler, etc., so long as the object of this invention is not impaired.

These additives may be added when the resin composition (RC) of this invention is prepared from the polycarbonate resin and the polyester resin, or they may be added to the polycarbonate resin and/or the polyester resin beforehand.

(Production of Resin Composition (RC))

The resin composition (RC) of this invention can be produced by blending the polyester resin and the polycarbonate resin.

The blending method includes a solution blending method using a solvent and a melt-blending method. The solution blending method includes, for example, a method in which the polyester resin, the polycarbonate resin and optional additive(s) to be added as required are dissolved in a solvent capable of dissolving them, they are uniformly mixed, foreign matter is removed by filtration as required, this mixture is poured into a solvent in which the polyester resin and the polycarbonate resin are insoluble, to recover a composition, and the composition is dried to obtain an intended composition.

In the melt-blending, the composition can be obtained by melt-blending (melt-kneading) components that are to constitute the composition, after they are mixed as required.

In the solution blending, a composition having little thermal history can be obtained. However, a large amount of a solvent is used for the composition, so that a residual solvent in the composition may sometimes cause a problem. Being free of the solvent problem and also economically advantageous, the melt-blending method can be preferably used as a method for producing the resin composition of this invention.

This invention therefore includes a process for producing a composition, which comprises melt-blending the polyester resin formed from the dicarboxylic acid component and the diol component (a) containing the compound of the formula (1) and the polycarbonate resin formed from the carbonate-forming component and the diol component (b) containing the compound of the formula (1) and/or the compound of the formula (2).

As a typical melt-blending process, there may be employed a constitution in which the polyester resin, the polycarbonate resin and optional additive(s) to be added as required are fully mixed with a pre-mixing means such as a V-blender, a Henschel mixer, a mechanochemical apparatus or an extrusion mixer and the pre-mixed materials are granulated with an extrusion granulating machine or a briquetting machine as required, then followed by melt-kneading with a melt-kneader typified by a vent type twin-screw extruder and pelletization with a machine such as a pelletizer.

In the melt-blending method, portions of the components and additive(s) may be pre-mixed and then the pre-mixture may be fed to a melt-kneader independently of the remaining components. The method for pre-mixing some portions of the components includes, for example, a method in which additives (a phosphorus stabilizer, an antioxidant, etc.) are pre-mixed with the polyester resin (or polycarbonate resin) when the polyester resin (or polycarbonate resin) is produced by a melting method and then pellets are formed. When the polyester resin or the polycarbonate resin has the form of a powder, there may be also employed a method in which part of the powder is blended with additive(s) to be incorporated, to prepare a master batch of the additive(s) diluted with the powder. In addition, when the additives to be incorporated include an additive having a liquid form, there can be used a so-called a liquid-injecting or liquid-adding apparatus for feeding it into a melt-extruder.

As an extruder, there can be suitably used an extruder having a vent capable of discharging water in raw materials and a volatile gas generated from a melt-kneaded resin. The vent is preferably equipped with a vacuum pump for efficiently discharging generated water and volatile gas from the extruder. Further, a screen for removing foreign mater included in raw materials to be extruded may be provided in a zone before an extrusion die portion, and in this case, foreign matter in the resin composition can be removed. The above screen includes a woven metal wire, a screen changer and a sintered metal plate.

When the glass transition temperature of the resin composition (RC) to be obtained is Tg, the resin temperature during their melt-kneading is preferably between Tg+50° C. and Tg+250° C., more preferably between Tg+80° C. and Tg+200° C.

The glass transition temperature Tg of the resin composition (RC) can be estimated on the basis of the following expression in which T1 is a glass transition temperature Tg of the polyester resin to constitute the composition, T2 is the Tg of the polycarbonate resin and q is a weight ratio of the polyester resin to the composition. There may be employed a constitution in which the so-estimated Tg is used to set the resin temperature during the melt-kneading of the polyester resin and the polycarbonate resin and they are melt-kneaded.

$$T1 \times q + T2 \times (1-q)$$

wherein q is a value greater than 0 but smaller than 1.

(Molded Article)

The resin composition (RC) of this invention has high moldability and can give molded articles according to a known molding method such as an injection molding method, an injection compression molding method, an extrusion molding method, a transfer molding method, a blow molding method, a press molding method, a casting molding method or the like. When the resin composition (RC) has a glass transition temperature Tg, the resin temperature during the molding thereof is preferably between Tg+80° C. and Tg+250° C., more preferably between Tg+100° C. and Tg+200° C.

The resin composition (RC) of this invention exhibits excellent optical properties such as a high refractive index and low birefringence and further has environmental resistances such as heat resistance and humidity resistance and moldability, since each of the polyester resin and the polycarbonate resin has a fluorene skeleton.

The refractive index of the molded article of this invention is preferably 1.55 or more, more preferably 1.60 or more, still more preferably 1.605 or more. More specifically, it is preferably 1.59 to 1.7, more preferably 1.60 to 1.65, still more preferably 1.605 to 1.63.

Further, the light transmittance (light transmittance L1) of the molded article of this invention under the condition of a thickness of 2 mm is preferably 70% or more, more preferably 75% or more, still more preferably 80%. More specifically, it is preferably 70 to 99%, more preferably 75 to 95%, still more preferably 80 to 90%.

Further, when the light transmittance is L1 and when the molded article has a light transmittance of L2 after treated under the condition of a thickness of 2 mm under a constant-temperature and constant-humidity environment having a temperature of 85° C. and a humidity of 85% for 640 hours, the light transmittance difference L1-L2 is preferably 10% or less, more preferably 5% or less, still more preferably 3% or less. Specifically, it is preferably 0 to 8%, more preferably 0.1 to 4%, still more preferably 0.3 to 2%. The molded article therefor has an advantage that its optical properties are maintained at a high level even after it is treated under high-temperature high-humidity conditions for a long period of time.

<Lens>

In recent years, plastic lenses have been and are used as optical lenses for lenses for digital cameras, lenses for CCD cameras, and the like. Resins having fluorene skeletons are developed as materials for these lenses (see JP 11-14801A, JP 7-198901A, JP 2000-119379A, JP 6-25398A, etc).

With downsizing of optical lenses and diversification of use environments, there are demanded resin materials that have excellent optical properties such as a high refractive index and low birefringence and that are excellent in moldability, heat resistance and environmental resistance.

It is therefore an object of this invention to provide a lens having high resistances with regard to heat resistance and environmental resistance and excellent optical properties such as a high refractive index and low birefringence, and a process for the production thereof.

The present inventors have found that when the resin composition (RC) of this invention is used for forming a lens, there can be obtained a lens having high resistances with regard to heat resistance, humidity resistance, environmental resistance, etc., and having excellent optical properties.

That is, this invention includes a lens formed of the resin composition (RC). The resin composition (RC) is formed from the polyester resin and the polycarbonate resin as described already.

At least 20 mol % of the diol component (a) to form the polyester resin in the resin composition (RC) for constituting the lens is preferably the compound of the formula (1).

Further, at least 20 mol % of the diol component (b) to form the polycarbonate resin in the resin composition (RC) for constituting the lens is preferably the compound of the formula (1) and/or the compound of the formula (2).

In the lens, when the weight ratio of the compound of the formula (1) introduced into the polyester resin is A, when the weight ratio of the compound of the formula (1) and the compound of the formula (2) introduced into the polycarbonate resin is B and when the weigh ratio of the polyester resin to the entire composition is p, preferably, the weight ratios A, B and p satisfy the following expression, $$0.2 \leq A \times p + B \times (1-p) < 1$$

wherein each of A, B and p is a value that is greater than 0 but smaller than 1.

In the above expression, the weight ratios A, B and p more preferably satisfy the expression of $0.4 \leq A \times p + B \times (1-p) < 1$.

In the lens, the polyester resin/polycarbonate resin ratio (weight ratio) is preferably 10/90 to 80/20, more preferably 15/85 to 80/20, still more preferably 20/80 to 80/20.

In the lens, the number average molecular weight of the resin composition (RC) is preferably 5,000 to 50,000, more preferably 8,000 to 30,000, still more preferably approximately 11,000 to 20,000.

The glass transition temperature (Tg) of the resin composition (RC) to be used for the lens is preferably 100 to 270° C., more preferably 125 to 250° C., still more preferably 130 to 220° C., further more preferably 140 to 210° C., the most preferably 150 to 200° C. The resin composition having such a high glass transition temperature can be prepared by adjusting weight ratio of the compound of the formula (1) and/or the compound of the formula (2) and the like as required. Being remarkably excellent in heat resistance, the lens of this invention is useful in optical fields where high heat resistance is required.

Further, the lens of this invention is excellent in optical properties. The refractive index of the lens of this invention is preferably 1.59 to 1.7, more preferably 1.60 to 1.65, still more preferably 1.602 to 1.64, further more preferably 1.605 to 1.63.

In the lens of this invention, therefore, the glass transition temperature of the resin composition (RC) is 100° C. or higher and the refractive index of the lens is 1.59 to 1.7.

In the lens of this invention, preferably, the refractive index of each of the polyester resin and the polycarbonate resin is 1.59 to 1.7.

The refractive index of the polyester resin and the refractive index of the polycarbonate resin are preferably 1.60 to 1.65 each, more preferably 1.602 to 1.64 each, still more preferably 1.605 to 1.63. The refractive index (d ray) can be measured, for example, by measuring a 100 μm thick film (e.g., a cast film) at a measurement light wavelength of d ray (588 nm) under the condition of a measurement temperature of 25° C.

Further, the Abbe's number of the lens of this invention is preferably 18 to 40, more preferably 19 to 35, still more preferably 20 to 32, further more preferably 21 to 30.

Further, the photoelastic coefficient of the lens of this invention is preferably $25 \times 10^{-12}$ to $55 \times 10^{-12}$ $Pa^{-1}$, more preferably $30 \times 10^{-12}$ to $48 \times 10^{-12}$ $Pa^{-1}$, still more preferably $35 \times 10^{-12}$ to $44 \times 10^{-12}$ $Pa^{-1}$, further more preferably $36 \times 10^{-12}$ to $42 \times 10^{-12}$ $Pa^{-1}$. When the photoelastic coefficient is too large, the birefringence of the plastic lens can increase.

The light transmittance (light transmittance L1) of the lens of this invention under the conditions of a thickness of 2 mm is preferably 70 to 99%, more preferably 75 to 95%, still more preferably 80 to 90%. Further, when the light transmittance is L1 and when the lens has a light transmittance of L2 after treated under the condition of a thickness of 2 mm under a constant-temperature and constant-humidity environment having a temperature of 85° C. and a humidity of 85% for 640 hours, the light transmittance difference L1-L2 is preferably 0 to 8%, more preferably 0.1 to 4%, still more preferably 0.3 to 2%, so that the optical properties are maintained at a high level even after the lens is treated under high-temperature high-humidity conditions for a long period of time.

Since the lens of this invention is constituted of the resin composition (RC) containing the polyester resin and the polycarbonate resin which have fluorene skeletons, the lens has high resistances with regard to heat resistance, environmental resistance, etc., and has excellent optical properties such as a high refractive index and low birefringence. Further, the lens of this invention not only has excellent optical properties but also has high productivity by molding.

(Production of Lens)

(Method for Producing a Lens)

The lens of this invention can be produced by blending the polyester resin formed from the dicarboxylic acid component and the diol component (a) containing the compound of the formula (1) and the polycarbonate resin formed from the carbonate-forming component and the diol component (b) containing the compound of the formula (1) and/or the compound of the formula (2) and molding the resultant blend.

As a method for producing the lens, a method known per se can be employed. Specifically, the lens can be produced by any one of various molding methods such as the methods of injection molding method, compression molding, extrusion molding, injection compression molding and the like. Injection molding and injection compression molding are preferred. When the glass transition temperature of the resin composition (RC) is Tg, the molding temperature in the molding is preferably between (Tg+50)° C. and (Tg+250)° C., more preferably between approximately (Tg+80)° C. and (Tg+200° C.). The resin composition (RC) that is melt-blended can be used for the lens production by molding. Further, the mold temperature during the molding is, for example, between (Tg−100)° C. and Tg° C., preferably between approximately (Tg−80)° C. and (Tg−5)° C.

(Use Field of Lens)

The lens of this invention is excellent in optical properties such as a high refractive index and low birefringence and is also excellent in heat resistance, environmental resistance and processability productivity by molding, so that it can be suitably used as an optical lens.

Such lenses can be used in various optical fields of office automation machines and equipment, photographs, electronic-electric machines and equipment, astronomical machines and equipment, automobiles, medical treatment, illumination, ophthalmic lenses and the like.

In particular, the lens of this invention is remarkably useful as a lens for constituting an image-sensing (or photograph-taking) lens such as a lens for a digital camera, a lens for a cellphone camera, a lens for an in-vehicle camera or the like.

The lens of this invention can be used as a variety of lens molded articles. Such a lens molded articles may be constituted of the lens of this invention alone or a lens unit may be constituted of the lens of this invention and a lens formed of other resin depending upon a use. For example, the lens of this invention can be combined with a lens formed of a resin having a high Abbe's number to form a lenses unit, in particular a lens unit for taking photographs.

Specifically, the lens unit may be a lens unit constituted of a resin composition (1) and the resin composition (RC) of this invention which has a smaller Abbe's number than the resin composition (1). The Abbe's number of the resin composition (1) may be, for example, 50 to 70, preferably 54 to 65, more preferably 55 to 62.

Examples of the above resin composition (1) having a high Abbe's number include olefin resins: for example, (i) methylpentene resins such as poly(4-methylpentene-1), etc., (ii) homopolymers or copolymers of cycloolefin monomers such as dicyclopentadiene, norbornene, tetracyclododecene, etc., and (iii) copolymers (trade name "ZEONEX" supplied by ZEON CORPORATION, etc.) of cycloolefin monomers and copolymerizable monomers such as $\alpha$-$C_{2-10}$ olefin, etc., and acryl resins: for example, as polymethyl methacrylate. Cycloolefin-based resins are particularly preferred.

When a lens having a high Abbe's number and the lens of this invention having a low Abbe's number are combined, even if the resolving power is increased to the level of mega-pixel, the chromatic aberration can be efficiently suppressed (offset) and both low birefringence and heat resistance can be satisfied at the same time, so that a lens unit of remarkably high practical use can be obtained.

The above lens unit can be used in an image-sensing lens that is required to have high resolving power such as a lens for a digital camera, a lens for the camera of a cellphone, a lens for an in-vehicle camera, or the like. The lens(es) of this invention can hence constitute these lens unit.

The lens unit can be formed, for example, by placing a film (or sheet) formed of a resin having a high Abbe's number in a mold and injecting a molten resin composition (RC) into the mold. Further, the lens unit can be also formed by attaching a film (or sheet) formed of a resin having a high Abbe's number and a film (or sheet) formed of the resin composition (RC) to each other.

<Infrared Absorbing Filter>

An infrared absorbing filter formed of a plastic has been proposed as a substitute for a near infrared absorbing filter formed of heavy and easily breakable glass.

For example, JP 11-116826A discloses a film obtained by dispersing a dye in a polyester prepared by copolymerization with a diol having a fluorene skeleton.

Further, JP 2000-227515A discloses an infrared absorbing filter obtained by dispersing an infrared-absorbing dye in a binder resin such as a polyester resin.

Further, Japanese Patent No. 3308545 discloses a multi-layered infrared absorbing film containing an infrared absorbing film formed by dispersing a dye having infrared absorbing capability such as a phthalocyanine metal complex in a transparent polymer resin.

However, these resins are poor in the capability of uniformly dispersing a high concentration of an infrared absorbing dye, and infrared absorbing filters obtained are also poor in durability, so that binder resins having higher capabilities are demanded.

It is therefore another object of this invention to provide an infrared absorbing filter that uniformly contains a high concentration of a dye having infrared absorbing capability, in particular near infrared absorbing capability, and that has excellent durability. It is yet another object of this invention to provide an infrared absorbing panel having an infrared absorbing filter.

The present inventors have found that the resin composition (RC) of this invention containing a dye having infrared absorbing capability can uniformly contain a high concentration of the infrared absorbing dye or can have it uniformly dispersed therein without causing any aggregation of the dye or any self-reaction of the dye and can stably keep the infrared absorbing dye without causing any deterioration thereof for a long period of time, and this invention has been accordingly completed.

This invention includes the resin composition (RC) containing a dye having infrared absorbing capability.

The resin composition (RC) of this invention containing a dye having infrared absorbing capability can be used as a material for an infrared absorbing filter.

The infrared absorbing filter of this invention uniformly contains a high concentration of a dye and has excellent durability.

(Dye Having Infrared Absorbing Capability)

The dye having infrared absorbing capability has only to be a dye having absorption (an absorption region) at least in an infrared region, in particular at least in a near infrared region (e.g., approximately 850 to 1,100 nm). Examples of the above dye include the following dyes.

(i) Polymethine dyes: polymethine, cyanine, azurenium, pyrylium, squarylium, croconium, etc.

(ii) Phthalocyanine dyes: phthalocyanine compounds, etc.

(iii) Metal chelate dyes: indoaniline chelate, indonaphthol chelate, azo chelate, dithiol dyes, etc.

(iv) Aminium dyes.

(v) Imonium dyes: immonium and diimmonium dyes, etc.

(vi) Quinone dyes: anthraquinone compounds, naphthoquinone compounds, etc.

(vii) Triphenylmethane dyes.

Of these infrared absorbing dyes, phthalocyanine dyes, dithiol dyes (dithiolene dyes) and diimmonium dyes are preferred.

(Phthalocyanine Dyes)

The phthalocyanine dyes include, for example, a compound of the following formula (5).

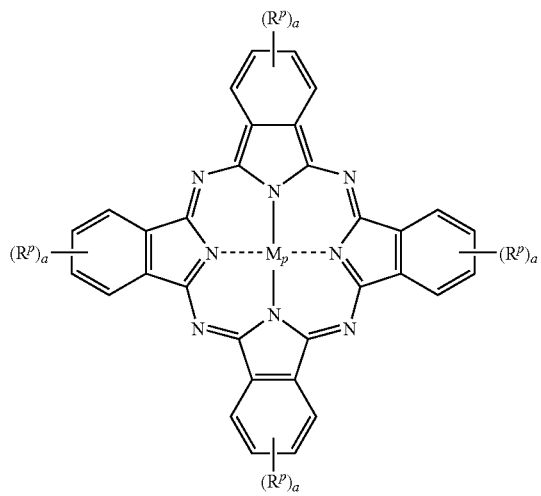

(5)

wherein each of substituents $R^P$ is the same or different each other and represents a halogen atom, alkyl group, alkoxy group, aryl group, aryloxy group, aralkyl group, an amino group, an amide group, an imide group or arylthio group and may have a substituent, adjacent substituents $R^P$ may form a ring, a is an integer of 0 to 4, and Mp is a hydrogen atom, a metal atom having a valence of 2 to 6 or an oxide thereof and its valence may be balanced with counter anion.

Substituents represented by $R^P$ in the above formula (5) are as follows. The halogen atom includes a fluorine atom, a chlorine atom, a bromine atom and an iodine atom.

The alkyl includes a $C_{1-20}$ alkyl group such as methyl, tert-butyl, tert-amyl (1,1-dimethylpropyl), trifluoromethyl, etc., preferably a $C_{3-10}$ alkyl group. The alkoxy includes an alkoxy group which corresponds to the above alkyl group, such as a $C_{1-20}$ alkoxy group, preferably a $C_{3-10}$ alkoxy group such as butoxy. The aryl includes a $C_{6-10}$ aryl group, preferably a $C_{6-8}$ aryl group such as phenyl. The aryloxy includes an aryloxy group which corresponds to the above aryl group, such as a $C_{6-10}$ aryloxy group, preferably a $C_{6-8}$ aryloxy group such as phenoxy. The aralkyl includes a $C_{6-10}$ aryl-$C_{3-4}$ alkyl group, preferably a $C_{6-8}$ aryl-$C_{1-2}$ alkyl group such as benzyl. The amino group includes a mono- or di-$C_{1-10}$ alkylamino group such as amino, dimethyl amino, etc., preferably a mono- or di-$C_{1-4}$ alkylamino group and an alkylideneamino group such as octadecanylideneamino group (—NH═CH—$C_{17}H_{35}$) The amide group includes an acylamide group, an acetamide group, etc., and the imide group includes a methylphthalimide group. The arylthio group includes a $C_{6-10}$ arylthio group, preferably a $C_{6-8}$ arylthio group such as phenylthio, p-methylphenylthio, etc. Adjacent substituents represented by $R^P$ may form a ring, for example, an arene ring such as a benzene ring or a hydrocarbon ring such as a cycloalkane ring, and such a ring may have a substituent like any substituent above, such as alkyl. A single substituent $R^P$ or a combination of substituents $R^P$ may be substituted as $R^P$. The position on which the substituent $R^P$ is substituted is not specially limited and the position may be any one of 3 to 6 positions on a benzene ring.

In the above formula (5), examples of the metal atom represented by Mp include alkaline earth metals (Mg, etc.), metals under the group 13 of the periodic table (Al, etc.), metals under the group 14 of the periodic table (Si, Ge, Sn, Pb, etc.), transition metals (Ti, V, Cr, Mn, Fe, Co, Ni, Cu, Zn, Pd, Rh, etc.) and the like.

Examples of the counter anion (group to balance the valence) include hydroxyl, halide ions (chlorine ion, bromide ion, iodide ion, etc.), trialkylsilyloxy groups (tri-$C_{1-10}$ alkylsilyloxy groups such as trihexylsilyloxy), metal acid ions (hexafluoroantimonate ion ($SbF_6^-$), etc.) and inorganic acid ions (halogen acid ions such as perchlorate ion, phosphorus-containing ions such as hexafluorophosphate ion ($PF_6^-$) and boron-containing ions such as tetrafluoroborate ion ($BF_4^-$)).

The following Table 1 shows typical phthalocyanine dyes of the above formula (5) with using combinations of $M_p$, $R^P$, a and a counter anion. In Table 1, "H" stands for a hydrogen atom, "F" stands for a fluorine atom and "Cl" stands for a chlorine atom.

TABLE 1

| $M_P$ | $R^P$ | a | Counter anion |
|---|---|---|---|
| H | — | 0 | — |
| H | t-butyl | 1 | — |
| Cu | F | 4 | — |
| Ti | — | 0 | — |
| Pb | — | 0 | — |
| Cu | 2 phenylthios and 2 F's | 4 | — |
| Ni | t-butyl | 1 | — |
| Cu | $(CH_3)_2CCH_2C(CH_3)_2$ | 2 | — |
| Mn | t-butyl | 1 | — |
| Cu | Dimethylamino | 1 | — |
| H | t-butyl, dimethylamino | 2 | — |
| Cu | Dimethylamino | 2 | — |
| TiO | 2 phenylthios and 2 F's | 4 | — |
| VO | —NH=CH—$C_{17}H_{35}$ | 1 | — |
| Al | Amino | 1 | Trihexylsilyloxy |
| Al | t-butyl | 1 | Hydroxyl |
| VO | t-butyl | 1 | — |
| Rh | t-butyl | 1 | Chloride ion |
| Al | Cl | 4 | Chloride ion |
| Si | — | 0 | Trihexylsilyloxy |
| Si | Amino | 1 | Tributylsilyloxy |
| Ge | t-butyl | 1 | Chloride ion |
| Sn | t-butyl | 1 | Iodide ion |
| Sn | 2 phenylthios and 2 F's | 4 | Chloride ion |

As these phthalocyanine dyes (phthalocyanine metal complexes), commercial products are available. As commercial products, for example, the following products by Nippon Shokubai Co., Ltd., such as EXCOLOR "814K", "810K", "812K", "905B", "IR-1" and "IR-3" are commercially available and can be suitably used. The phthalocyanine dyes may be used singly, or two or more compounds of these may be used in combination.

(Dithiol Dye)

The dithiol dyes (dithiolene dyes) include, for example, a compound of the following formula,

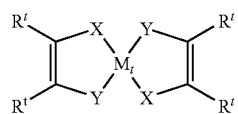

wherein each X and each Y are the same or different each other and represent an oxygen atom, a sulfur atom, NH or $NH_2$, each $R^t$ is the same or different each other and represents a cyano group or a phenyl group which may have a substituent, $R^t$ and $R^t$ on adjacent carbon atoms may form a benzene ring or naphthalene ring and $M_t$ represents a tetra-coordination transition metal atom and its valance may be balanced with a counter anion. In the above formula, the tetra-coordination transition metal $M_t$ includes, for example, Ti, V, Cr, Co, Ni, Zr, Mo, Fe, Ru, Pd, Os, Pt, etc. $M_t$ is preferably Ni. The substituent includes those substituents explained above, such as alkyl, aryl, alkoxy, a halogen atom and a substituted amino group such as dimethylamino.

The dithiol dye preferably includes an aromatic dithiol metal complex of the following formula (6) or (7).

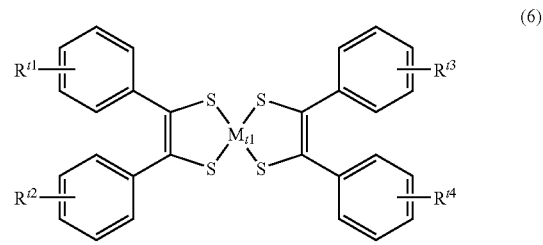

(6)

wherein each of $R^{t1}$, $R^{t2}$, $R^{t3}$ and $R^{t4}$ is the same or different each other and is a hydrogen atom, a halogen atom, alkyl, aryl, aralkyl, alkoxy, aryloxy or amino and may have a substituent, and $M_{t1}$ is a tetra-coordination transition metal atom.

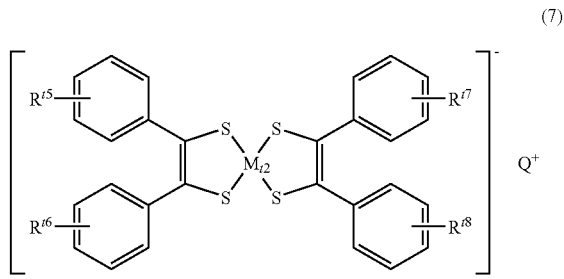

(7)

wherein each of $R^{t5}$, $R^{t6}$, $R^{t7}$ and $R^{t8}$ is the same or different each other and is a hydrogen atom, a halogen atom, alkyl, aryl, aralkyl, alkoxy or amino and may have a substituent, $M_{t2}$ is a tetra-coordination transition metal atom and $Q^+$ is a monovalent cation.

In the above formulae (6) and (7), the tetra-coordination transition metals represented by $M_{t1}$ and $M_{t2}$ include those metal atoms which are described above, and Ni is particularly preferred.

In the above formulae (6) and (7), further, the halogen atom includes a fluorine atom, a chlorine atom, a bromine atom and an iodine atom, the alkyl includes a $C_{1-10}$ alkyl group, preferably a $C_{1-4}$ alkyl group such as methyl, The aryl includes a $C_{6-10}$ aryl group, preferably a $C_{6-8}$ aryl such as phenyl, dimethylaminophenyl and methoxyphenyl, the aralkyl group includes a $C_{6-10}$ aryl-$C_{1-4}$ alkyl group, preferably a $C_{6-8}$ aryl-$C_{1-2}$ alkyl group, such as benzyl, the alkoxy includes an alkoxy group corresponding to the above alkyl group, such as a $C_{1-10}$ alkoxy group, preferably a $C_{1-4}$ alkoxy group such as methoxy and butoxy, and the amino includes a mono- or di$C_{1-10}$ alkylamino, preferably a mono- or di$C_{1-4}$ alkyl amino such as dimethylamino and diethylamino.

In the above formula (7), the monovalent cation represented by $Q^+$ includes tetraalkylammonium ions such as a tetra $C_{1-10}$ alkylammonium ion, preferably a tetra $C_{1-6}$ alkylammonium ion such as tetrabutylammonium ion and phosphorus-atom-containing cations such as $(CH_3O)_3P^+$. A tetra $C_{1-4}$ alkylammonium ion is preferred.

The following Table 2 shows typical dithiol dyes represented by the above formula (6) with using combinations of $M_{t1}$, $R^{t1}$, $R^{t2}$, $R^{t3}$ and $R^{t4}$ and also shows typical dithiol dyes represented by the above formula (7) with using combinations of $M_{t2}$, $R^{t5}$, $R^{t6}$, $R^{t7}$, $R^{t5}$, and $Q^+$. In the Table, "$BU_4N^+$" represents "tetrabutylammonium ion".

TABLE 2

| $M_{t1}$ or $M_{t2}$ | $R^{t1}$-$R^{t4}$ | $R^{t5}$-$R^{t8}$ | $Q^+$ |
|---|---|---|---|
| Ni | H | — | — |
| Pd | H | — | — |
| Pt | H | — | — |
| Ni | Methoxy | — | — |
| Ni | — | H | $Bu_4N^+$ |
| Ni | — | Methoxy | $Bu_4N^+$ |
| Ni | — | H, Diethylamino | $Bu_4N^+$ |
| Ni | — | p-methoxyphenyl | $Bu_4N^+$ |
| Ni | — | Phenyl and p-methoxyphenyl | $Bu_4N^+$ |
| Fe | — | H | $(CH_3O)_3P^+$ |

The aromatic dithiol metal complex of the above formula (6) or (7) may be selected from commercially available products, or it can be synthesized by a reaction between a tetra-coordination transition metal represented by $M_{t1}$ or $M_{t2}$ and a 1,2-diphenyl-1,2-ethenedithiol compound. Examples of the 1,2-diphenyl-1,2-ethenedithiol compound include 1,2-diphenyl-1,2-ethenedithiol, 1,2-di(alkoxyphenyl)-1,2-ethenedithiol and 1,2-di($C_{1-4}$ alkoxyphenyl)-1,2-ethenedithiol such as 1,2-di(4-methoxyphenyl)-1,2-ethenedithiol.

The dithiol dyes (the above aromatic dithiol metal complexes) may be used singly or two or more compounds of them may be used in combination. In particular, the aromatic dithiol metal complex of the above formula (6) or (7) has intense absorption at 850 to 900 nm and blocks the wavelengths of near infrared rays used for remote-control channel changers, so that an infrared filter using the above aromatic dithiol metal complex effectively prevents channel changes from producing improper operating signals.

(Diimmonium Dye)

The diimmonium dyes include, for example, a compound (aromatic diimmonium compound) of the following formula (8) or (9).

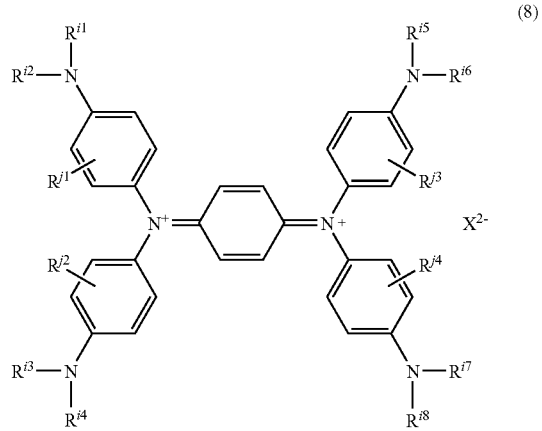

(8)

wherein each of $R^{i1}$, $R^{i2}$, $R^{i3}$, $R^{i4}$, $R^{i5}$, $R^{i6}$, $R^{i7}$ and $R^{i8}$ is the same or different each other and is alkyl, each of $R^{j1}$, $R^{j2}$, $R^{j3}$ and $R^{j4}$ is the same or different each other and is a hydrogen atom or a fluorine atom and $X^{2-}$ is a divalent anion.

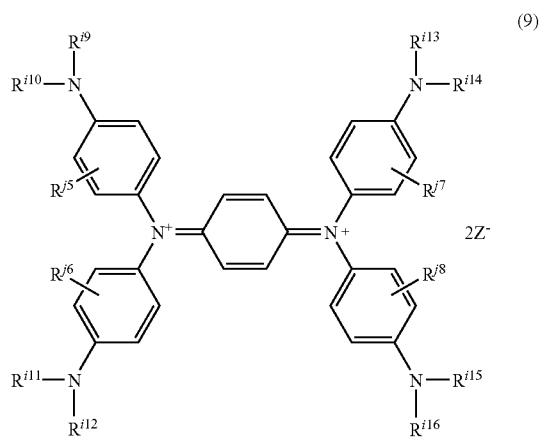

(9)

wherein each of $R^{i9}$, $R^{i10}$, $R^{i11}$, $R^{i12}$, $R^{i13}$, $R^{i14}$, $R^{i15}$ and $R^{i16}$ is the same or different each other and is alkyl, each of $R^{j5}$, $R^{j6}$, $R^{j7}$ and $R^{j8}$ is the same or different each other and is a hydrogen atom or a fluorine atom and $Z^-$ is a monovalent anion.

In the above formula (8) or (9), the alkyl includes the above alkyl group, such as a $C_{1-10}$ alkyl group, preferably a $C_{1-8}$ alkyl group, more preferably a $C_{1-6}$ alkyl group such as methyl, ethyl, propyl, butyl, pentyl and hexyl.

In the above formula (8), the divalent anion $X^{2-}$ is not specially limited, and it includes oxygen ion ($O^{2-}$), inorganic acid ions [carbonate ion ($Co_3^{2-}$), sulfate ion ($SO_4^{2-}$), etc., and organic acid ions [oxalate ion ($C_2O_4^{2-}$), etc.]. In the above formula (9), the monovalent anion $Z^-$ includes anions like the above counter anions. In particular, metal ions (hexafluoro antimonite ion ($SbF_6^-$), etc.) and inorganic acid ions (halogen acid ions such as perchlorate ion, etc., phosphorus-containing ions such as hexafluorophosphate ion ($PF_6^-$), etc., and boron-containing ions such as tetrafluoroborate ion ($BF_4^-$), etc.) are preferred.

In the formula (8) or (9), the combination of $R^{i1}$ to $R^{i8}$ (or $R^{i9}$ to $R^{i16}$) with $R^{j1}$ to $R^{j4}$ (or $R^{j5}$ to $R^{j8}$) is preferably such that the former substituents/the latter substituents=butyls/hydrogen atoms, pentyls/hydrogen atoms, butyls/fluorine atoms or the like.

The following Table 3 shows typical diimmonium dyes of the above formula (9) with using combinations of $R^{i9}$ to $R^{i16}$, $R^{j5}$ to $R^{j8}$ and $Z^-$.

TABLE 3

| $R^{i9}$ to $R^{i16}$ | $R^{j5}$ to $R^{j8}$ | $Z^-$ |
|---|---|---|
| Butyl | H | $SbF_6^-$ |
| Pentyl | H | $SbF_6^-$ |
| Butyl | F | $SbF_6^-$ |

The dyes for constituting the infrared absorbing filter of this invention may be used singly, or two or more compounds of these may be used in combination. Generally, dyes are slightly different in infrared absorption wavelength region (in particular, near infrared absorption wavelength region) and maximum absorption wavelength, so that it is preferred to use two or more dyes. It is particularly preferred to use at least two dyes selected from the phthalocyanine dye, the dithiol dye and the diimmonium dye, and in a more preferred embodiment these three dyes may be combined.

The content of the dye per 100 parts by weight of the resin composition (RC) can be 0.01 to 20 parts by weight, preferably 0.1 to 15 parts by weight, more preferably 1 to 10 parts by weight, and it is generally 0.01 to 10 parts by weight.

In particular, when the phthalocyanine dye, the dithiol dye and/or the diimmonium dye are/is used, per 100 parts by weight of the resin composition (RC), the content of the phthalocyanine dye is 0.01 to 3.0 parts by weight, preferably 0.05 to 2.0 parts by weight, more preferably 0.1 to 1.5 parts by weight, the content of the dithiol dye is 0.01 to 3.0 parts by weight, preferably 0.05 to 2.5 parts by weight, more preferably 0.1 to 2.0 parts by weight, and the content of the diimmonium dye is 0.1 to 10 parts by weight, preferably 0.2 to 8.0 parts by weight, more preferably 0.5 to 6 parts by weight. The polyester resin and the polycarbonate resin as a binder resin for constituting the infrared absorbing filter of this invention can uniformly disperse the above dyes and permit an increase in the concentration of these dyes in the binder resin.

In addition; preferably, the content of the dye is adjusted depending upon the thickness of the infrared absorbing filter and whether or not other film (an electromagnetic wave absorbing layer, or the like) which can be used in combination with the infrared absorbing filter of this invention has infrared absorbing capability. For example, when the infrared absorbing filter is combined with an electromagnetic wave absorbing layer having an infrared reflection property (a heat radiation reflection glass), it is preferred to use, per 100 parts by weight of the resin composition (RC), approximately 0.01 to 2.0 parts by weight of the phthalocyanine dye, approximately 0.5 to 2.5 parts by weight of the dithiol dye or approximately 0.2 to 6.0 parts by weight of the diimmonium dye. When the infrared absorbing filter is a type having an approximately 10 µm thick infrared absorbing film and an electromagnetic wave absorbing layer free of the infrared absorbing capability, it is preferred to use, per 100 parts by weight of the resin composition (RC), approximately 0.1 to 1.0 parts by weight of the phthalocyanine dye, approximately 0.5 to 2.0 parts by weight of the dithiol dye or approximately 1.0 to 6.0 parts by weight of the diimmonium dye. When the concentration of each dye above is smaller than the corresponding range above, the transmittance of the filter to visible light is high, but the filter has small infrared (near infrared) absorption and sometimes does not work as an infrared absorbing filter. On the other hand, when the concentration of each dye above is larger than the corresponding range above, the filter has large infrared absorption but the transmittance thereof to visible light is low.

The infrared absorbing filter may further contain a color tone correcting dye. That is, the infrared absorbing filter (in particular, near infrared absorbing filter) of this invention may contain a color tone correcting visible light absorbing dye in combination with the dye having the infrared absorbing capability, for correcting the color tone of the infrared absorbing filter as required. The above color tone correction is particularly important when the infrared absorbing filter is used as an infrared absorbing filter for a display such as a plasma display.

The above color tone correcting visible light absorbing dye may be any dye so long as it can absorb visible light (in particular, a narrow band of visible light absorption and a high transmittance at the other wavelength region). For example, a conventional dye or pigment such as a black pigment, a red pigment, a green pigment, a blue pigment, or the like may be used, and when an infrared absorbing dye has absorption in a visible light region, the infrared absorbing dye can be used as a color tone correcting dye. The above color tone correcting dye includes, for example, a cyanine dye, a quinone dye, an azo dye, an indigo dye, a polyene dye (polymethine dye, etc.), a spiro dye, porphyrin, a phthalocyanine dye, and the like. The color tone correcting dyes may be used singly, or two or more compounds of these may be used in combination.

In the infrared absorbing filter of this invention, importantly, the light transmissivity in an infrared region (a near infrared region in particular) is low and the light transmissivity in the other region (a visible light region in particular) is high for selectively blocking infrared (near infrared in particular). In this invention, the specified binder resins (the resin composition containing the polyester resin and the polycarbonate resin) are combined with the dye having near infrared absorbing capability (and optionally the color tone correcting dye), whereby there can be obtained an infrared absorbing filter having low light transmissivity in an infrared region (a near infrared region in particular) and high light transmissivity in a visible light region.

Specifically, the infrared absorbing filter has an average light transmittance, measured at 450 to 700 nm, of 55% or more (for example, 55 to 100%), preferably 60% or more (for example, 60 to 99%), more preferably 70% or more (for example, 70 to 95%) Further, the average light transmittance at 850 to 1,100 nm is 20% or less (for example, 0 to 20%), preferably 15% or less (for example, 0.5 to 15%), more preferably 10% or less (for example, 1 to 10%).

The infrared absorbing filter of this invention may contain an antioxidant, a heat stabilizer, a flame retardant, etc., as required, so long as the effect of this invention is not impaired.

The infrared absorbing filter of this invention may have any form or any state depending upon use, while it preferably has the form of a film. The infrared absorbing filter in the form of a film may be a film (coating) formed on a substrate or the like, or it may be a single film without a substrate on which it is to be formed.

The infrared absorbing filter of this invention can be produced or formed (as a film) by a casting method, a coating method, a melt-extrusion method (extrusion molding method) or the like. The infrared absorbing filter can be obtained by any one of (i) a method in which a dye having infrared absorbing capability is uniformly dispersed in a solution containing the above polyester resin and the above polycarbonate resin to obtain a coating liquid and a film is formed (produced) from the coating liquid by a casting method, (ii) a coating method in which the above coating liquid is coated on a glass or a transparent sheet or film formed of a styrene resin, an acrylic resin, an amorphous polyolefin resin, a cellulose resin, a polyester resin or a polycarbonate resin, to form a film, (iii) a method in which the above polyester resin, the above polycarbonate resin and a dye having infrared absorbing capability are blended and the resultant blend is melt-extruded to form a film, and the like.

In the casting method, the coating liquid is cast on a glass plate, a mirror-finished metal plate or a polyester film, the coating liquid is spread on the plate surface with a rod having a constant gap and then dried and a formed film is separated from the above surface by a proper method, whereby the film can be obtained. In the above casting method, a film may be formed with a mechanized casting machine.

In the coating method, the coating liquid is applied onto a film or a panel by a bar coating method, a pray coating method, a dip coating method or a flow coating method and an applied coating liquid is dried, whereby a film layer can be formed. For continuous coating on a film, various roller coaters can be suitably used. For the above coating, there may be used a machine that performs series of steps of extruding the coating liquid on a film moving at a predetermined rate (e.g., approximately several meters to several tens meters per minute) from a T-die at a constant rate, removing a solvent in a subsequent drying zone and taking up a film.

The solvent for the coating liquid can be suitably selected from solvents that not only can practically dissolve the resins and dye but also are inert to the dye and that have practically preferred boiling points. Examples of the above solvents include halogen-containing organic solvents (e.g., aliphatic halogen compounds such as chloroform, dichloromethane, dichloroethane, etc.) and halogen-free organic solvents (e.g., aromatic hydrocarbons such as toluene, xylene, etc., ketones such as methyl ethyl ketone, acetone, cyclohexanone, cyclopenatanone, etc., and ethers such as tetrahydrofuran, etc.). These solvents may be used singly, or two or more solvents of these may be used in combination.

The concentration of the coating liquid cannot be uniformly determined since it is required to adjust the concentration depending upon a type of the solvent, the thickness of the filter, the method of production thereof, and the like. However, it can be in the range of 1 to 30 parts by weight, preferably approximately 5 to 25% by weight.

In the melt-extrusion method, for example, there may be employed a constitution in which the polyester resin, the polycarbonate resin, the infrared absorbing dye and optional additive(s) to be added as required are fully mixed with a pre-mixing means such as a V-blender, a Henschel mixer, a mechanochemical apparatus or an extrusion mixer and the pre-mixed materials are granulated with an extrusion granulator or a briquetting machine as required, melt-kneaded (or melt-mixed) with a melt-kneading machine (e.g., an extruder such as a single-screw extruder or a twin-screw extruder (such as a vent type twin-screw extruder) and extruded through a T-die or a ring die to produce an article in the form of a film (or sheet) or form a film.

In the melt-kneading, portions of the components may be pre-mixed and fed to the melt-kneader independently of the rest of them. As a method of pre-mixing portions of the components, for example, there is a method in which the infrared absorbing dye is pre-mixed with the polyester resin (or the polycarbonate resin) when the polyester resin (or the polycarbonate resin) is produced by a melting method, following by the preparation of pellets. When the polyester resin or the polycarbonate resin has a particulate form (powder form), there may be employed a method in which part of the powder and a dye to be incorporated are blended to prepare a master batch of the additive diluted with the powder. When additives to be incorporated include an additive having a liquid form, there can be used a so-called a liquid-injecting or liquid-adding apparatus for feeding it into a melt-extruder.

The thickness of the infrared absorbing filter of this invention cannot be uniformly determined since the thickness needs to be adjusted as required depending upon the kind and concentration of a dye used. However, the above thickness is preferably 1 to 100 μm, more preferably 1 to 80 μm, still more preferably 1 to 50 μm, further more preferably 1 to 20 μm.

(Infrared Absorbing Panel)

This invention includes an infrared absorbing panel or infrared absorbing multi-layered film having an infrared absorbing filter. That is, the infrared absorbing filter may be used to form an infrared absorbing multi-layered panel or film by combining it with other film or panel having infrared absorbing capability or a film or panel imparted with a specific function. The specific function includes, for example, electromagnetic wave absorbing capability, anti-reflection capability and form-maintaining capability.

For the infrared absorbing filter of this invention, the resin composition (RC) containing the polyester resin and the polycarbonate resin which have the fluorene skeletons are used, so that a high concentration of the infrared absorbing dye can be uniformly dispersed in the resin composition, and the aggregation of the dye and the self-reaction of the dye do not take place. Therefore, both the blocking of infrared, in particular near infrared, and the transmission of visible light can be achieved simultaneously even when the infrared absorbing filter is an approximately 10 μm thick thin film. In the infrared absorbing filter of this invention, further, the dye having infrared absorbing capability is stabilized in the resin composition (RC), so that the deterioration thereof by heat, light, water, etc., is remarkably suppressed, and the stable performance thereof can be maintained for a long period of time.

The infrared absorbing filter and the infrared absorbing panel of this invention can be used in fields where high performances and durability are required, for example, as an infrared absorbing filter that absorbs infrared generated by image output apparatuses, lighting fixtures, etc., to prevent improper operations of channel changers or infrared communication ports that use light in an infrared region, in particular, a near infrared region, for optical communication, so that the improper operation of apparatuses, machines and equipment under control of these remote-control devices are prevented. Further, the infrared absorbing filter or the infrared absorbing panel can be suitably used as an infrared absorbing filter for correcting the light receiving sensitivity or color tone in the light-receiving device or image-sensing device of an optical apparatus. Specifically, the infrared absorbing filter of this invention can be suitably used, for example, as an infrared absorbing filter for a plasma display, a solid image sensor (CCD) camera, a photodiode or the like.

<Retardation Film>

A retardation film is a film that has birefringence capability and hence has the function to convert transmitted light to circularly polarized light or elliptically polarized light, and it is used in a display device of a liquid crystal display or the like for the purpose of color compensation, the broadening of a viewing angle, the prevention of reflection and the like.

For example, in a super twisted nematic (STN) mode liquid crystal display, a retardation film is used for color compensation and broadening of a viewing angle. Generally, when a film formed of a thermoplastic resin is uniformly stretched, polymer chains are oriented to generate a birefringence effect, and the function of a retardation film is exhibited. The performance of the retardation film as a typical property is expressed as a retardation value (to be abbreviated as "Re value" hereinafter). The Re value refers to a value in the unit of nm, which is obtained by (the birefringence value of a film at a specific wavelength)×(thickness).

There have been disclosed retardation films that are formed of polycarbonate resins to comply with demands for dimensional stability and the decreasing of a thickness in recent years (JP 63-189804A and JP 1-201608A).

Further, studies have been made for rendering uniform the Re value of a retardation film formed of a polycarbonate resin (Japanese Patents Nos. 3499838 and 3349193).

Further, a polyester resin having a fluorene skeleton has been developed as an optical material and the use thereof for an optical element has been disclosed (JP 11-60706A and JP 2000-119379A).

It is another object of this invention to provide a retardation film that has little variability of Re value and is optically uniform and that is also excellent in durability against heat.

The present inventors have found that a retardation film formed of the resin composition (RC) of this invention is excellent in optical properties and durability against heat, and this invention has been accordingly completed.

That is, this invention includes a retardation film formed of the resin composition (RC) of this invention. The present invention provides a retardation film formed of a resin composition (RC) containing the polyester resin formed from the dicarboxylic acid component and the diol component (a) containing the compound of the formula (1) and the polycarbonate resin formed from the carbonate-forming compound and the diol component (b) containing the compound of the formula (1) and/or the compound of the formula (2).

The photoelastic coefficient of the retardation film is preferably $65 \times 10^{-12}$ $Pa^{-1}$ or less, more preferably $55 \times 10^{-12}$ $Pa^{-1}$ or less, particularly preferably $45 \times 10^{-12}$ $Pa^{-1}$ or less. When the photoelastic coefficient is small, the Re value is not easily expressed by stretching. However, the variability of the Re value is decreased, so that it becomes easy to obtain a uniform film, which is desirable.

The retardation film of this invention is formed of the resin composition excellent in moldability and optical properties, and the retardation film has low birefringence, has little variability of phase difference, has excellent optical properties and also has excellent durability against heat. The retardation film can be therefore applied to a liquid crystal display, an organic EL display and the like.

The retardation film of this invention can be obtained by molding the resin composition (RC) according to a known film-forming method such as a solvent casting method, a melt-extrusion method, a calendering method, etc., and then stretching the thus-formed film.

That is, the retardation film of this invention can be produced by forming a film from the resin composition (RC) containing the polyester resin formed from the dicarboxylic acid component and the diol component (a) containing the compound of the formula (1) and the polycarbonate resin formed from the carbonate-forming component and the diol component (b) containing the compound of the formula (1) and/or the compound of the formula (2), and stretching the thus-formed film.

(Film Formation)

The film can be formed by a solvent casting method such as a casting method in which a solution is extruded through a die, a doctor knife method or the like. The solvent for use in these methods is preferably selected from organic solvents such as methylene chloride, chloroform, dioxolane, toluene, dimethylformamide, N-methylpyrrolidone, and the like. A solution having a concentration of 10% by weight or more, preferably 15% by weight or more, is preferably used.

In contrast, a melt-extrusion method is excellent in productivity since no solvent is used. The resin composition (RC) of this invention has excellent moldability and can give a fully optically uniform film even by a melt-extrusion method, so that the melt-extrusion method is preferred.

The retardation film according to the melt-extrusion method can be obtained by a method in which the resin composition (RC) is prepared by a solution blending method or a melt-blending method and formed into a film by melt-extrusion, or a method in which a dry blend of the polycarbonate resin and the polyester resin is directly melt-extruded to form a film.

As a solution blending method, for example, there is a method (solution blending) in which the polyester resin, the polycarbonate resin and optional additive(s) to be added as required are dissolved in a solvent capable of dissolving them, they are homogeneously mixed, foreign matter is removed by filtration (filtering, etc.) as required, the mixture (homogeneous mixture) is poured into a solvent (or a poor solvent) in which the polyester resin and the polycarbonate resin are insoluble, to recover the resin composition and the recovered resin composition is dried to obtain an intended resin composition.

As a melt-blending method, there is a method in which the above components (the above polyester resin, the above polycarbonate resin and optional additive(s) to be added as required) for constituting the above resin composition are mixed as required and then melt-blended (melt-kneaded) to obtain the resin composition. In the solution blending method, a resin composition having little thermal history can be obtained. However, a large amount of a solvent is used for the resin composition, so that a residual solvent in the resin composition may sometimes cause a problem. The melt-blending method is free of the solvent problem, and it is also advantageous in economic performance.

As a method for directly melt-extruding a dry blend of the polycarbonate resin and the polyester resin to form a film, there is a method in which the polyester resin, the polycarbonate resin and optional additive(s) to be added as required are fully mixed with a pre-mixing means such as a V-blender, a Henschel mixer or a mechanochemical apparatus and the resultant mixture is then granulated with an extrusion granulator or a briquetting machine as required, melt-kneaded with a melt-extruder such as a vent type twin-screw extruder or the like and extruded through a flat die (T-die) to form a film from a melt.

In the method of directly melt-extruding the dry blend to form a film, portions of the components may be pre-mixed and then fed into the melt-extruder independently of the rest of the components. The method for pre-mixing portions of the components includes, for example, a method in which the additives (such as a phosphorus-containing stabilizer, an antioxidant, etc.) are pre-mixed with the polyester resin (or polycarbonate resin) when the polyester resin (or polycarbonate resin) is produced by a melting method and then pellets are formed. Further, when the polyester resin or the polycarbonate resin has a particulate form (powder form), there is a method in which additive(s) is blended with part of the powder to prepare a master batch of the additive(s) diluted with the powder. When additives to be incorporated include an additive having a liquid form, there can be used a so-called a liquid-injecting or liquid-adding apparatus for feeding it into the melt-extruder.

As a melt-extruder, there can be suitably used a melt-extruder having a vent capable of discharging water in raw materials and a volatile gas generated from a melt-kneaded resin. The vent is preferably equipped with a vacuum pump for efficiently discharging generated water and volatile gas from the melt-extruder. Further, a screen for removing foreign mater included in raw materials to be extruded may be provided in a zone before a melt-extruder die portion, and in this case foreign matter can be removed. The above screen includes a woven metal wire, a screen changer and a sintered metal plate (disk filter).

When the glass transition temperature of the resin composition (RC) is Tg, the resin temperature during the melt-extrusion is preferably between Tg+50° C. and Tg+250° C., more preferably between Tg+80° C. and Tg+200° C. The retardation film of this invention can be obtained as an intended film by carrying out the stretching simultaneously with, or continuously to, the above formation of a film. Alternatively, the film obtained by the above film-forming method may be stretched in a separate step to obtain the retardation film.

(Stretching)

The retardation film of this invention is a monoaxially stretched or biaxially stretched and can be used as a retardation film. As a monoaxial stretching method, there can be employed any method such as the method of monoaxial stretching in the transverse direction by a tenter method, the method of monoaxial stretching in the longitudinal direction between rolls, the method of calendering between rolls, or the like. The stretching is carried out at a stretch ratio in the range of 1.05 to 5 times depending upon the stretchability of a film and desired optical properties. The above stretching may be carried out at one stage or at multiple stages. The temperature during the stretching is between Tg−30° C. and Tg+50° C., preferably between Tg−10° C. and Tg+30° C. When the stretching temperature is in the above range, the molecular motion of the polymer is proper, the orientation produced by the stretching is not easily relaxed, the orientation suppression is easy and desirable Re values can be easily obtained, so that the stretching temperature in the above range is preferred.

The thickness of the retardation film of this invention cannot be uniformly determined since it differs depending upon the optical properties of the resin composition (RC), desired optical properties and stretching conditions based thereon. However, it is generally 10 to 400 μm, preferably 30 to 300 μm, more preferably 50 to 200 μm. When the thickness is in the above range, desired Re values can be easily obtained by stretching and the film formation is easy, so that the thickness in the above range is preferred.

The retardation of the retardation film of this invention is caused because polymer chains of the polymer material constituting the retardation film are mainly aligned in a specific direction, and it is generally produced by the stretching of the film. The Re value as a degree of retardation is evaluated by way of a value at a specific wavelength. The Re value of the retardation film of this invention at 550 nm is 10 nm or more, preferably 10 nm or more but not more than 1,000 nm.

The haze (haze value) of the retardation film of this invention under the condition of a thickness of 100 μm is preferably 3 or less, more preferably 1 or less, particularly preferably 0.5 or less. When the haze is greater than 3, undesirably, the light transmittance of a formed retardation film is decreased. Further, the retardation film of this invention is preferably colorless and transparent, and b* obtained by measurement using an illuminant C is preferably 1.2 or less, more preferably 1 or less.

Generally, a retardation film from a resin film having a high photoelastic coefficient has a low stretch ratio, so that the retardation film has large variability of retardation, that is, large optical non-uniformity. On the other hand, a film formed from the resin composition of this invention has low birefringence, that is, a low photoelastic coefficient, so that the stretch ratio in the monoaxial stretching can be logically increased. As a result, there can be obtained a retardation film having little variability of retardation. Each end portion that is 5 mm long is excluded from a retardation film, and the remaining portion is equally divided in four places. A total of five portions, two end portions and three intermediate portions, are measured for retardations. The variability of retardation which is a difference between the maximum value and the minimum value of the retardations is preferably 10 nm or less, more preferably 6 nm or less. Further, since the retardation film of this invention is fully stretched, it is not easily deformed by a tension caused in the step of attaching the retardation film to a polarizing plate, and it neither easily causes a change in retardation nor causes non-uniformity, so that it is excellent.

Further, the above film is excellent in the property of viewing angle, and the ratio of a difference between an Re value in the normal direction of the film and an Re value at oblique incidence at 400 from the normal to the Re value in the normal direction of the film is preferably 10% or less, more preferably 8% or less.

The retardation film of this invention is excellent in durability against heat and shows little change in Re value under the condition of high temperatures. The Re value change that the retardation film has between before and after its treatment at 90° C. for 1,000 hours is preferably ±10 nm or less, more preferably ±5 nm or smaller, particularly preferably ±2 nm or smaller.

The retardation film of this invention may be attached, for example, to a polarizing film containing a general dichroic absorbing substance such as iodine, a dye or the like, a dielectric multi-layered film or a reflection type polarizing film that is formed of a cholesteric polymer liquid crystal and that reflects or scatters polarized light only on one side, to form a retardation-film-integrated polarizing film. In this case, the polarizing film can be also improved in the property of viewing angle. Further, the retardation film of this invention can be also attached to films, etc., which have other functions such as anti-reflection capability, form-retaining capability and the like, other than a polarizing film.

When the retardation film is fixed to a polarizing film or a liquid crystal display, an adhesive is required, and the adhesive can be selected from known adhesives. The adhesive preferably has a mean refractive index among refractive indices of laminated films to be stacked since interfacial reflection can be suppressed.

When the retardation film of this invention or the above retardation-film-integrated polarizing film is applied to a liquid crystal display, etc., the liquid crystal display, etc., can be improved in picture quality.

EFFECT OF THE INVENTION

In the resin composition (RC) of this invention and molded articles thereof, the polyester resin and the polycarbonate resin have fluorene skeletons introduced thereinto.

The resin composition (RC) is excellent in resistances such as heat resistance, environmental resistance, etc., and is excellent in hydrolysis resistance in high-temperature high-humidity environments. Although having a stiff structure, the resin composition is excellent in flowability and excellent in moldability. The resin composition (RC) also has excellent optical properties such as transparency, high refractivity and low birefringence.

EXAMPLES

This invention will be more specifically explained with reference to Examples hereinafter, while this invention shall not be limited in any way by these Examples. In Examples, "part" stands for "part by weight".

Polyester resins, polycarbonate resins, resin compositions, plates, lenses or infrared absorbing filters obtained in Synthesis Examples A-1 to A-4 and B-1 to B-5, Examples 1 to 16 or Comparative Examples 1 to 5 were evaluated by the following methods.

(1) Measurement of number average molecular weight (Mn): Size exclusion chromatography was carried out with HLC-8220GPC supplied by Tosoh Corporation using a chloroform eluting solution and a UV detector, and a number average molecular weight was measured as a standard polystyrene.

(2) Tg measurement: Measured with a differential scanning calorimeter DSC-2910 supplied by T. A. Instruments Japan K.K. according to JIS K-7121 at a temperature elevation rate of 20° C./minute in a nitrogen atmosphere.

(3) Melt flow rate (MFR): A polymer that flowed out at 280° C. for 10 minutes under a load of 1.2 kg was measured for an amount (g) according to JIS K-7210 with a melt flow index measuring apparatus supplied by Toyo Seiki Seisakusho, Ltd.

(4) Refractive index: According to JIS K-7142, a cast film (thickness 100 μm) was prepared and measured with Abbe refractometers DR-M2 and DR-A1 supplied by ATAGO CO., LTD. at a temperature of 25° C. with regard to a measurement wavelength of 588 nm (d ray).

(5) Light transmittance: According to JIS K-7105, a 2 mm thick sample was measured for a light transmittance at 500 nm with a spectrophotometer U-3010 supplied by Hitachi, Ltd.

(6) Photoelastic coefficient: When a film having a width of 1 cm was tensioned in an elastic deformation region from 0.1 kg to 0.6 kg at intervals of 0.1 kg, the film was measured for retardation values (Re values) with a spectroscopic ellipsometer M-220 supplied by JASCO Corporation, then, obtained data were plotted and an elastic coefficient was determined on the basis of its approximate straight line.

(7) Constant-temperature constant-humidity
  durability test: A test piece was treated in a constant-temperature constant-humidity environment having a temperature of 85° C. and a humidity of 85% for 640 hours and then it was measured for a light transmittance, to compare the measured light transmittance with a light transmittance obtained before the treatment.

(8) Birefringence: A molded plate was placed between a pair of polarizing plates arranged in the state of crossed Nicols and observed for a birefringent appearance. When the molded plate has large birefringence, a rainbow pattern caused by light leakage is observed. The plate was evaluated on the following ratings.

⊚: No rainbow pattern by birefringence was observed.
  ○: A rainbow pattern by birefringence was slightly observed.
  Δ: A rainbow pattern by birefringence was partly observed.
  X: A rainbow pattern by birefringence was totally observed.

(9) Film thickness: An infrared absorbing filter thin film was formed by applying a coating liquid onto a glass substrate and drying the thus-applied coating liquid, part of the film was wiped off with a solvent, and the substrate surface was observed for a step of the film with a stylus type surface profile measuring apparatus (dektak, supplied by ULVAC JAPAN LTD.) to measure a film thickness.

(10) Aggregation of dye: An infrared absorbing filter was observed by means of an optical microscope of 500 magnifications for a presence or absence of aggregates of a dye.

(11) Average visible light transmittance: A light transmittance at 450 to 700 nm was determined by measurement with a spectrophotometer U-4100 supplied by Hitachi, Ltd.

(12) Average infrared transmittance: A ray transmittance at 850 to 1,100 nm determined by measurement with a spectrophotometer U-4100 supplied by Hitachi, Ltd.

(13) Environmental resistance test: An infrared absorbing filter was treated under a constant-temperature constant-humidity environment having a temperature of 60° C. and a humidity of 90% for 600 hours and then measured for transmittances (average visible light transmittance and average infrared transmittance), and the thus-obtained transmittances were compared with those obtained before the treatment.

<Synthesis of Polyester Resin A-1>

A reactor equipped with a thermometer, a stirrer and a pressure-reducing device was charged with 392.6 parts of cyclohexanedicarboxylic acid, 1,000 parts of 9,9-bis[4-(2-hydroxyethoxy)phenyl]fluorene and 0.70 part of di-n-butyltin oxide, these materials were gradually melted under heat with stirring and an esterification reaction was carried out at 1,000 to 4,000 Pa at a temperature of 220 to 230° C. for 12 hours to give a polyester resin A-1 having a fluorene skeleton. The weight ratio of the 9,9-bis[4-(2-hydroxyethoxy)phenyl]fluorene introduced into A-1 to A-1 was 0.76. This A-1 had an Mn of 11,200, a Tg of 133° C. and a refractive index (d ray) of 1.615.

<Synthesis of Polyester Resin A-2>

A reactor equipped with a thermometer, a stirrer and a pressure-reducing device was charged with 5,548 parts of cyclohexanedicarboxylic acid, 1,000 parts of ethylene glycol and 12,717 parts of 9,9-bis[4-(2-hydroxyethoxy)phenyl]fluorene, these materials were gradually melted under heat with stirring and an esterification reaction was carried out at a temperature of 220 to 230° C. for 2.5 hours. Then, 9.82 parts of di-n-butyltin oxide was added, and while the reaction system was gradually temperature-increased up to 290° C. and pressure-reduced to 100 Pa, ethylene glycol was removed to give a polyester resin A-2 having a fluorene skeleton. The weight ratio of the 9,9-bis[4-(2-hydroxyethoxy)phenyl]fluorene introduced into A-2 to A-2 was 0.74. This A-2 had an Mn of 14,200, a Tg of 127° C. and a refractive index (d ray) of 1.608.

<Synthesis of Polyester Resin A-3>

A reactor equipped with a thermometer, a stirrer and a pressure-reducing device was charged with 4,867 parts of cyclohexanedicarboxylic acid, 1,000 parts of ethylene glycol and 6,197 parts of 9,9-bis[4-(2-hydroxyethoxy)phenyl]fluorene, these materials were gradually melted under heat with stirring and an esterification reaction was carried out at a temperature of 220 to 230° C. for 2.5 hours. Then, 8.62 parts of di-n-butyltin oxide was added, and while the reaction system was gradually temperature-increased up to 290° C. and pressure-reduced to 100 Pa, ethylene glycol was removed to give a polyester resin A-3 having a fluorene skeleton. The weight ratio of the 9,9-bis[4-(2-hydroxyethoxy)phenyl]fluorene introduced into A-3 to A-3 was 0.57. This A-3 had an Mn of 12,400, a Tg of 109° C. and a refractive index (d ray) of 1.595.

<Synthesis of Polyester Resin A-4>

A reactor equipped with a thermometer, a stirrer and a pressure-reducing device was charged with 5,548 parts of cyclohexanedicarboxylic acid, 1,000 parts of ethylene glycol and 11,302 parts of 9,9-bis[4-(2-hydroxyethoxy)phenyl]fluorene, these materials were gradually melted under heat with stirring and an esterification reaction was carried out at a temperature of 220 to 230° C. for 2.5 hours. Then, 9.82 parts of di-n-butyltin oxide was added, and while the reaction system was gradually temperature-increased up to 290° C. and pressure-reduced to 100 Pa, ethylene glycol was removed to give a polyester resin A-4 having a fluorene skeleton. The weight ratio of the 9,9-bis[4-(2-hydroxyethoxy)phenyl]fluorene introduced into A-4 to A-4 was 0.70. This A-4 had an Mn of 14,200, a Tg of 122° C. and a refractive index (d ray) of 1.607.

<Synthesis of Polycarbonate Resin B-1>

A reactor equipped with a thermometer, a stirrer and a reflux condenser was charged with 9,810 parts of deionized water and 1,930 parts of a 48% sodium hydroxide aqueous solution, and 1,420 parts of 2,2-bis(4-hydroxyphenyl)propane, 588.6 parts of 9,9-bis(4-hydroxy-3-methylphenyl)fluorene and 4.5 parts of sodium hydrosulfite were dissolved therein. 6,605 Parts of methylene chloride was added, and then while the mixture was stirred, 1,000 parts of phosgene was blown into the mixture at 16 to 20° C. over 60 minutes. After completion of blowing of the phosgene, 46.7 parts of p-tert-butylphenol and 317 parts of a 48% sodium hydroxide aqueous solution were added, 0.94 part of triethylamine was further added, and the mixture was stirred at 20 to 27° C. for 40 minutes to complete the reaction. A methylene chloride layer containing a formed product was washed with diluted hydrochloric acid and pure water, and then methylene chloride was evaporated off to give a polycarbonate resin B-1 having a fluorene skeleton. The weight ratio of 9,9-bis(4-hydroxy-3-methylphenyl)fluorene introduced into B-1 to B-1 was 0.27. This B-1 had an Mn of 16,000, a Tg of 166° C. and a refractive index (d ray) of 1.598.

<Synthesis of Polycarbonate Resin B-2>

A reactor equipped with a thermometer, a stirrer and a reflux condenser was charged with 9,810 parts of deionized water and 1,930 parts of a 48% sodium hydroxide aqueous solution, and 1,065 parts of 2,2-bis(4-hydroxyphenyl)propane, 1,177 parts of 9,9-bis(4-hydroxy-3-methylphenyl)fluorene and 4.5 parts of sodium hydrosulfite were dissolved therein. 6,610 Parts of methylene chloride was added, and then while the mixture was stirred, 1,000 parts of phosgene was blown into the mixture at 16 to 20° C. over 60 minutes. After completion of blowing of the phosgene, 50.2 parts of p-tert-butylphenol and 317 parts of a 48% sodium hydroxide aqueous solution were added, 0.94 part of triethylamine was further added, and the mixture was stirred at 20 to 27° C. for 40 minutes to complete the reaction. A methylene chloride layer containing a formed product was washed with diluted hydrochloric acid and pure water, and then methylene chloride was evaporated off to give a polycarbonate resin B-2 having a fluorene skeleton. The weight ratio of 9,9-bis(4-hydroxy-3-methylphenyl)fluorene introduced into B-2 to B-2 was 0.48. This B-2 had an Mn of 16,600, a Tg of 190° C. and a refractive index (d ray) of 1.610.

<Synthesis of Polycarbonate Resin B-3>

A reactor equipped with a thermometer, a stirrer and a reflux condenser was charged with 10,120 parts of deionized water and 1,857 parts of a 48% sodium hydroxide aqueous solution, and 512.8 parts of 2,2-bis(4-hydroxyphenyl)propane, 1,984 parts of 9,9-bis(4-hydroxy-3-methylphenyl)fluorene and 4.3 parts of sodium hydrosulfite were dissolved therein. 7,632 Parts of methylene chloride was added, and then while the mixture was stirred, 1,000 parts of phosgene was blown into the mixture at 16 to 20° C. over 60 minutes. After completion of blowing of the phosgene, 65.2 parts of p-tert-butylphenol and 353 parts of a 48% sodium hydroxide aqueous solution were added, 0.95 part of triethylamine was further added, and the mixture was stirred at 20 to 27° C. for 40 minutes to complete the reaction. A methylene chloride layer containing a formed product was washed with diluted hydrochloric acid and pure water, and then methylene chloride was evaporated off to give a polycarbonate resin B-3 having a fluorene structure. The weight ratio of 9,9-bis(4-hydroxy-3-methylphenyl)fluorene introduced into B-3 to B-3 was 0.74. This B-3 had an Mn of 14,000, a Tg of 216° C. and a refractive index (d ray) of 1.622.

<Synthesis of Polycarbonate Resin B-4>

A reactor equipped with a thermometer, a stirrer and a reflux condenser was charged with 10,899 parts of deionized water and 1,728 parts of a 48% sodium hydroxide aqueous solution, and 1,796 parts of 4,4'-(m-phenylenediisopropylidene)diphenol, 1,308 parts of 9,9-bis(4-hydroxy-3-methylphenyl)fluorene and 6.0 parts of sodium hydrosulfite were dissolved therein. 6,604 Parts of methylene chloride was added, and then while the mixture was stirred, 1,000 parts of phosgene was blown into the mixture at 16 to 20° C. over 60 minutes. After completion of blowing of the phosgene, 38.9 parts of p-tert-butylphenol and 311 parts of a 48% sodium hydroxide aqueous solution were added, 1.84 parts of triethylamine was further added, and the mixture was stirred at 20 to 27° C. for 60 minutes to complete the reaction. A methylene chloride layer containing a formed product was washed with diluted hydrochloric acid and pure water, and then methylene chloride was evaporated off to give a polycarbonate resin B-4 having a fluorene skeleton. The weight ratio of 9,9-bis(4-hydroxy-3-methylphenyl)fluorene introduced into B-4 to B-4 was 0.39. This B-4 had an Mn of 19,800, a Tg of 146° C. and a refractive index (d ray) of 1.612.

<Synthesis of Polycarbonate Resin B-5>

A reactor equipped with a thermometer, a stirrer and a reflux condenser was charged with 9,809 parts of deionized water and 2,271 parts of a 48% sodium hydroxide aqueous solution, and 1,775 parts of 2,2-bis(4-hydroxyphenyl)propane and 3.5 parts of sodium hydrosulfite were dissolved therein. 7,952 Parts of methylene chloride was added, and then while the mixture was stirred, 1,000 parts of phosgene was blown into the mixture at 16 to 20° C. over 60 minutes. After completion of blowing of the phosgene, 52.5 parts of p-tert-butylphenol and 327 parts of a 48% sodium hydroxide aqueous solution were added, 1.57 parts of triethylamine was further added, and the mixture was stirred at 20 to 27° C. for 40 minutes to complete the reaction. A methylene chloride layer containing a formed product was washed with diluted hydrochloric acid and pure water, and then methylene chloride was evaporated off to give a polycarbonate resin B-5 containing no fluorene skeleton. This B-5 had an Mn of 12,500, a Tg of 150° C. and a refractive index (d ray) of 1.584.

Examples 1 to 9

Comparative Examples 1 to 3

Resin Composition and Lens

Examples 1 to 9

The polyester resins and polycarbonate resins obtained in the above Synthesis Examples were dry-blended in compositional ratios shown in Table 4, and each dry blend was separately melt-kneaded with a 15Φ twin-screw extrusion kneading machine supplied by TECHNOVEL CORPORATION at a resin temperature of 240 to 280° C. The thus-kneaded products were cooled and pelletized to give transparent resin compositions.

Pellets of each of the thus-obtained resin compositions were separately injection-molded with a 30-ton injection molding machine supplied by Toshiba Machine Co., Ltd. to obtain plates. All the plates had low refractive indices and were optically uniform.

Further, when pellets of each of the above resin compositions were separately injection-molded under the conditions of a cylinder temperature of 250 to 280° C. and a mold temperature of 100° C., the resin compositions were excellent in moldability and gave colorless transparent plastic lenses. The above lenses in any Example had high transparency and excellent appearances. Further, when the lenses were observed through polarizing plates, they had low birefringence and were optically uniform.

The resin compositions obtained above were evaluated for various properties and the plates obtained above were evaluated for birefringence and constant-temperature constant-humidity resistance. Table 4 shows the results.

Comparative Example 1

Only the polyester resin A-4 obtained in the above Synthesis Example was molded into a plate in the same manner as in Example 1. A-4 was evaluated for various properties and the plate obtained was evaluated for birefringence and constant-temperature constant-humidity resistance. Table 4 shows the results.

Comparative Example 2

Only the polycarbonate resin B-2 obtained in the above Synthesis Example was molded into a plate in the same manner as in Example 1. B-2 was evaluated for various properties and the plate obtained was evaluated for birefringence and constant-temperature constant-humidity resistance. Table 4 shows the results.

Comparative Example 3

Only the polycarbonate resin B-5 obtained in the above Synthesis Example was molded into a plate in the same manner as in Example 1. B-5 was evaluated for various properties and the plate obtained was evaluated for birefringence and constant-temperature constant-humidity resistance. Table 4 shows the results.

The resin compositions shown in Examples 1 to 9 have high refractive indices and low birefringence, and it is seen that no deterioration is observed in the constant-temperature constant-humidity test. Further, they are excellent in moldability. On the other hand, in the resin compositions shown in Comparative Examples, it is seen that while the birefringence is low, deterioration is observed in the constant-temperature constant-humidity test (Comparative Example 1), that the moldability is poor (Comparative Example 2) and that the birefringence is large (Comparative Example 3).

As described above, according to this invention, there can be obtained high-performance plastic lenses that have excellent optical properties (high refractivity and low birefringence) and that is also excellent in moldability and resistances (heat resistance and environmental resistance).

Figure 2:
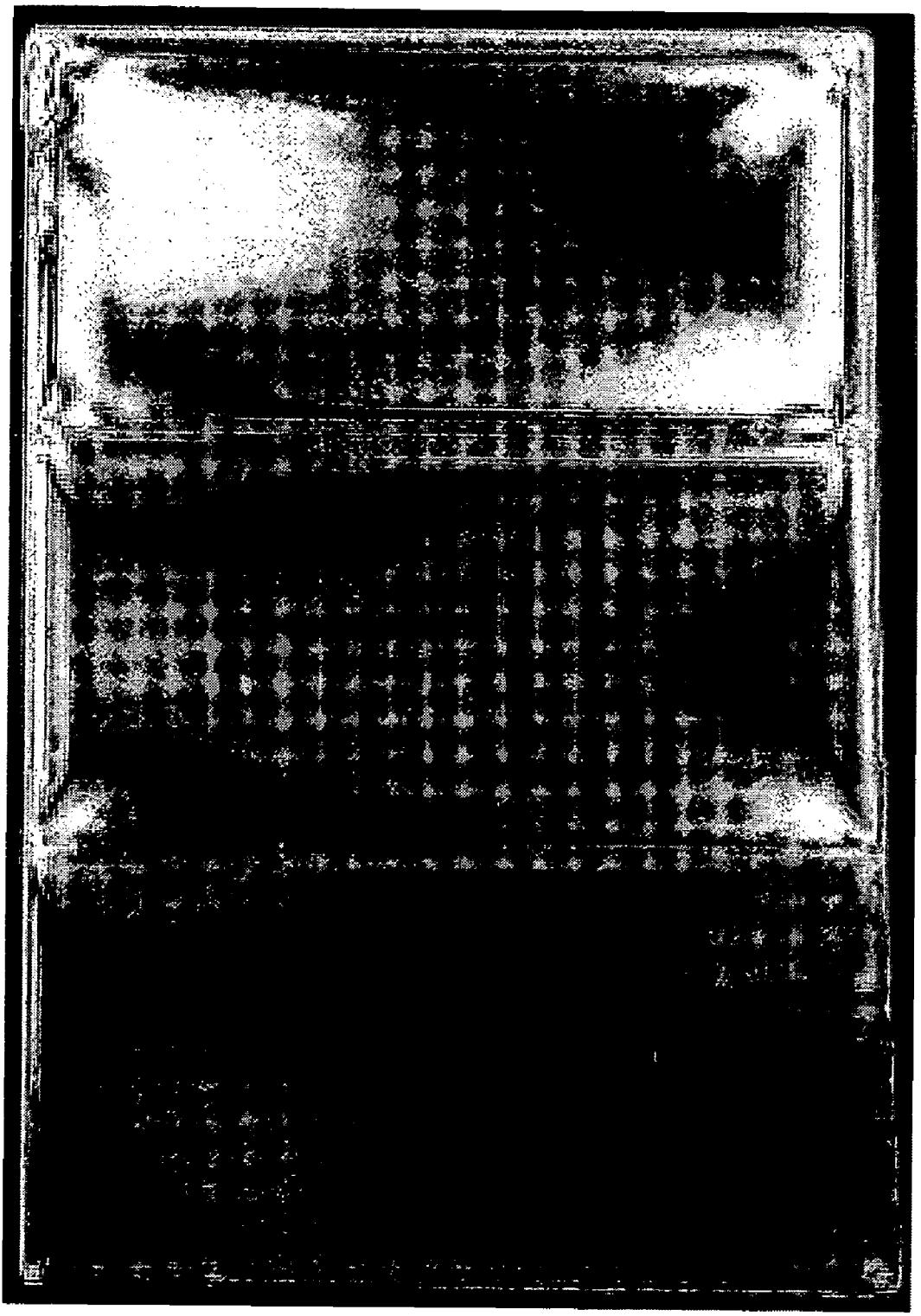
FIG. 2 is a photograph of the surface of a plate obtained in Comparative Example 3, taken through a polarizing plate.

FIG. 1 shows a photograph of a surface of a stepped plate (thickness 1 to 3 mm) obtained in Example 7 taken through polarizing plates. For comparison, further, FIG. 2 shows a similarly taken photograph of surface of a plate formed of the polycarbonate resin obtained in Comparative Example 3.

As is clear from FIG. 1, almost no rainbow pattern by birefringence was observed with regard to the plate obtained in Example 7. In contrast, a rainbow pattern by birefringence was observed all over the plate formed of the polycarbonate resin. In Figure, white portions show a rainbow pattern caused by light leakage.

TABLE 4

| | Resin composition | | | | | | | | |
|---|---|---|---|---|---|---|---|---|---|
| | Polyester resin | Part by weight | Polycarbonate resin | Part by weight | A × p + B × (1 − p) | Mn | Tg (° C.) | MFR (g/10 min) | Refractive index (d ray) |
| Example 1 | A-1 | 90 | B-1 | 10 | 0.71 | 11900 | 138 | 34 | 1.610 |
| Example 2 | A-2 | 80 | B-2 | 20 | 0.68 | 14100 | 132 | 26 | 1.607 |
| Example 3 | A-2 | 50 | B-2 | 50 | 0.61 | 14300 | 145 | 12 | 1.608 |
| Example 4 | A-2 | 20 | B-2 | 80 | 0.53 | 15200 | 175 | 4 | 1.609 |
| Example 5 | A-3 | 40 | B-3 | 60 | 0.67 | 13100 | 168 | 8 | 1.611 |
| Example 6 | A-3 | 40 | B-4 | 60 | 0.46 | 16300 | 129 | 10 | 1.605 |
| Example 7 | A-1 | 80 | B-1 | 20 | 0.66 | 12200 | 145 | 33 | 1.612 |
| Example 8 | A-4 | 80 | B-2 | 20 | 0.66 | 14100 | 132 | 26 | 1.607 |
| Example 9 | A-4 | 60 | B-2 | 40 | 0.61 | 14300 | 138 | 12 | 1.608 |
| CEx. 1 | A-4 | 100 | — | — | — | 14200 | 122 | 54 | 1.607 |
| CEx. 2 | — | — | B-2 | 100 | — | 16600 | 190 | 0.6 | 1.610 |
| CEx. 3 | — | — | B-5 | 100 | — | 12500 | 150 | 66 | 1.584 |

| | | Constant-temperature constant-humidity resistance | | | |
|---|---|---|---|---|---|
| | Photoelastic coefficient ($10^{-12}$ Pa$^{-1}$) | Light transmittance (%) before treatment | Light transmittance (%) after treatment | Variation (%) | Birefringence of molded article |
| Example 1 | 38 | 87 | 85 | 2 | ⊚ |
| Example 2 | 40 | 86 | 84 | 2 | ⊚ |
| Example 3 | 48 | 87 | 86 | 1 | ⊚ |
| Example 4 | 56 | 87 | 85 | 2 | ○ |
| Example 5 | 41 | 87 | 86 | 1 | ⊚ |
| Example 6 | 40 | 88 | 86 | 2 | ⊚ |
| Example 7 | 40 | 87 | 85 | 2 | ⊚ |
| Example 8 | 37 | 86 | 84 | 2 | ⊚ |
| Example 9 | 42 | 87 | 86 | 1 | ⊚ |
| CEx. 1 | 35 | 87 | 30 | 57 | ⊚ |
| CEx. 2 | 62 | 88 | 86 | 2 | Δ |
| CEx. 3 | 85 | 89 | 89 | 0 | X |

CEx. = Comparative Example

Examples 10 to 16 and Comparative Examples 4 to 5

Infrared Absorbing Filter

Examples 10 to 15

The polyester resins and the polycarbonate resins obtained in the above Synthesis examples and infrared absorbents in compositional ratios shown in Table 5 were added to 341 parts of cyclopentanone, and each mixture was separately stirred at room temperature for 10 hours to give coating liquids. In any one of the coating liquids, the dispersion state of a dye was excellent. The coating liquids were separately applied onto glass plates by a spin coating method to form coatings that would have a dry film thickness of 4.0 μm each, and the coatings were dried in an oven at 80° C. for 30 minutes to give coating films (near infrared absorbing filters). In any one of these Examples, the appearance of the film was in an excellent state free of non-uniformity, etc., and when the films were observed for aggregates of dyes, no aggregates, etc., were found.

Example 16

90 Parts of the polyester resin A-1 obtained in the above Synthesis Example and 10 parts of the polycarbonate resin B-1 obtained in the above Synthesis Example, 0.1 part of nickel-bis-1,2-diphenyl-1,2-ethenedithiolate (MIR101, supplied by Midori Kagaku Co., Ltd.), 0.1 part of a phthalocyanine dye (EXCOLOR810K, supplied by Nippon Shokubai Co., Ltd.) and 0.4 part of a dimmonium dye (IRG022, supplied by NIPPON KAYAKU CO., LTD.) were dry-blended, and the blend was melt-kneaded and melt-extruded with a 15Φ twin-screw extrusion kneading machine supplied by TECHNOVEL CORPORATION at a resin temperature of 260° C. to obtain a film having a thickness of 50 μm. The film had an excellent appearance free of non-uniformity, etc., and when the film was observed for aggregates of the dyes, no aggregates, etc., were found. The film was measured for light transmittances before and after the environmental resistance test. Table 6 shows the results.

Comparative Example 4

A coating liquid was prepared from 100 parts of the polyester resin A-1 obtained in the above Synthesis Example in the same manner as in Example 10. The dyes in the coating liquid were in excellent dispersion state. When a coating film was prepared from the above coating liquid in the same manner as in Example 10, the coating film had an excellent appearance free of non-uniformity, etc., and when the film was observed for aggregates of the dyes, no aggregates, etc., were found. The coating film (film) was measured for light transmittances before and after the environmental resistance test. Table 6 shows the results.

Comparative Example 5

A coating liquid was prepared from 100 parts of Panlite L-1250 (a polycarbonate from 2,2-bis(4-hydroxyphenyl)propane) supplied by Teijin Chemicals, Ltd. in the same manner as in Example 10. The dyes in the coating liquid were in excellent dispersion state. A coating film was prepared from the above coating liquid in the same manner as in Example 10, and when the appearance of the coating film (film) was observed, aggregates were found, and the appearance was not good. The film was measured for light transmittances before and after the environmental resistance test. Table 6 shows the results.

The coating films (films) were measured for light transmittances before and after the environmental resistance test. Table 6 shows the results.

TABLE 5

| | Resin composition | | | | | | | | | |
|---|---|---|---|---|---|---|---|---|---|---|
| | Polyester resin | part | Polycarbonate resin | part | Dithiol dye | part | Phthalocyanine dye | part | Diimmonium dye | part |
| Example 10 | A-1 | 90 | B-1 | 10 | MIR101 | 1 | 810K | 1 | IRG022 | 4 |
| Example 11 | A-2 | 80 | B-2 | 20 | MIR101 | 1 | 810K | 1 | IRG022 | 4 |
| Example 12 | A-2 | 50 | B-2 | 50 | MIR101 | 1 | 810K | 1 | IRG022 | 4 |
| Example 13 | A-2 | 20 | B-2 | 80 | MIR101 | 1 | 810K | 1 | IRG022 | 4 |
| Example 14 | A-3 | 40 | B-3 | 60 | MIR101 | 1 | 810K | 1 | IRG022 | 4 |
| Example 15 | A-3 | 40 | B-4 | 60 | MIR101 | 1 | 810K | 1 | IRG022 | 4 |
| Example 16 | A-1 | 90 | B-1 | 10 | MIR101 | 0.1 | 810K | 0.1 | IRG022 | 0.4 |
| CEx. 4 | A-1 | 100 | — | — | MIR101 | 1 | 810K | 1 | IRG022 | 4 |
| CEx. 5 | — | — | Panlite | 100 | MIR101 | 1 | 810K | 1 | IRG022 | 4 |

CEx. = Comparative Example

TABLE 6

| | Resin composition | | | | | | Before environmental resistance test | | After environmental resistance test | |
|---|---|---|---|---|---|---|---|---|---|---|
| | | | | | | | Visible | | Visible | |
| | Polyester resin | part | Polycarbonate resin | part | $A \times p + B \times (1 - p)$ | Mn | Aggregation | light transmittance (%) | Infrared transmittance (%) | light transmittance (%) | Infrared transmittance (%) |
| Example 10 | A-1 | 90 | B-1 | 10 | 0.71 | 11900 | No | 70.1 | 5.4 | 71.2 | 9.7 |

TABLE 6-continued

| | Resin composition | | | | | | Before environmental resistance test | | After environmental resistance test | |
|---|---|---|---|---|---|---|---|---|---|---|
| | | | | | | | Visible | | Visible | |
| | Polyester resin | part | Poly-carbonate resin | part | A × p + B × (1 − p) | Mn | Aggregation | light transmittance (%) | Infrared transmittance (%) | light transmittance (%) | Infrared transmittance (%) |
| Example 11 | A-2 | 80 | B-2 | 20 | 0.68 | 14100 | No | 69.8 | 5.7 | 70.1 | 7.9 |
| Example 12 | A-2 | 50 | B-2 | 50 | 0.61 | 14300 | No | 69.4 | 5.6 | 70.3 | 6.5 |
| Example 13 | A-2 | 20 | B-2 | 80 | 0.53 | 15200 | No | 68.9 | 4.9 | 69.6 | 5.8 |
| Example 14 | A-3 | 40 | B-3 | 60 | 0.67 | 13100 | No | 69.2 | 5.2 | 69.8 | 5.9 |
| Example 15 | A-3 | 40 | B-4 | 60 | 0.46 | 16300 | No | 70.5 | 5.3 | 71.3 | 6.0 |
| Example 16 | A-1 | 90 | B-1 | 10 | 0.71 | 11900 | No | 69.8 | 5.6 | 70.6 | 9.9 |
| CEx. 4 | A-1 | 100 | — | — | — | 11200 | No | 71.4 | 4.8 | 73.2 | 38.5 |
| CEx. 5 | — | — | Panlite | 100 | — | | Yes | 70.8 | 71.3 | 71.0 | 71.8 |

CEx. = Comparative Example

As is clear from Table 6, the infrared absorbing filters obtained in Examples 10 to 16 were free of aggregation of the dyes, had high visible light transmittances and had excellent infrared absorbing capability represented by low infrared transmittances. Further, they showed no deterioration of their infrared absorbing capability in the environmental resistance test. On the other hand, the infrared absorbing filter obtained in Comparative Example 4 exhibited infrared absorbing capability like those in Examples, while it showed a deterioration of the filter in the environmental resistance test. In Comparative Example 5, further, the dyes aggregated and no uniform infrared absorbing filter could be obtained.

Examples 17 to 22 and Comparative Examples 6 to 8

Retardation Films

Polyester resins, polycarbonate resins, resin compositions or the films obtained in Synthesis Examples A-5 and A-6 or Synthesis Examples B-6 to B-8, Examples 17 to 22 or Comparative Examples 6 to 8 were evaluated by the following methods.

(1) Measurement of number average molecular weight (Mn): Measured in the same manner as in the (1) Measurement of number average molecular weight (Mn) in the above Example 1.

(2) Tg measurement: Measured in the same manner as in the (2) Tg measurement in the above Example 1.

(3) Melt volume flow rate (MVR): A polymer that flowed out at 300° C. for 10 minutes under a load of 1.2 kg was measured for an amount (cm$^3$) according to JIS K-7210 with a melt flow index measuring apparatus supplied by Toyo Seiki Seisaku-sho, Ltd.

(4) Photoelastic modulus: Measured in the same manner as in the (6) Photoelastic coefficient in the above Example 1.

(5) Retardation measurement: A sample film was measured for Re values at 550 nm with a spectroscopic ellipsometer M-220 supplied by JASCO Corporation in a state where incidence light and the surface of a sample film were at right angles with each other. Each sample film was measured in a total of five points, the center of the film and two places each in the width directions from the center at intervals of 10 mm, an average value was taken as an Re value, and a difference between a maximum value and a minimum value of the measured Re values (maximum Re value−minimum Re value) was taken as an Re value variation.

(6) Evaluation of viewing angle property: With regard to a stretched film, a ratio of a difference between an Re value in the normal direction of the sample film and an Re value at oblique incidence at 40° from the normal to the Re value in the normal direction of the sample film was measured each in a total of five points, the center of the sample film and two places each in the width directions from the center at intervals of 10 mm, with a spectroscopic ellipsometer M-220 supplied by JASCO Corporation, and an average thereof was taken as a viewing angle property of the stretched film.

(7) Durability against heat: A stretched film was heat-treated at 90° C. for 1,000 hours and then measured for Re values in the same manner as in the above (5), to determine a difference between the Re value before the heat treatment and the Re value after the heat treatment.

<Synthesis of Polyester Resin A-5>

A reactor equipped with a thermometer, a stirrer and a pressure-reducing device was charged with 3,467 parts of cyclohexanedicarboxylic acid, 1,000 parts of ethylene glycol and 3,532 parts of 9,9-bis[4-(2-hydroxyethoxy)phenyl]fluorene, these materials were gradually melted under heat with stirring and an esterification reaction was carried out at a temperature of 220 to 230° C. Then, 2.58 parts of germanium oxide was added, and while the reaction system was gradually temperature-increased up to 290° C. and pressure-reduced to 100 Pa, ethylene glycol was removed to give a polyester resin A-5 having a fluorene skeleton. The weight ratio of the 9,9-bis[4-(2-hydroxyethoxy)phenyl]fluorene introduced into A-5 to A-5 was 0.50. This A-5 had an Mn of 13,000, a Tg of 104° C. and a refractive index (d ray) of 1.591.

<Synthesis of Polyester Resin A-6>

A reactor equipped with a thermometer, a stirrer and a pressure-reducing device was charged with 9,247 parts of cyclohexanedicarboxylic acid, 1,000 parts of ethylene glycol and 18,839 parts of 9,9-bis[4-(2-hydroxyethoxy)phenyl]fluorene, these materials were gradually melted under heat with stirring and an esterification reaction was carried out at a temperature of 220 to 230° C. Then, 6.88 parts of germanium oxide was added, and while the reaction system was gradually temperature-increased up to 290° C. and pressure-reduced to 100 Pa, ethylene glycol was removed to give a polyester resin A-6 having a fluorene skeleton. The weight ratio of the 9,9-bis[4-(2-hydroxyethoxy)phenyl]fluorene introduced into A-6 to A-6 was 0.70. This A-6 had an Mn of 12,400, a Tg of 113° C. and a refractive index (d ray) of 1.607.

<Synthesis of Polycarbonate Resin B-6>

A reactor equipped with a thermometer, a stirrer and a reflux condenser was charged with 10,089 parts of deionized water and 2,271 parts of a 48% sodium hydroxide aqueous solution, and 887.6 parts of 2,2-bis(4-hydroxyphenyl)propane, 1,472 parts of 9,9-bis(4-hydroxy-3-methylphenyl)fluorene and 4.5 parts of sodium hydrosulfite were dissolved therein. 7,925 Parts of methylene chloride was added, and then while the mixture was stirred, 1,000 parts of phosgene was blown into the mixture at 16 to 20° C. over 60 minutes. After completion of blowing of the phosgene, 47.9 parts of p-tert-butylphenol and 327 parts of a 48% sodium hydroxide aqueous solution were added, 1.57 parts of triethylamine was further added, and the mixture was stirred at 20 to 27° C. for 40 minutes to complete the reaction. A methylene chloride layer containing a formed product was washed with diluted hydrochloric acid and pure water, and then methylene chloride was evaporated off to give a polycarbonate resin B-6 having a fluorene skeleton. The weight ratio of 9,9-bis(4-hydroxy-3-methylphenyl)fluorene introduced into B-6 to B-6 was 0.58. This B-6 had an Mn of 15,500, a Tg of 200° C. and a refractive index (d ray) of 1.618.

<Synthesis of Polycarbonate Resin B-7>

A reactor equipped with a thermometer, a stirrer and a reflux condenser was charged with 9,809 parts of deionized water and 2,333 parts of a 48% sodium hydroxide aqueous solution, and 1,617 parts of 4,4'-(m-phenylenediisopropylidene)diphenol, 1,177 parts of 9,9-bis(4-hydroxy-3-methylphenyl)fluorene and 5.4 parts of sodium hydrosulfite were dissolved therein. 7,265 Parts of methylene chloride was added, and then while the mixture was stirred, 1,000 parts of phosgene was blown into the mixture at 16 to 20° C. over 60 minutes. After completion of blowing of the phosgene, 43.2 parts of p-tert-butylphenol and 330 parts of a 48% sodium hydroxide aqueous solution were added, 1.65 parts of triethylamine was further added, and the mixture was stirred at 20 to 27° C. for 60 minutes to complete the reaction. A methylene chloride layer containing a formed product was washed with diluted hydrochloric acid and pure water, and then methylene chloride was evaporated off to give a polycarbonate resin B-7 having a fluorene skeleton. The weight ratio of 9,9-bis(4-hydroxy-3-methylphenyl)fluorene introduced into B-7 to B-7 was 0.39. This B-7 had an Mn of 19,500, a Tg of 144° C. and a refractive index (d ray) of 1.612.

<Synthesis of Polycarbonate Resin B-8>

A reactor equipped with a thermometer, a stirrer and a reflux condenser was charged with 9,809 parts of deionized water and 2,271 parts of a 48% sodium hydroxide aqueous solution, and 1,775 parts of 2,2-bis(4-hydroxyphenyl)propane and 3.5 parts of sodium hydrosulfite were dissolved therein. 7,925 Parts of methylene chloride was added, and then while the mixture was stirred, 1,000 parts of phosgene was blown into the mixture at 16 to 20° C. over 60 minutes. After completion of blowing of the phosgene, 29.2 parts of p-tert-butylphenol and 327 parts of a 48% sodium hydroxide aqueous solution were added, 1.57 parts of triethylamine was further added, and the mixture was stirred at 20 to 27° C. for 40 minutes to complete the reaction. A methylene chloride layer containing a formed product was washed with diluted hydrochloric acid and pure water, and then methylene chloride was evaporated off to give a polycarbonate resin B-8 containing no fluorene structure. This B-8 had an Mn of 23,500, a Tg of 152° C. and a refractive index (d ray) of 1.584.

<Formation and Stretching of Film>

The polyester resins and polycarbonate resins obtained in the above Synthesis Examples were dry-blended in compositional ratios shown in Table 7, and each dry blend was separately melt-kneaded with a 15Φ twin-screw extrusion kneading machine supplied by TECHNOVEL CORPORATION at a resin temperature of 250 to 290° C., to give pellets. The pellets of each of the thus-obtained resin compositions were measured for an Mn, a Tg and an MVR. Table 7 shows the results.

Further, a T-die having a width of 150 mm and a lip width of 500 μm and a film take-up apparatus were mounted on the above extruder, and films were formed with the extruder to obtain transparent extrusion films. The film formation was carried out by the following method while conditions were adjusted. (1) Pellets were extruded at the same resin temperature as a resin temperature during the preparation of the pellets, and the temperature of the T-die was adjusted in a range between the resin temperature and the resin temperature +20° C. for adjusting the discharge state of the resin. (2) The take-up rate was adjusted in the range of 0.3 m/minutes±0.1 m/minute for adjusting the film thickness. (3) The temperature of a take-up roll was adjusted in a range between Tg−30° C. and Tg+30° C. for adjusting the condition (a presence or absence of non-uniformity caused by rapid cooling) of a film on the take-up roll.

Samples having a 100 mm long×70 mm wide size each, which were taken from the middle portions each of the above-obtained films, were monoaxially stretched at a stretch ratio of 2.0 in the length direction at Tg+10° C. to give stretched films.

Example 17

A sample having a 50 mm×10 mm size was taken from the film (thickness 105 μm±0.8 μm) obtained above, and the sample was measured for a photoelastic coefficient. The stretched film (length 200 mm×width 56 mm and thickness 66 μm±0.5 μm) obtained by the monoaxial stretching at a stretch ratio of 2.0 at 140° C. (Tg+10° C.) was measured for a retardation and evaluated for viewing angle properties and durability against heat. Table 7 shows the results.

Example 18

The film (thickness 104 μm±0.8 μm) obtained above was evaluated for a photoelastic coefficient in the same manner as in Example 17. Further, the stretched film (length 200 mm×width 57 mm and thickness 64 μm±0.5 μm) obtained by the monoaxial stretching at Tg+10° C. was measured for a retardation and evaluated for viewing angle properties and durability against heat in the same manner as in Example 17. Table 7 shows the results.

Example 19

The film (thickness 104 μm±0.8 μm) obtained above was evaluated for a photoelastic coefficient in the same manner as in Example 17. Further, the stretched film (length 200 mm×width 58 mm and thickness 63 μm±0.5 μm) obtained by the monoaxial stretching at Tg+10° C. was measured for a retardation and evaluated for viewing angle properties and durability against heat in the same manner as in Example 17. Table 7 shows the results.

Example 20

The film (thickness 102 μm±0.8 μm) obtained above was evaluated for a photoelastic coefficient in the same manner as in Example 17. Further, the stretched film (length 200 mm×width 55 mm and thickness 65 μm±0.5 μm) obtained by the monoaxial stretching at Tg+10° C. was measured for a retardation and evaluated for viewing angle properties and durability against heat in the same manner as in Example 17. Table 7 shows the results.

Example 21

The film (thickness 104 μm±0.8 μm) obtained above was evaluated for a photoelastic coefficient in the same manner as in Example 17. Further, the stretched film (length 200 mm×width 57 mm and thickness 64 μm±0.5 μm) obtained by the monoaxial stretching at Tg+10° C. was measured for a retardation and evaluated for viewing angle properties and durability against heat in the same manner as in Example 17. Table 7 shows the results.

Example 22

The film (thickness 109 μm±0.8 μm) obtained above was evaluated for a photoelastic coefficient in the same manner as in Example 17. Further, the stretched film (length 200 mm×width 58 mm and thickness 66 μm±0.5 μm) obtained by the monoaxial stretching at Tg+10° C. was measured for a retardation and evaluated for viewing angle properties and durability against heat in the same manner as in Example 17. Table 7 shows the results.

Comparative Example 6

Pellets were prepared from only the polycarbonate resin B-8 obtained in the above Synthesis Example in the same manner as in Example 17, and the thus-obtained pellets were measured for an Mn, a Tg and a MVR. A film (thickness 104 μm±0.8 μm) was formed in the same manner as in Example 17 and evaluated for a photoelastic coefficient. Further, a stretched film having a length of 200 mm, a width of 56 mm and a thickness of 65 μm±0.5 μm was obtained by carrying out the monoaxial stretching at Tg+10° C. in the same manner as in Example 17, and the stretched film was measured for a retardation and evaluated for viewing angle properties and durability against heat. Table 7 shows the results.

Comparative Example 7

Pellets were prepared from only the polyester resin A-5 obtained in the above Synthesis Example in the same manner as in Example 17, and the thus-obtained pellets were measured for an Mn, a Tg and a MVR. A film (thickness 111 μm±0.8 μm) was formed in the same manner as in Example 17 and evaluated for a photoelastic coefficient. Further, a stretched film having a length of 200 mm, a width of 58 mm and a thickness of 67 μm±0.5 μm was obtained by carrying out the monoaxial stretching at Tg+10° C. in the same manner as in Example 17, and the stretched film was measured for a retardation and evaluated for viewing angle properties and durability against heat. Table 7 shows the results.

Comparative Example 8

Pellets were prepared from only the polycarbonate resin B-2 obtained in the above Synthesis Example in the same manner as in Example 17, and the thus-obtained pellets were measured for an Mn, a Tg and a MVR. A film (thickness 109 μm±0.8 μm) was formed in the same manner as in Example 17 and evaluated for a photoelastic coefficient. Further, a stretched film having a length of 200 mm, a width of 57 mm and a thickness of 67 μm±0.5 μm was obtained by carrying out the monoaxial stretching at Tg+10° C. in the same manner as in Example 17, and the stretched film was measured for a retardation and evaluated for viewing angle properties and durability against heat. Table 7 shows the results.

TABLE 7

| | Resin composition | | | | | Properties of composition | | | |
| | Polyester resin | Part by weight | Poly-carbonate resin | Part by weight | $A \times p + B \times (1 - p)$ | Mn | Tg (° C.) | MVR (cm³/10 min) | Photo-elastic coefficient ($10^{-12}$ Pa$^{-1}$) |
|---|---|---|---|---|---|---|---|---|---|
| Example 17 | A-5 | 50 | B-1 | 50 | 0.39 | 13900 | 130 | 71 | 53 |
| Example 18 | A-6 | 20 | B-2 | 80 | 0.52 | 15100 | 160 | 11 | 52 |
| Example 19 | A-6 | 60 | B-2 | 40 | 0.61 | 13700 | 139 | 36 | 44 |
| Example 20 | A-6 | 50 | B-6 | 50 | 0.64 | 13500 | 148 | 24 | 42 |
| Example 21 | A-5 | 30 | B-3 | 70 | 0.67 | 13400 | 177 | 12 | 40 |
| Example 22 | A-5 | 40 | B-7 | 60 | 0.43 | 16300 | 122 | 45 | 42 |
| CEx. 6 | — | — | B-8 | 100 | — | 23500 | 152 | 7.2 | 85 |
| CEx. 7 | A-5 | 100 | — | — | — | 13000 | 104 | 99 | 32 |
| CEx. 8 | — | — | B-2 | 100 | — | 16600 | 190 | 2.0 | 62 |

| | Optical properties | | | |
| | Re value (nm) | Re value variation (nm) | Viewing angle properties (%) | Durability against heat (difference in Re value) (nm) |
|---|---|---|---|---|
| Example 17 | 180 | 2 | 7 | 2 |
| Example 18 | 462 | 3 | 7 | 1 |

TABLE 7-continued

| | | | | |
|---|---|---|---|---|
| Example 19 | 330 | 3 | 6 | 1 |
| Example 20 | 124 | 2 | 4 | 2 |
| Example 21 | 81 | 1 | 5 | 1 |
| Example 22 | 402 | 3 | 6 | 2 |
| CEx. 6 | 711 | 10 | 17 | 2 |
| CEx. 7 | 52 | 1 | 4 | 15 |
| Cex. 8 | 488 | 3 | 7 | 1 |

CEx. = Comparative Example

It is seen that the resin compositions constituting the films shown in Examples 17 to 22 have high melt flowability and excellent moldability. It is seen that the stretched film obtained from the above compositions have low photoelastic coefficients and low birefringence and show small variations of Re values. It is also seen that they are excellent in viewing angle properties and are also excellent in durability against heat.

On the other hand, the stretched film shown in Comparative Example 6 has a large variation of Re value and is also poor in viewing angle properties. The stretched film shown in Comparative Example 7 is poor in durability against heat. It is seen that the stretched film shown in Comparative Example 8 is excellent in optical properties and durability against heat, but that it has low melt flowability and is hence poor in moldability.

As explained above, the retardation film of this invention is constituted of the resin composition having low birefringence and having excellent moldability, and obtained by stretching, the retardation film is a retardation film that has little variation of Re value and is hence optically uniform, so that it is clearly useful.

INDUSTRIAL UTILITY

The resin composition (RC) of this invention can be applied to lenses of optical machines and equipment, optical films, optical sheets, etc., which are used in various optical fields in various environments.

The invention claimed is:

1. A resin composition consisting essentially of:
    a polyester resin comprising a dicarboxylic acid component and a diol component (a), and
    a polycarbonate resin comprising a carbonate-forming component and a diol component (b),
    wherein:
    the diol component (a) contains a compound of the following formula (1), and
    the diol component (b) contains a compound of the following formula (1) and/or a compound of the following formula (2),

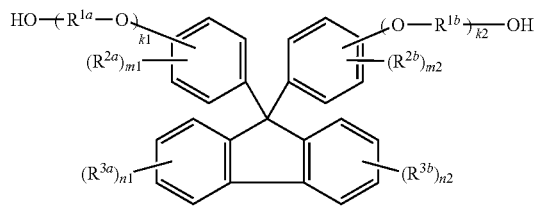

(1)

wherein $R^{1a}$ and $R^{1b}$ represent the same or different $C_{2-10}$ alkylene groups, $R^{2a}$, $R^{2b}$, $R^{3a}$ and $R^{3b}$ represent the same or different hydrogen atoms or $C_{1-6}$ alkyl groups, k1 and k2 represent the same or different integers of 1 or greater and m1, m2, n1 and n2 represent the same or different integers of 1 to 4,

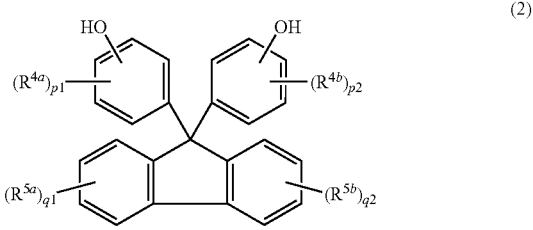

(2)

wherein $R^{4a}$, $R^{4b}$, $R^{5a}$ and $R^{5b}$ represent the same or different hydrogen atoms or $C_{1-6}$ alkyl groups, and p1, p2, q1 and q2 represent the same or different integers of 1 to 4.

2. The resin composition of claim 1, wherein the dicarboxylic acid component is an alicyclic dicarboxylic acid.

3. The resin composition of claim 1, wherein the diol component (a) contains the compound of the formula (1) in which k1 and k2 are integers of 1 to 4, $R^{1a}$ and $R^{1b}$ are $C_{2-4}$ alkylene groups, $R^{2a}$, $R^{2b}$, $R^{3a}$ and $R^{3b}$ are hydrogen atoms or $C_{1-6}$ alkyl groups and m1, m2, n1 and n2 are 1 or 2.

4. The resin composition of claim 1, wherein the diol component (a) contains the compound of the formula (1) and an aliphatic diol.

5. The resin composition of claim 1, wherein the diol component (a) contains at least 10 mol % of the compound of the formula (1).

6. The resin composition of claim 1, wherein the diol component (b) contains the compound of the formula (2) in which p1 and p2 are 1 or 2 and $R^{4a}$ and $R^{4b}$ are hydrogen atoms or $C_{1-4}$ alkyl groups.

7. The resin composition of claim 1, wherein the diol component (b) contains the compound of the formula (1) and/or the compound of the formula (2) and bisphenols.

8. The resin composition of claim 1, wherein the total content of the compound of the formula (1) and the compound of the formula (2) in the diol component (b) is 10 mol % or more.

9. The resin composition of claim 1, wherein, when the weight ratio of the compound of the formula (1) introduced into the polyester resin is A, when the weight ratio of the compound of the formula (1) and the compound of the formula (2) introduced into the polycarbonate resin is B and when the weight ratio of the polyester resin to the entire composition is p, the weight ratios A, B and p satisfy the following expression, $$0.1 \leq A \times p + B \times (1-p) < 1$$

wherein each of A, B and p is a value that is greater than 0 but smaller than 1.

10. The resin composition of claim 1, wherein the polyester resin and the polycarbonate resin have a former/latter weight ratio of from 5/95 to 98/2.

11. The resin composition of claim 1, wherein the polyester resin and the polycarbonate resin have a number average molecular weight (Mn) of 5,000 to 50,000 each.

12. The resin composition of claim 1, which consists essentially of the polyester resin and the polycarbonate resin, wherein:

the polyester resin is a polyester resin containing 10 to 100 mol % of a recurring unit of the following formula (A-1) and 0 to 90 mol % of a recurring unit of the following formula (A-2) and having a number average molecular weight (Mn) of 5,000 to 50,000,

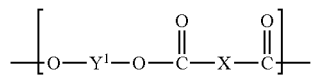

(A-1)

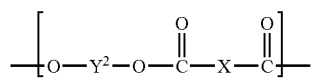

(A-2)

wherein $Y^1$ represents the following formula,

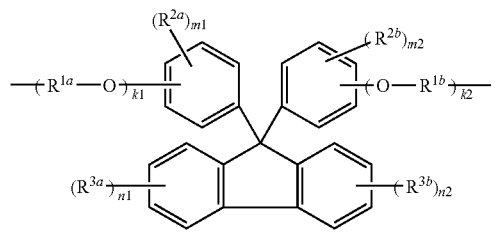

in which $R^{1a}$ and $R^{1b}$ represent the same or different $C_{2-10}$ alkylene groups, each of $R^{2a}$, $R^{2b}$, $R^{3a}$ and $R^{3b}$ is the same or different from each other, and represents a hydrogen atom, a $C_{1-10}$ hydrocarbon group or a halogen atom, k1 and k2 represent the same or different integers of 1 to 4 and each of m1, m2, n1 and n2 represent the same or different integers of 1 to 4, X represents a divalent $C_{1-15}$ hydrocarbon group and $Y^2$ represents a divalent $C_{1-10}$ hydrocarbon group, and the polycarbonate resin is a polycarbonate resin containing 10 to 100 mol % of a recurring unit of the following formula (B-1) and 0 to 90 mol % of a recurring unit of the following formula (B-2) and having a number average molecular weight (Mn) of 5,000 to 50,000,

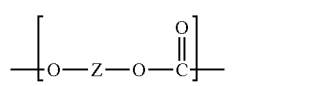

(B-1)

-continued

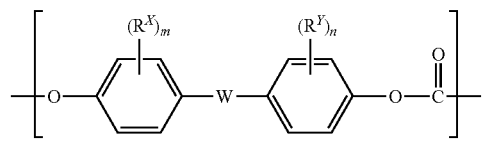

(B-2)

wherein Z represents

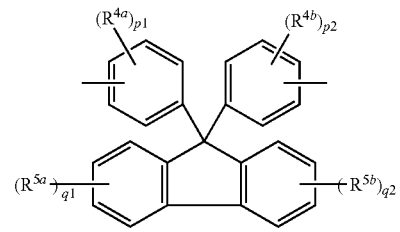

in which each of $R^{4a}$, $R^{4b}$, $R^{5a}$ and $R^{5b}$ is the same or different from each other, and represents a hydrogen atom, $C_{1-10}$ alkyl or a halogen atom and each of p1, p2, q1 and q2 is a same or different integer of 1 to 4, W is a single bond, a $C_{1-10}$ alkylidene group, a $C_{4-15}$ cycloalkylidene group, sulfonyl, a sulfide group, an oxide group or a di($C_{1-4}$ alkylidene)phenylene group, each of $R^x$ and $R^Y$ is same or different each other and a hydrogen atom, a halogen atom, phenyl or $C_{1-4}$ alkyl, and each of m and n is independently an integer of 1 to 4.

13. The resin composition of claim 12, wherein X in each of the formulae (A-1) and (A-2) is a $C_{4-15}$ substituted or non-substituted alicyclic hydrocarbon group.

14. The resin composition of claim 12, wherein, in the formula represented by $Y^1$ in the formula (A-1), $R^{1a}$ and $R^{1b}$ are the same or different $C_{2-4}$ alkylene groups, each of $R^{2a}$, $R^{2b}$, $R^{3a}$ and $R^{3b}$ is the same or different from each other, and represents a hydrogen atom or a $C_{1-6}$ hydrocarbon group, k1 and k2 are the same or different integers of 1 to 4 and m1, m2, n1 and n2 are the same or different integers of 1 or 2.

15. The resin composition of claim 12, wherein $Y^2$ in the formula (A-2) is a $C_{2-6}$ alkylene group or a $C_{6-12}$ cycloalkylene group.

16. The resin composition of claim 12, wherein, in the formula represented by Z in the formula (B-1), each of $R^{4a}$, $R^{4b}$, $R^{5a}$ and $R^{5b}$ is the same or different from each other, and represents a hydrogen atom or $C_{1-4}$ alkyl and each of p1, p2, q1 and q2 is same or different 1 or 2, and in the formula (B-2), each of $R^x$ and $R^Y$ is a same or different hydrogen atom or $C_{1-4}$ alkyl and each of m and n is independently 1 or 2.

17. The resin composition of claim 12, wherein W in the formula (B-2) is a single bond, a $C_{1-6}$ alkylidene group, a $C_{5-10}$ cycloalkylidene group or a di($C_{1-3}$ alkylidene)phenylene group.

18. The resin composition of claim 12, wherein, in the formula represented by $Y^1$ in the formula (A-1), $R^{1a}$ and $R^{1b}$ are ethylene groups, each of $R^{2a}$, $R^{2b}$, $R^{3a}$ and $R^{3b}$ is the same or different from each other, and represents a hydrogen atom, $C_{1-4}$ alkyl group or phenyl group, each of k1 and k2 is 1 and each of m1, m2, n1 and n2 is independently 1 or 2, in the formula (A-2), $Y^2$ is a $C_{2-4}$ alkylene group or

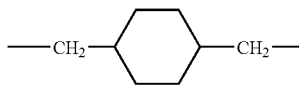

and X is a $C_{5-10}$ cycloalkylene group, in the formula represented by Z in the formula (B-1), each of $R^{4a}$, $R^{4b}$, $R^{5a}$ and $R^{5b}$ is the same or different from each other, and represents a hydrogen atom, methyl or ethyl and each of p1, p2, q1 and q2 is same or different 1 or 2, and in the formula (B-2), W is a single bond, a $C_{1-4}$ alkylidene group, a $C_{6-9}$ cycloalkylidene group or a di($C_{1-3}$ alkylidene)phenylene group and $R^x$ and $R^Y$ are hydrogen atoms.

19. The resin composition of claim 12, wherein, in the formula represented by $Y^1$ in the formula (A-1), $R^{1a}$ and $R^{1b}$ are ethylene groups, $R^{2a}$, $R^{2b}$, $R^{3a}$ and $R^{3b}$ are hydrogen atoms and each of k1 and k2 is 1, in the formula (A-2), $Y^2$ is a $C_{2-4}$ alkylene group and X is a cycloalkylene group, in the formula represented by Z in the formula (B-1), each of $R^{4a}$ and $R^{4b}$ is methyl, $R^{5a}$ and $R^{5b}$ are hydrogen atoms and each of p1 and p2 is 1, and in the formula (B-2), W is an isopropylidene group or

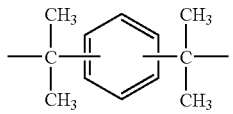

and $R^x$ and $R^Y$ are hydrogen atoms.

20. The resin composition of claim 12, wherein the polyester resin contains 20 to 100 mol % of the recurring unit of the formula (A-1) and 0 to 80 mol % of the recurring unit of the formula (A-2), and the polycarbonate resin contains 20 to 100 mol % of the recurring unit of the formula (B-1) and 0 to 80 mol % of the recurring unit of the formula (B-2).

21. The resin composition of claim 12, wherein the polyester resin contains 50 to 100 mol % of the recurring unit of the formula (A-1) and 0 to 50 mol % of the recurring unit of the formula (A-2), and the polycarbonate resin contains 30 to 100 mol % of the recurring unit of the formula (B-1) and 0 to 70 mol % of the recurring unit of the formula (B-2).

22. The resin composition of claim 12, wherein the polyester resin and the polycarbonate resin have a former/latter weight ratio of from 15/85 to 98/2.

23. The resin composition of claim 12, wherein the polyester resin and the polycarbonate resin have a former/latter weight ratio of from 20/80 to 98/2.

24. The resin composition of claim 12, wherein, when the weight ratio of the unit of —O—$Y^1$—O— introduced into the polyester resin is A', when the weight ratio of the unit of —O—Z—O— and the unit of —O—$Y^1$—O— introduced into the polycarbonate resin is B' and when the weigh ratio of the polyester resin to the entire composition is p, the weight ratios A', B' and p satisfy the following expression, $$0.1 \leq A' \times p + B' \times (1-p) < 1$$

wherein each of A', B' and p is a value that is greater than 0 but smaller than 1.

25. A process for the production of the resin composition of claim 1, which comprises melt-blending:
a polyester resin comprising a dicarboxylic acid component and a diol component (a) containing a compound of the following formula (1), and
a polycarbonate resin comprising a carbonate-forming component and a diol component (b) containing a compound of the following formula (1) and/or a compound of the following formula (2),

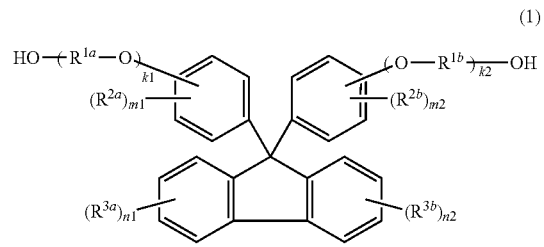

wherein $R^{1a}$ and $R^{1b}$ represent the same or different $C_{2-10}$ alkylene groups, $R^{2a}$, $R^{2b}$, $R^{3a}$ and $R^{3b}$ represent the same or different hydrogen atoms or $C_{1-6}$ alkyl groups, k1 and k2 represent the same or different integers of 1 or greater and m1, m2, n1 and n2 represent the same or different integers of 1 to 4,

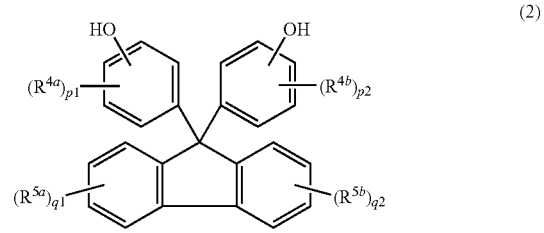

wherein $R^{4a}$, $R^{4b}$, $R^{5a}$ and $R^{5b}$ represent the same or different hydrogen atoms or $C_{1-6}$ alkyl groups, and p1, p2, q1 and q2 represent the same or different integers of 1 to 4.

26. A lens comprising the resin composition recited in claim 1.

27. The lens of claim 26, wherein the compound of the formula (1) accounts for at least 20 mol % of the diol component (a).

28. The lens of claim 26, wherein the compound of the formula (1) and/or the compound of the formula (2) account or accounts for at least 20 mol % of the diol component (b).

29. The lens of claim 26, wherein, when the weight ratio of the compound of the formula (1) introduced into the polyester resin is A, when the weight ratio of the compound of the formula (1) and the compound of the formula (2) introduced into the polycarbonate resin is B and when the weigh ratio of the polyester resin to the entire resin composition is p, the weight ratios A, B and p satisfy the following expression, $$0.2 \leq A \times p + B \times (1-p) < 1$$

wherein each of A, B and p is a value that is greater than 0 but smaller than 1.

30. The lens of claim 26, wherein the polyester resin and the polycarbonate resin has a former/latter weight ratio of from 10/90 to 80/20.

31. The lens of claim 26, wherein the resin composition has a glass transition temperature of 100° C. or higher and a refractive index of 1.59 to 1.7.

32. The lens of claim 26, wherein each of the polyester resin and the polycarbonate resin has a refractive index of 1.59 to 1.7.

33. The lens of claim 26, which constitutes a lens for an image-sensing device.

34. The lens of claim 33, wherein the lens for an image-sensing device is a lens for a digital camera, a lens for a camera of a cellphone or a lens for an in-vehicle camera.

35. A process for the production of the lens recited in claim 26, which comprises blending:
    a polyester resin comprising a dicarboxylic acid component and a diol component (a) containing a compound of the following formula (1), and
    a polycarbonate resin comprising a carbonate-forming component and a diol component (b) containing a compound of the following formula (1) and/or a compound of the following formula (2), and
    molding the thus-obtained blend,

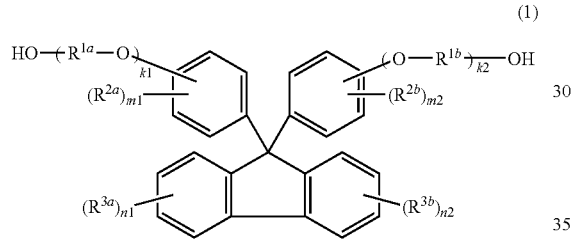

(1)

wherein $R^{1a}$ and $R^{1b}$ represent the same or different $C_{2-10}$ alkylene groups, $R^{2a}$, $R^{2b}$, $R^{3a}$ and $R^{3b}$ represent the same or different hydrogen atoms or $C_{1-6}$ alkyl groups, k1 and k2 represent the same or different integers of 1 or greater and m1, m2, n1 and n2 represent the same or different integers of 1 to 4,

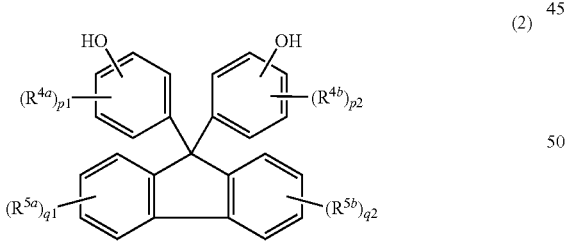

(2)

wherein $R^{4a}$, $R^{4b}$, $R^{5a}$ and $R^{5b}$ represent the same or different hydrogen atoms or $C_{1-6}$ alkyl groups, and p1, p2, q1 and q2 represent the same or different integers of 1 to 4.

36. The resin composition of claim 1, which contains a dye having infrared absorbing capability.

37. An infrared absorbing filter comprising the resin composition recited in claim 36.

38. The infrared absorbing filter of claim 37, wherein the dye having infrared absorbing capability is at least one compound selected from the group consisting of compounds of the following formulae (5) to (9),

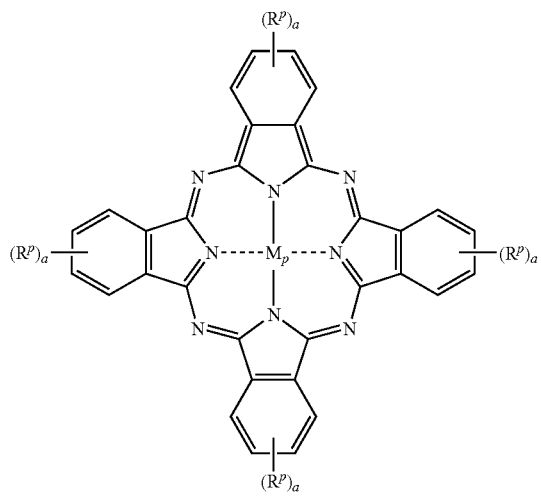

(5)

wherein each of substituents $R^P$ is the same or different from each other and represents a halogen atom, alkyl, alkoxy, aryl, aryloxy, aralkyl, an amino group, an amide group, an imide group or arylthio and may have a substituent, adjacent substituents $R^P$ may form a ring, a is an integer of 0 to 4, and Mp is a hydrogen atom, a metal atom having a valence of 2 to 6 or an oxide thereof and its valence may be balanced with counter anion,

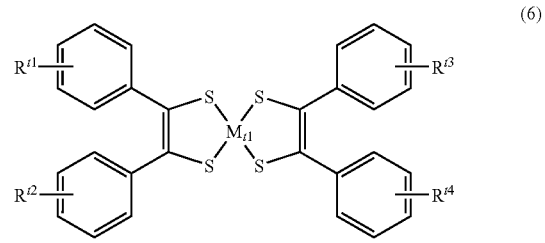

(6)

wherein each of $R^{t1}$, $R^{t2}$, $R^{t3}$ and $R^{t4}$ is the same or different from each other and is a hydrogen atom, a halogen atom, alkyl, aryl, aralkyl, alkoxy, aryloxy or amino and may have a substituent, and $M_{t1}$ is a tetra-coordination transition metal atom,

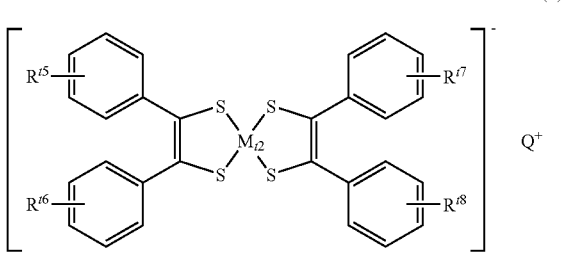

(7)

wherein each of $R^{t5}$, $R^{t6}$, $R^{t7}$ and $R^{t8}$ is the same or different from each other and is a hydrogen atom, a halogen atom, alkyl, aryl, aralkyl, alkoxy or amino and may have a substituent, $M_{t2}$ is a tetra-coordination transition metal atom and $Q^+$ is a monovalent cation,

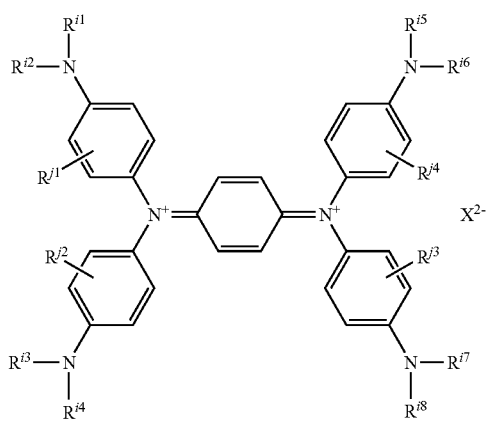

(8)

wherein each of $R^{i1}$, $R^{i2}$, $R^{i3}$, $R^{i4}$, $R^{i5}$, $R^{i6}$, $R^{i7}$ and $R^{i8}$ is same or different alkyl, each of $R^{j1}$, $R^{j2}$, $R^{j3}$ and $R^{j4}$ is same or different a hydrogen atom or a fluorene atom and $X^{2-}$ is a divalent anion,

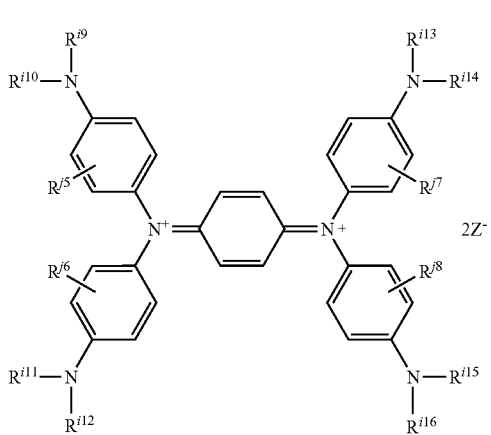

(9)

wherein each of $R^{i9}$, $R^{i10}$, $R^{i11}$, $R^{i12}$, $R^{i13}$, $R^{i14}$, $R^{i15}$ and $R^{i16}$ is same or different alkyl, each of $R^{j5}$, $R^{j6}$, $R^{j7}$ and $R^{j8}$ is same or different a hydrogen atom or a fluorene atom and $Z^-$ is a monovalent anion.

39. The infrared absorbing filter of claim 37, which contains a color tone correcting dye.

40. The infrared absorbing filter of claim 37, which contains 0.01 to 10 parts by weight of the dye having infrared absorbing capability per 100 parts by weight of total amount of the polyester resin and the polycarbonate resin.

41. The infrared absorbing filter of claim 37, which has an average light transmittance of 55% or more at 450 to 700 nm and an average light transmittance of 20% or less at 850 to 1,100 nm.

42. A retardation film comprising the composition recited in claim 1.

43. The retardation film of claim 42, which has a photoelastic coefficient of $65 \times 10^{-12}$ $Pa^{-1}$ or less.

44. A process for the production of the retardation film recited in claim 42, which comprises:
    casting or melt-extruding a film from a resin composition consisting essentially of:
    a polyester resin comprising a dicarboxylic acid component and a diol component (a) containing a compound of the following formula (1), and
    a polycarbonate resin comprising a carbonate-forming component and a diol component (b) containing a compound of the following formula (1) and/or a compound of the following formula (2),
    and stretching the film,

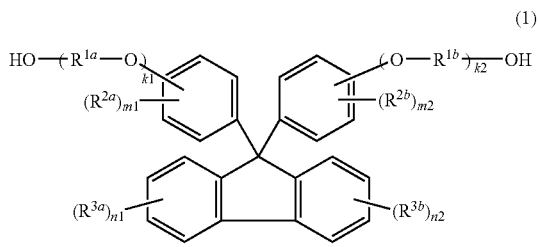

(1)

wherein $R^{1a}$ and $R^{1b}$ represent the same or different $C_{2-10}$ alkylene groups, $R^{2a}$, $R^{2b}$, $R^{3a}$ and $R^{3b}$ represent the same or different hydrogen atoms and $C_{1-6}$ alkyl groups, k1 and k2 represent the same or different integers of 1 or greater and m1, m2, n1 and n2 represent the same or different integers of 1 to 4,

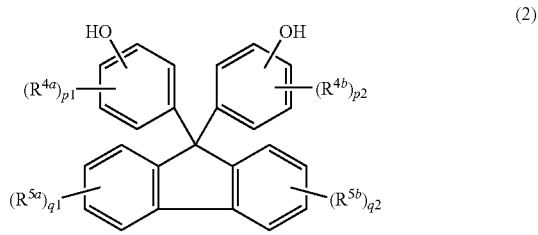

(2)

wherein $R^{4a}$, $R^{4b}$, $R^{5a}$ and $R^{5b}$ represent the same or different hydrogen atoms or $C_{1-6}$ alkyl groups, and p1, p2, q1 and q2 represent the same or different integers of 1 to 4.

* * * * *